US010629230B2

(12) United States Patent
Li et al.

(10) Patent No.: US 10,629,230 B2
(45) Date of Patent: Apr. 21, 2020

(54) METHOD OF FORMING A MAGNETIC HEAD

(71) Applicant: WESTERN DIGITAL TECHNOLOGIES, INC., San Jose, CA (US)

(72) Inventors: Guanxiong Li, Fremont, CA (US); Ming Mao, Dublin, CA (US); Rong Cao, Fremont, CA (US); Chen-Jung Chien, Mountain View, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 456 days.

(21) Appl. No.: 15/492,141

(22) Filed: Apr. 20, 2017

(65) Prior Publication Data

US 2018/0308514 A1    Oct. 25, 2018

(51) Int. Cl.
| | | |
|---|---|---|
| *H04R 31/00* | (2006.01) | |
| *G11B 5/127* | (2006.01) | |
| *G11B 5/31* | (2006.01) | |
| *G11B 5/39* | (2006.01) | |

(52) U.S. Cl.
CPC .......... *G11B 5/3169* (2013.01); *G11B 5/3932* (2013.01); *G11B 5/3173* (2013.01)

(58) Field of Classification Search
CPC ... G11B 5/3169; G11B 5/3932; G11B 5/3173; G11B 5/11
See application file for complete search history.

(56) References Cited

U.S. PATENT DOCUMENTS

| | | |
|---|---|---|
| 6,609,948 B1 | 8/2003 | Fontana, Jr. et al. |
| 8,291,743 B1 | 10/2012 | Shi et al. |
| 8,361,541 B2 | 1/2013 | Lee et al. |
| 8,375,565 B2 | 2/2013 | Hu et al. |
| 8,443,510 B1 | 5/2013 | Shi et al. |
| 8,717,709 B1 | 5/2014 | Shi et al. |
| 8,760,822 B1 | 6/2014 | Li et al. |
| 8,797,694 B2* | 8/2014 | Le ..................... G11B 5/3909 360/324.12 |
| 8,883,017 B1 | 11/2014 | Zhang et al. |
| 8,964,333 B1 | 2/2015 | Hu et al. |
| 9,053,720 B1* | 6/2015 | Chye .................... G11B 5/3912 |
| 9,129,660 B2 | 9/2015 | Contreras et al. |
| 9,153,260 B1 | 10/2015 | Rudy et al. |
| 9,153,261 B1 | 10/2015 | Kerner et al. |

(Continued)

*Primary Examiner* — Paul D Kim

(74) *Attorney, Agent, or Firm* — The Marbury Law Group PLLC

(57) ABSTRACT

A method of forming a magnetic head includes forming a read sensor stripe, depositing an electronic lapping guide (ELG) layer over the substrate in an ELG region, forming a backside edge of a read sensor by patterning the read sensor stripe in a first patterning step, forming a backside insulator layer and a rear bias magnetic material portion over the backside edge of the read sensor, forming a backside edge of an ELG by patterning the ELG layer in the ELG region in a second patterning step, simultaneously forming a front side edge of the read sensor and a front side edge of the ELG, and lapping the read sensor and the ELG to provide an air bearing surface of a read sensor. The physical stripe height offset can be determined for each flash field by correlating device conductance and ELG conductance.

20 Claims, 34 Drawing Sheets

(56) References Cited

U.S. PATENT DOCUMENTS

| | | |
|---|---|---|
| 9,190,083 B2 | 11/2015 | O'Konski et al. |
| 9,321,146 B1 | 4/2016 | Rudy et al. |
| 9,390,733 B2 | 7/2016 | Etoh et al. |
| 9,441,938 B1 | 9/2016 | Rudy et al. |
| 10,354,681 B1 * | 7/2019 | Chien |
| 2004/0097173 A1 | 5/2004 | Crawforth et al. |
| 2007/0230063 A1 | 10/2007 | Seagle |
| 2011/0294398 A1 | 12/2011 | Hu et al. |
| 2015/0103443 A1 | 4/2015 | O'Konski et al. |
| 2015/0260757 A1 | 9/2015 | Li et al. |
| 2017/0140779 A1 | 5/2017 | Koui |

* cited by examiner

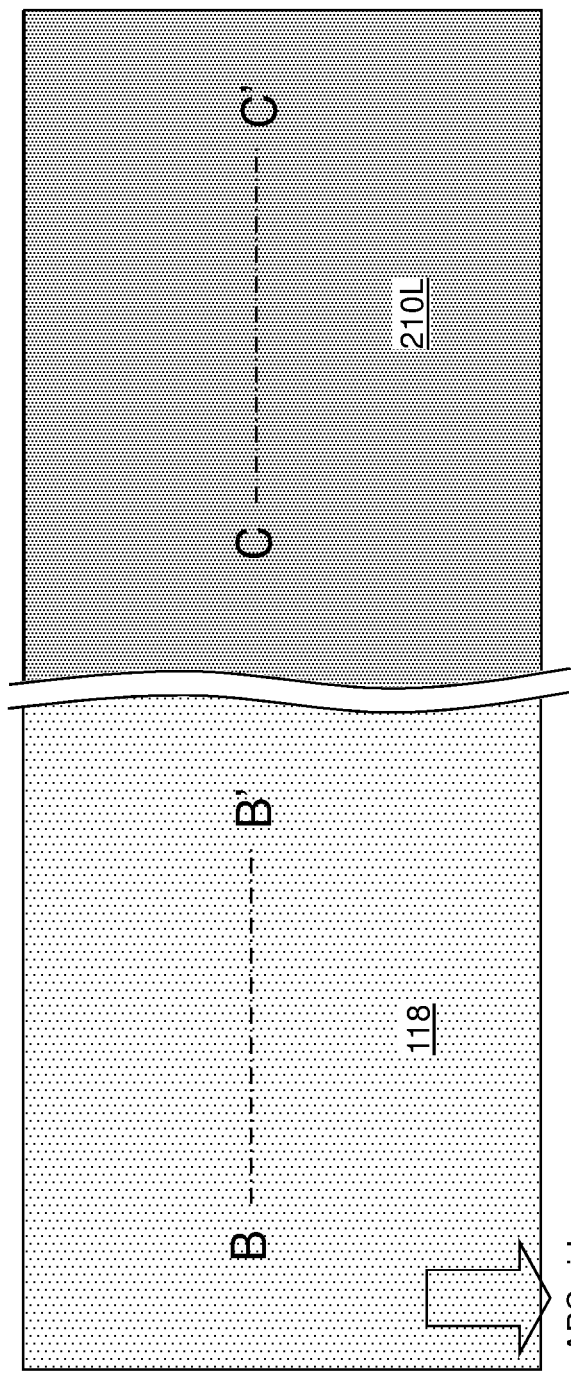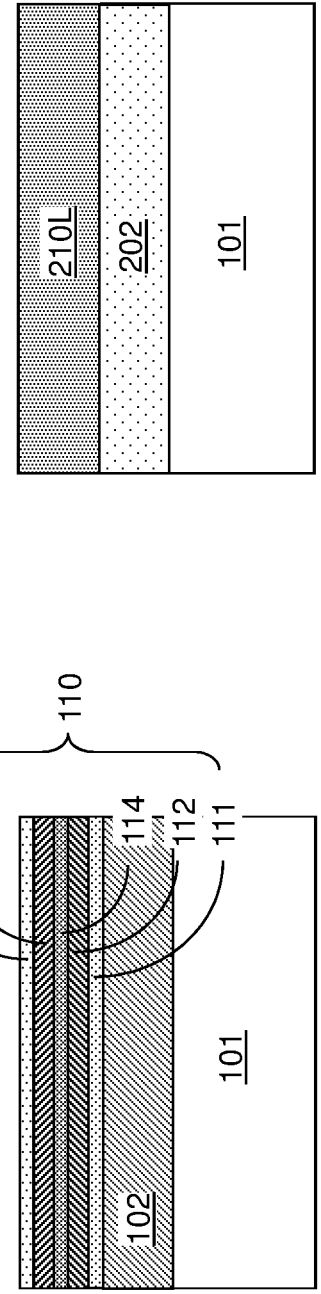

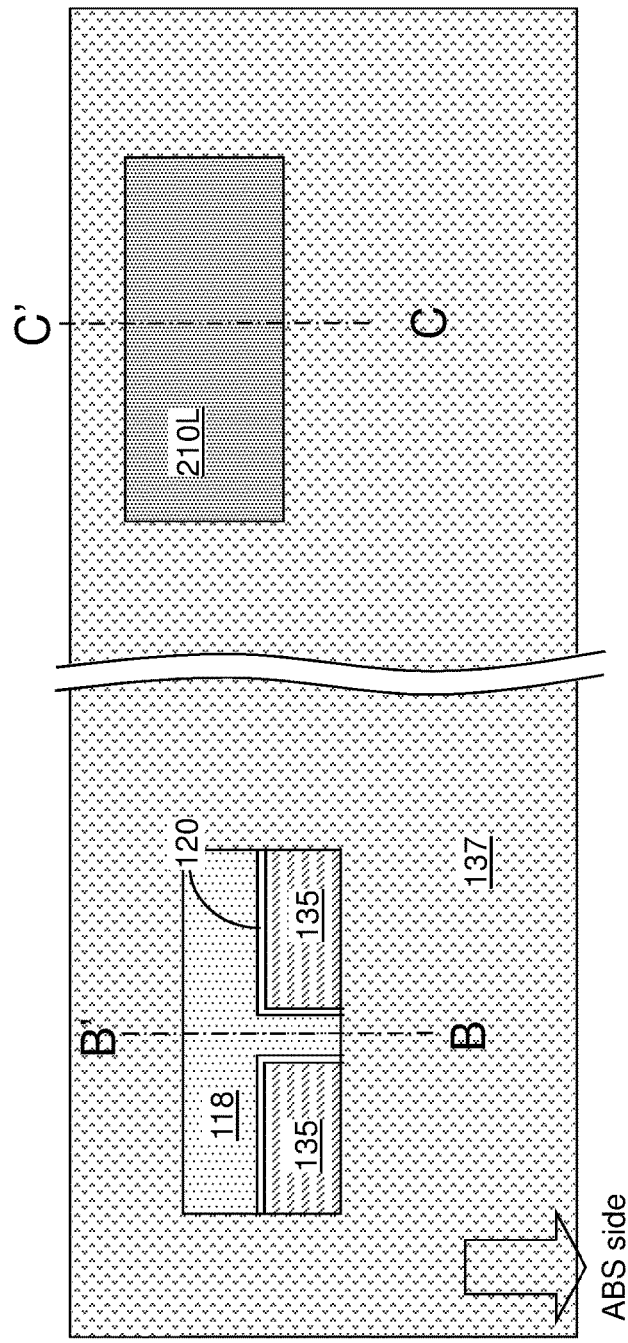
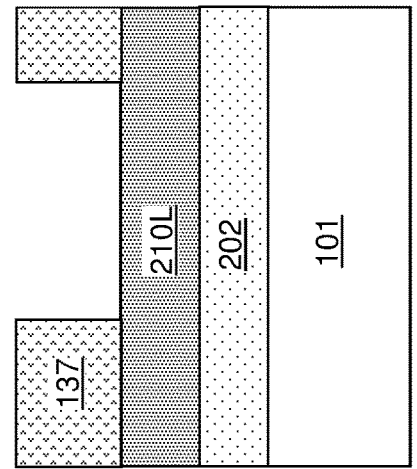
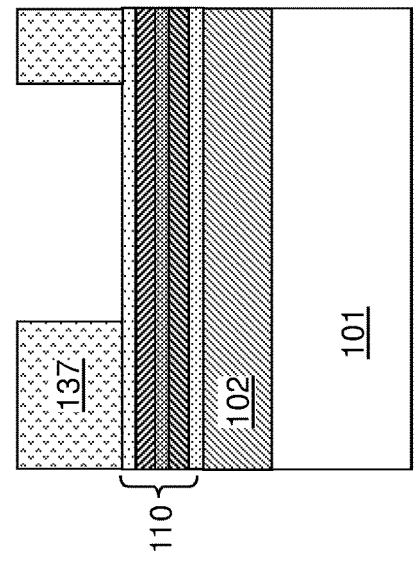
FIG. 5A
FIG. 5B
FIG. 5C

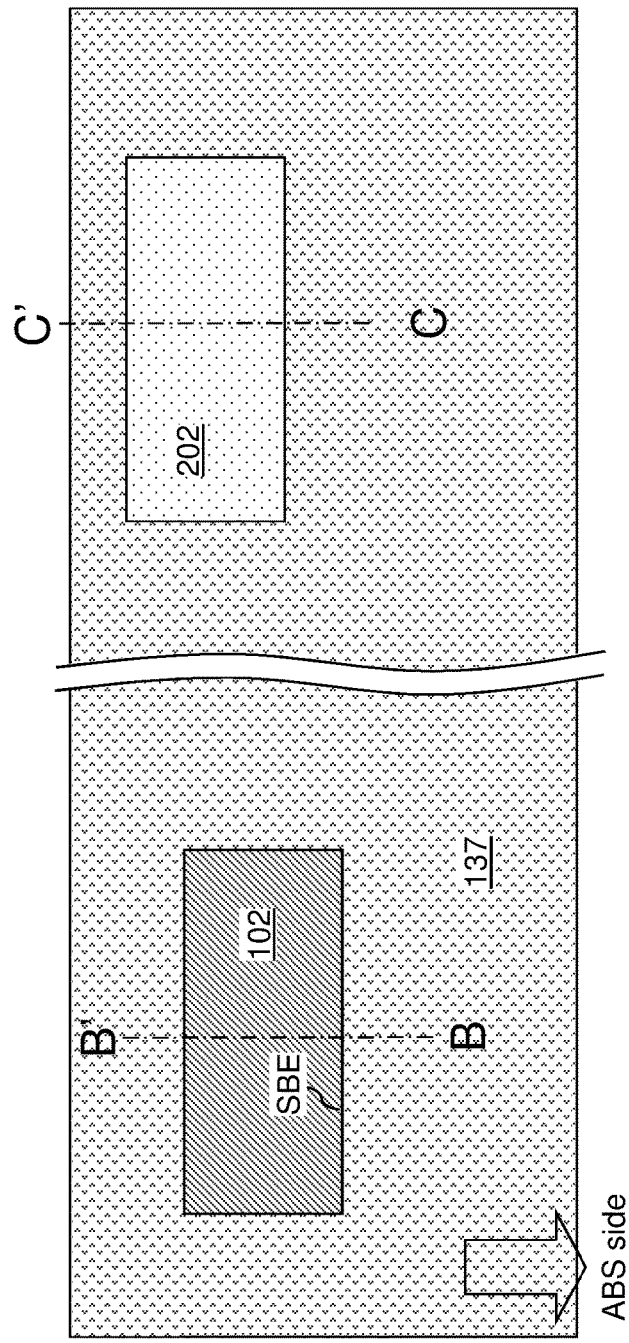
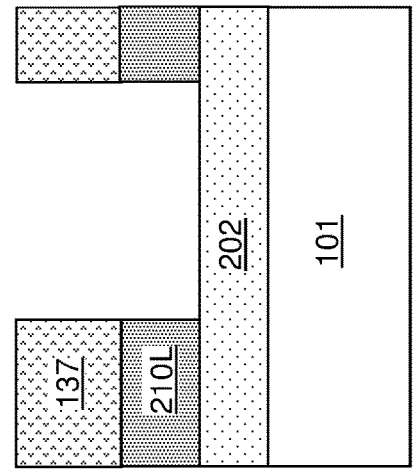
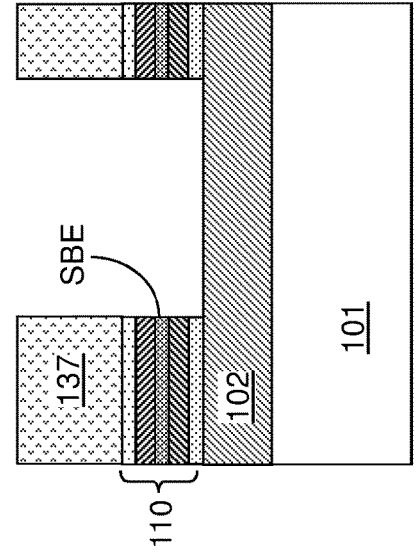
FIG. 6A
FIG. 6B
FIG. 6C

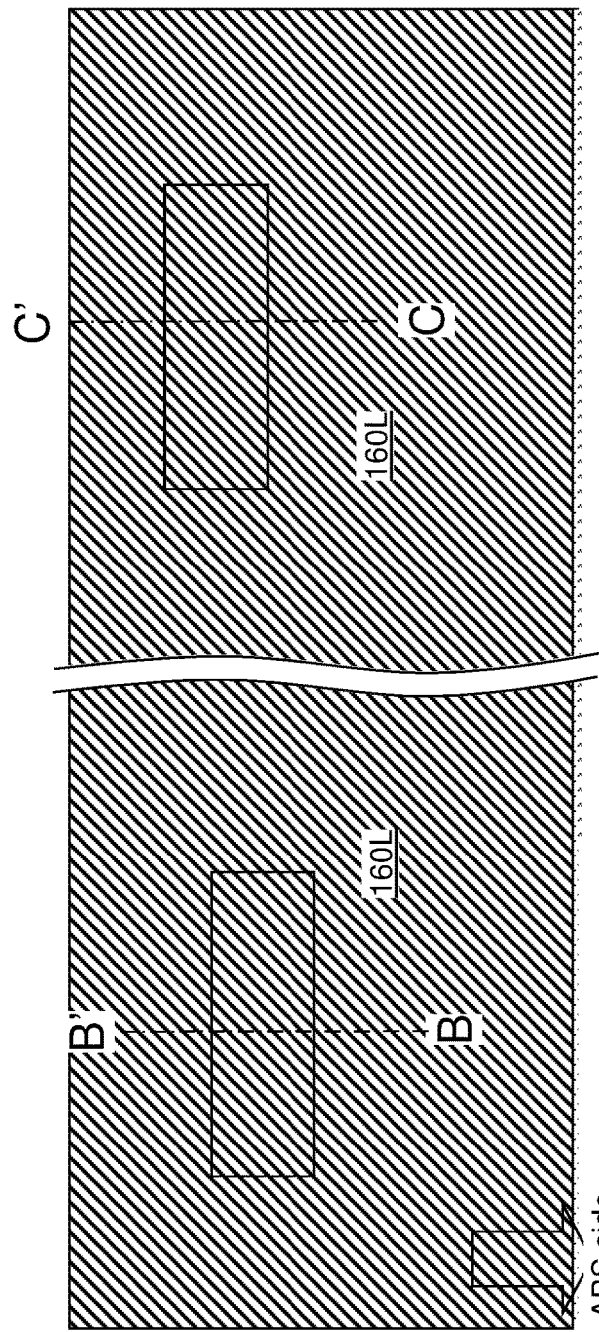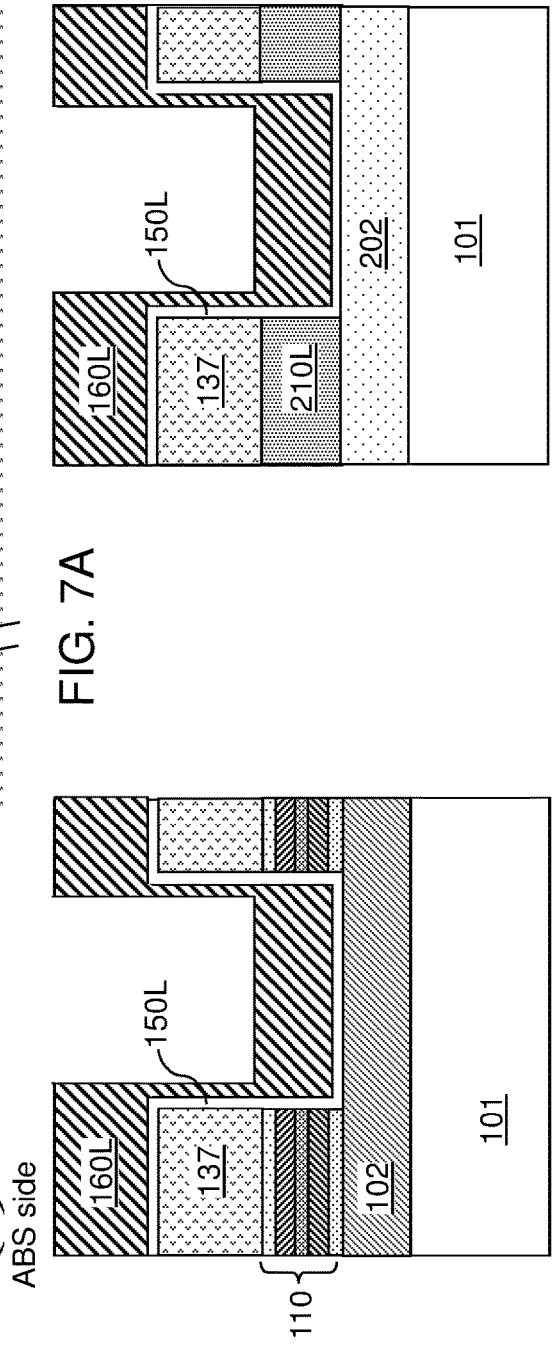

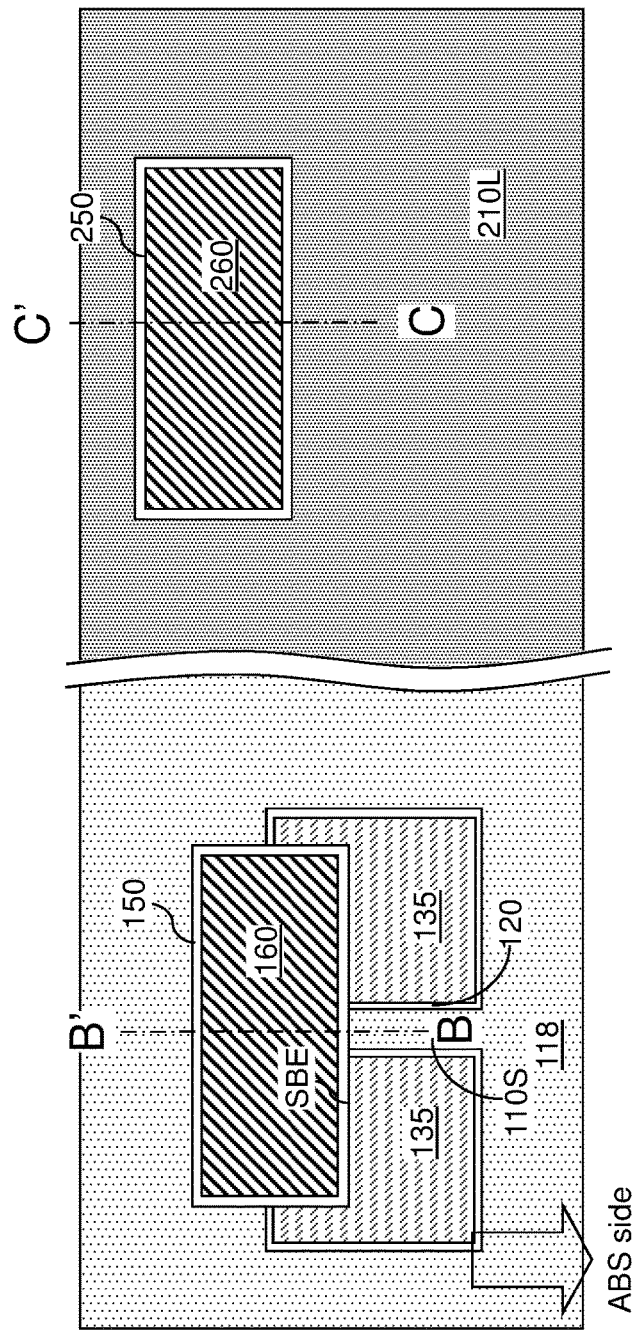
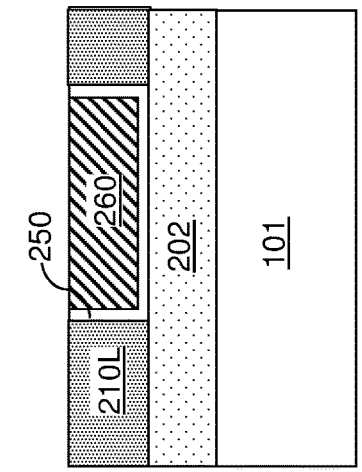
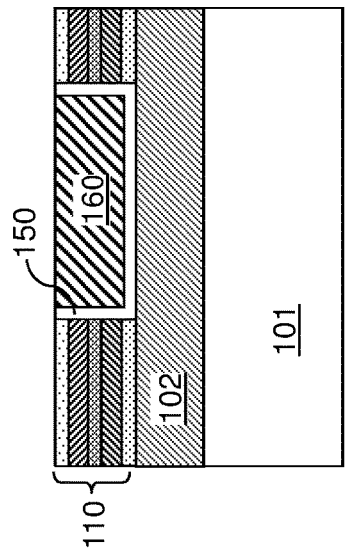
FIG. 8A
FIG. 8B
FIG. 8C

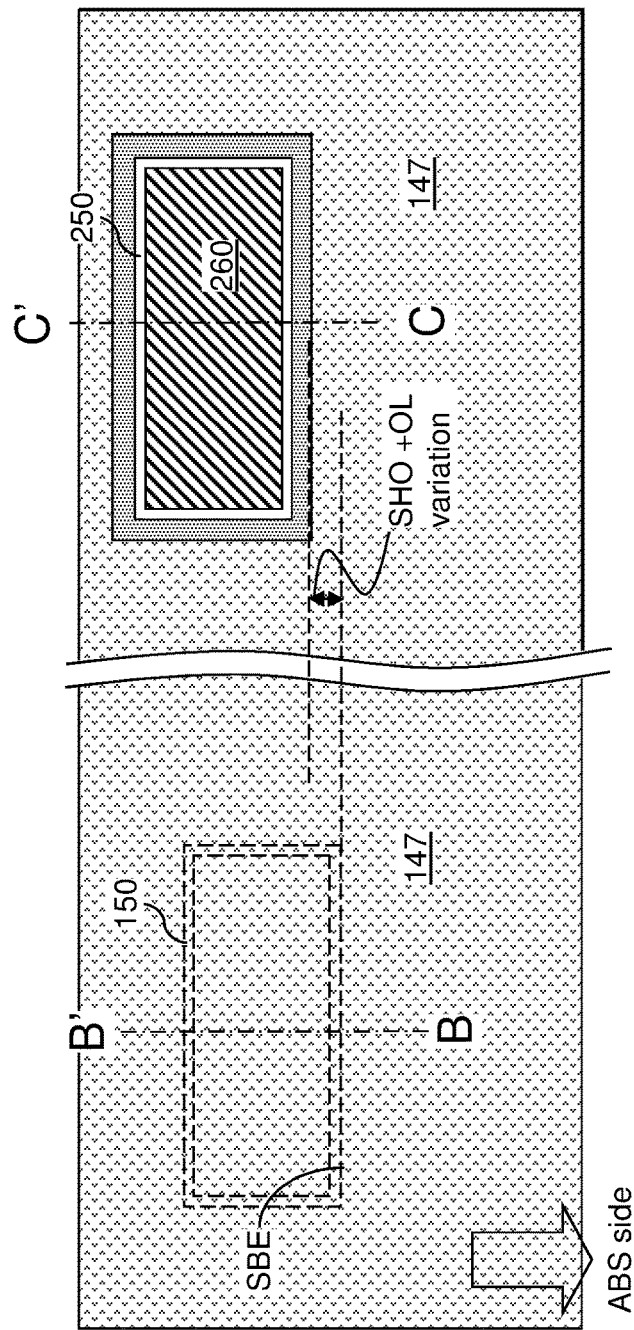
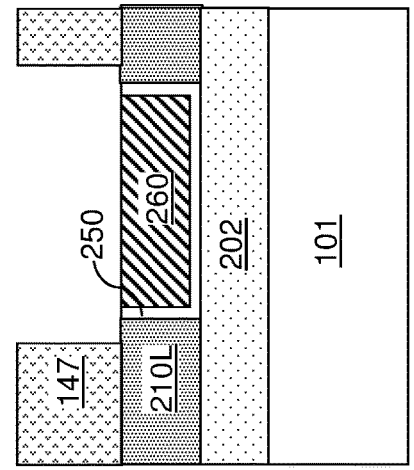
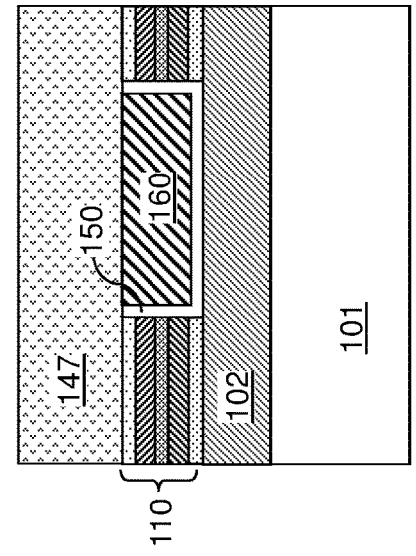
FIG. 9A
FIG. 9B
FIG. 9C

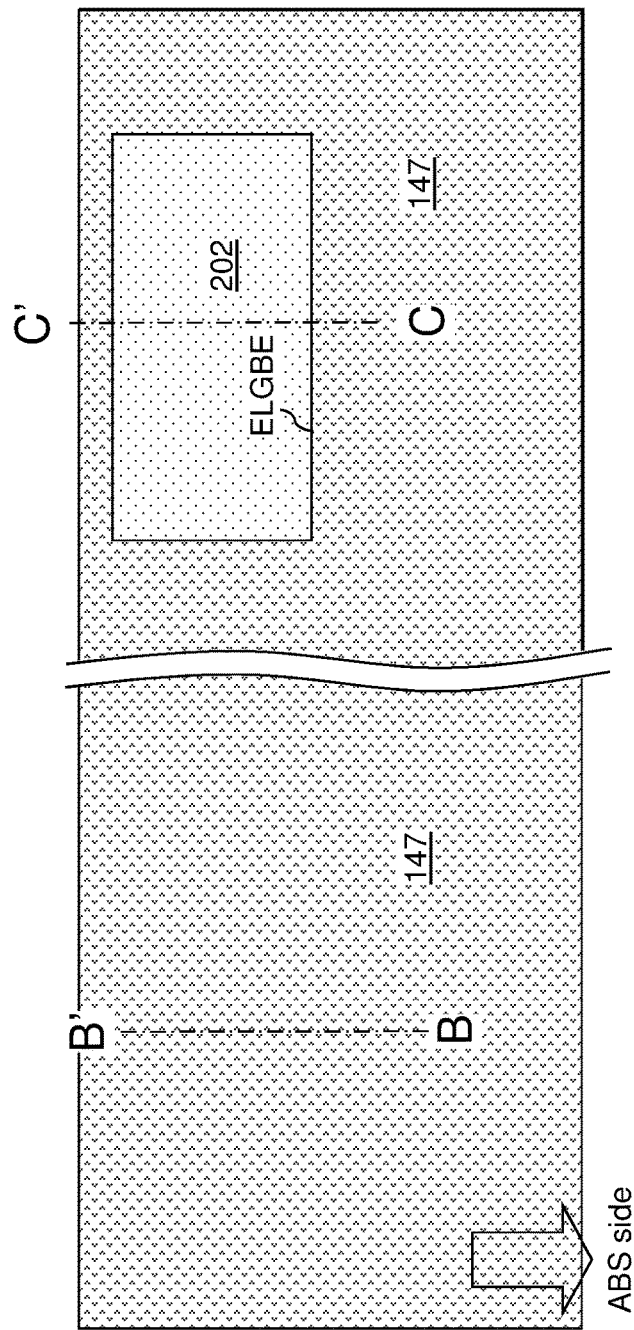
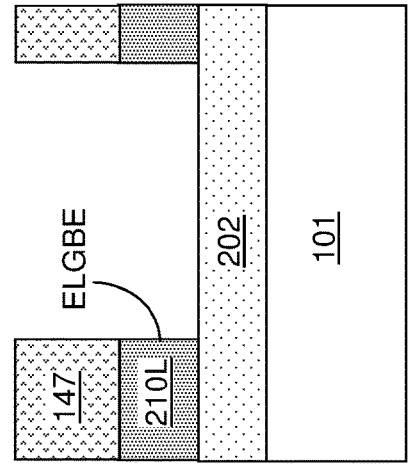
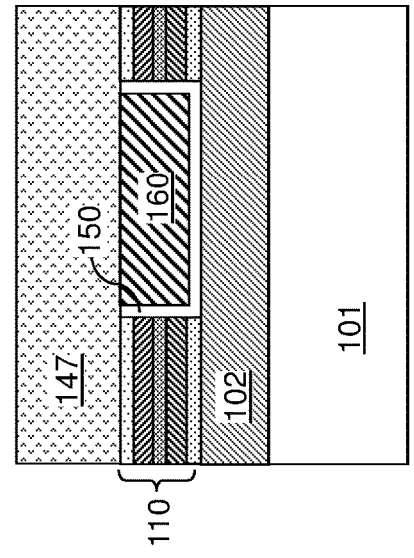
FIG. 10A
FIG. 10B
FIG. 10C

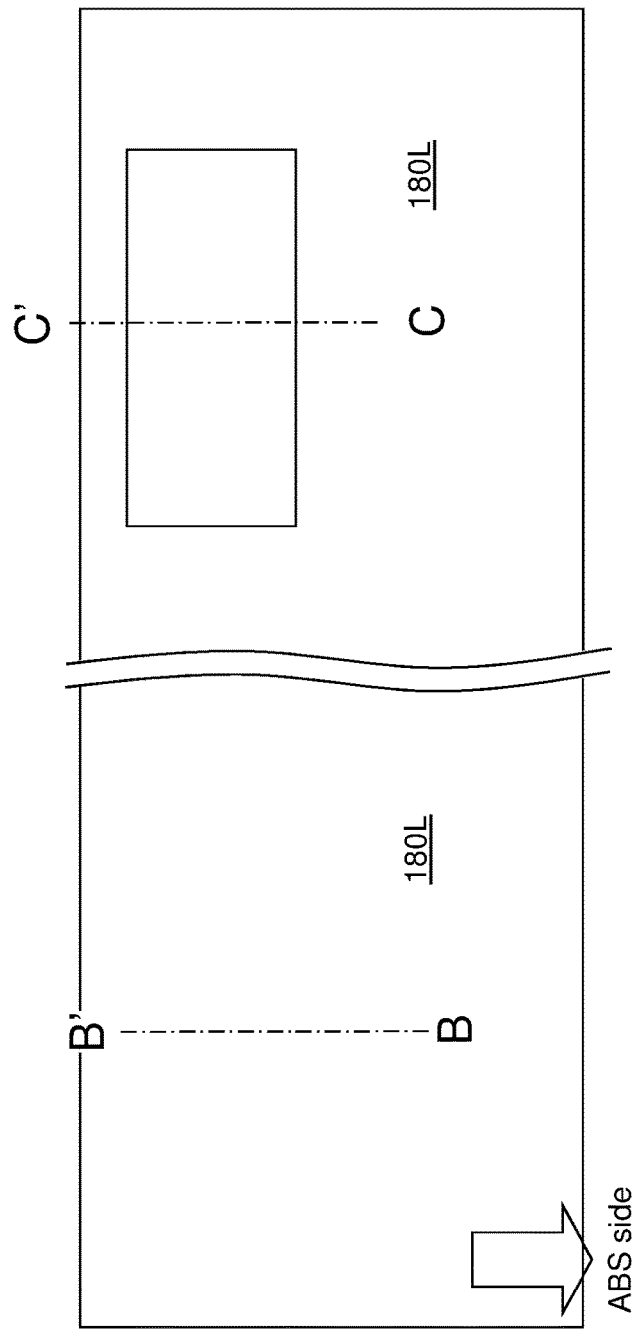
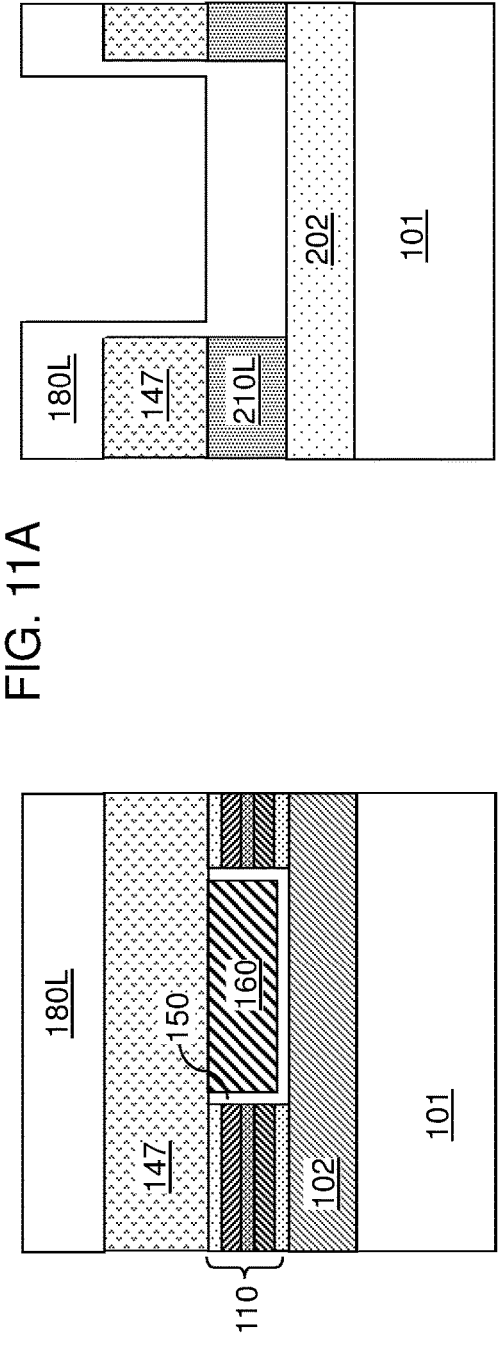
FIG. 11A
FIG. 11B
FIG. 11C

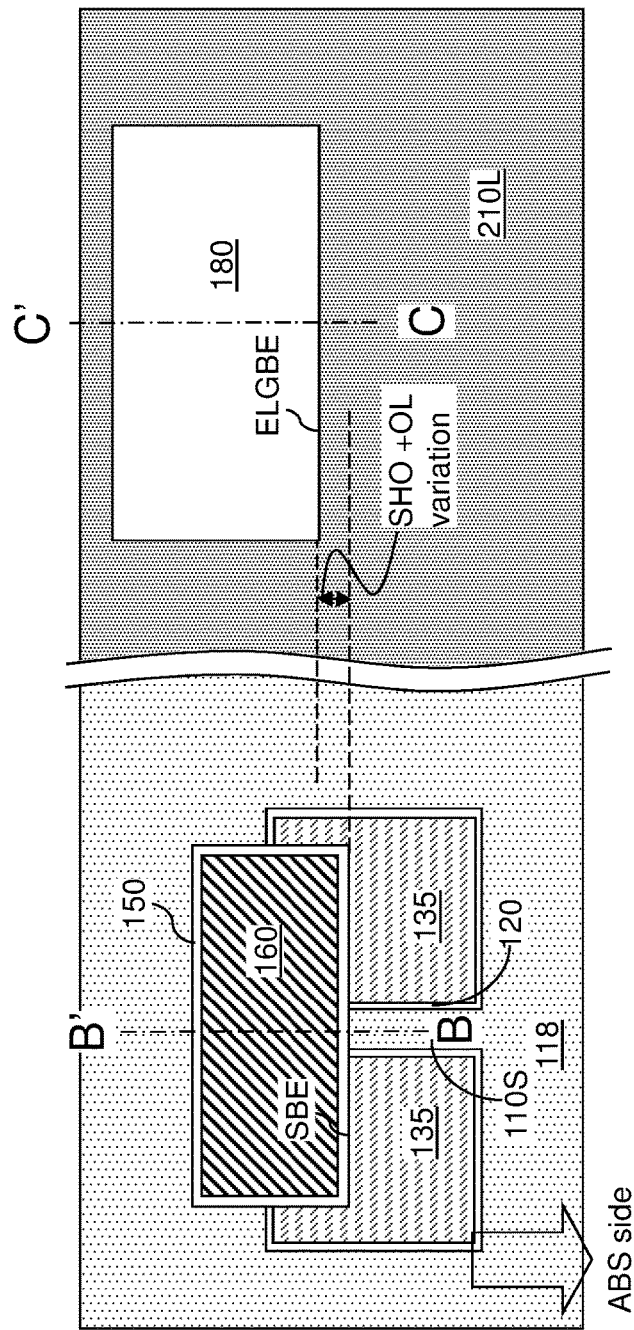
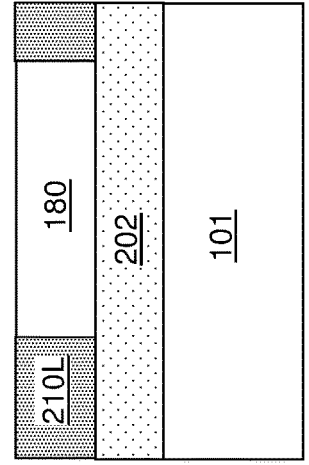
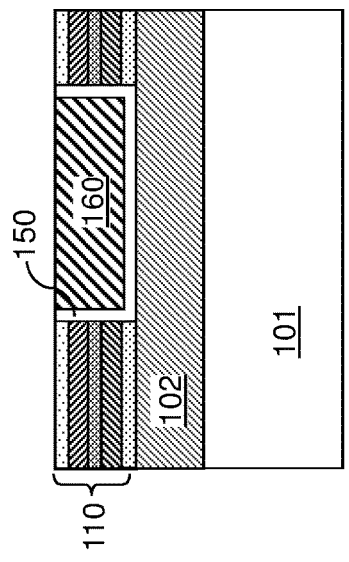
FIG. 12A
FIG. 12B
FIG. 12C

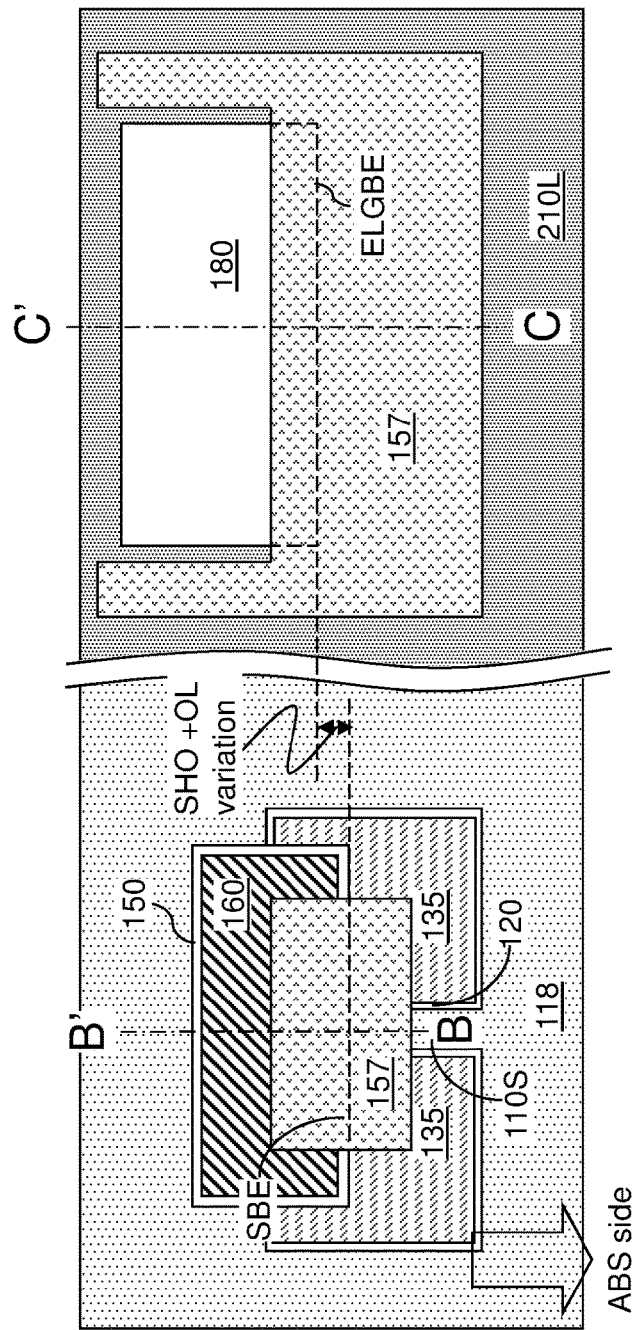
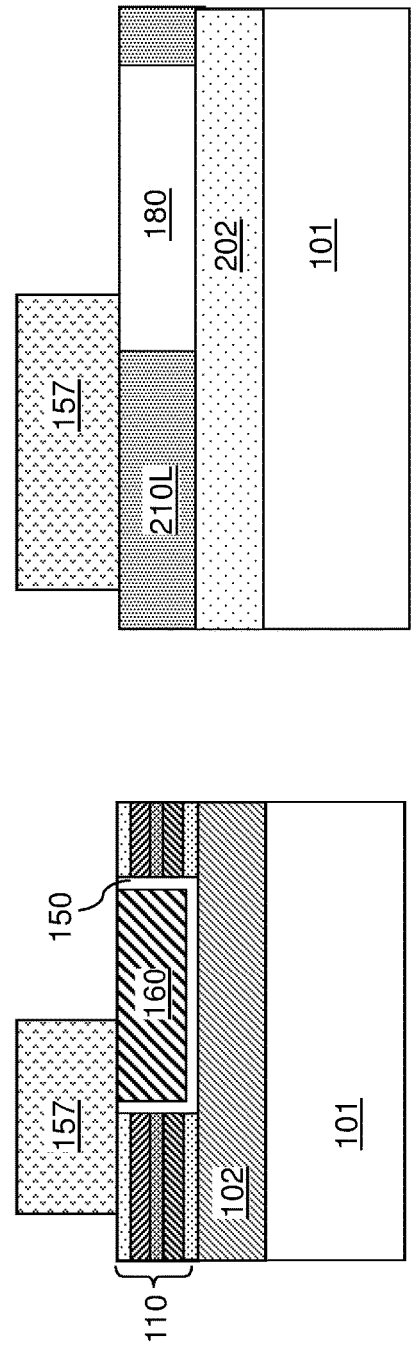
FIG. 13A
FIG. 13B
FIG. 13C

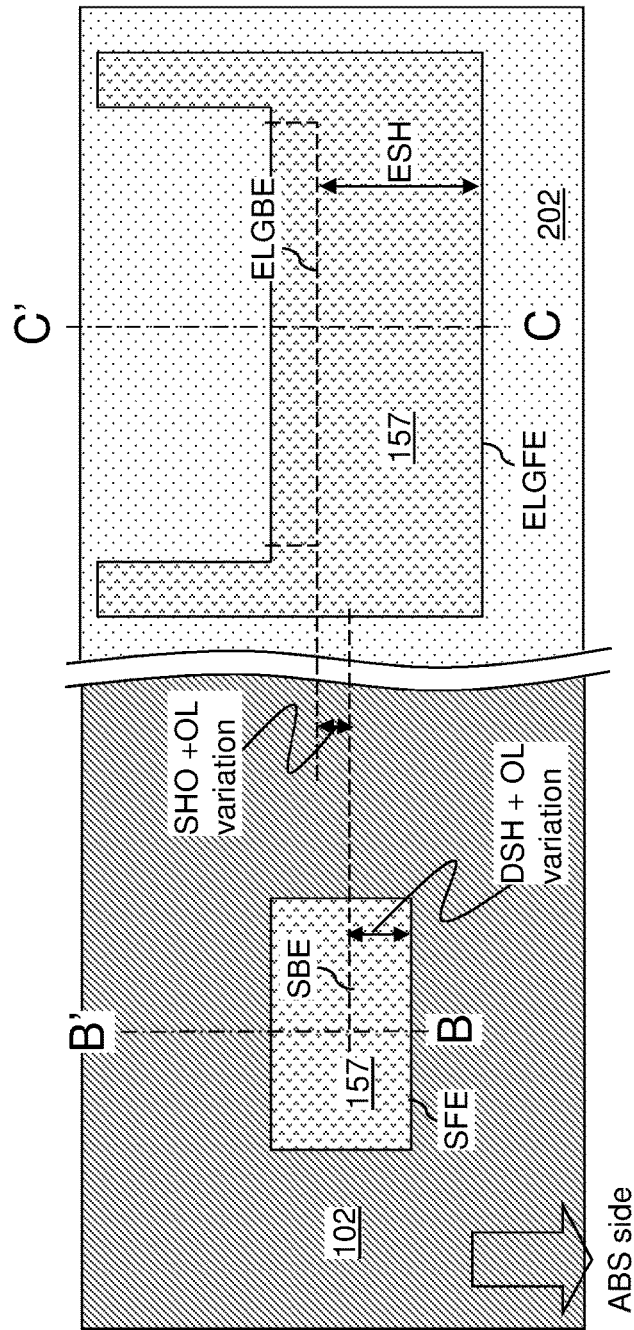
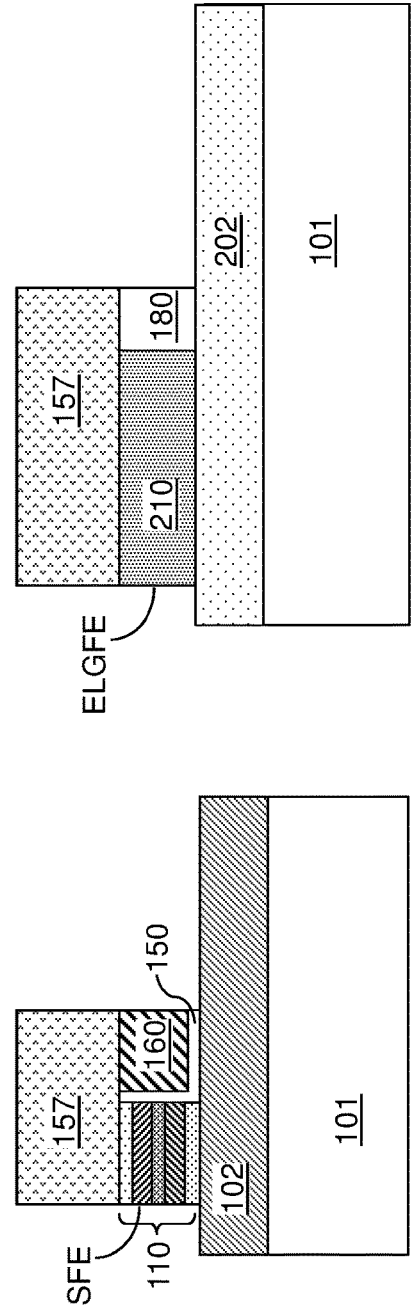
FIG. 14A
FIG. 14B
FIG. 14C

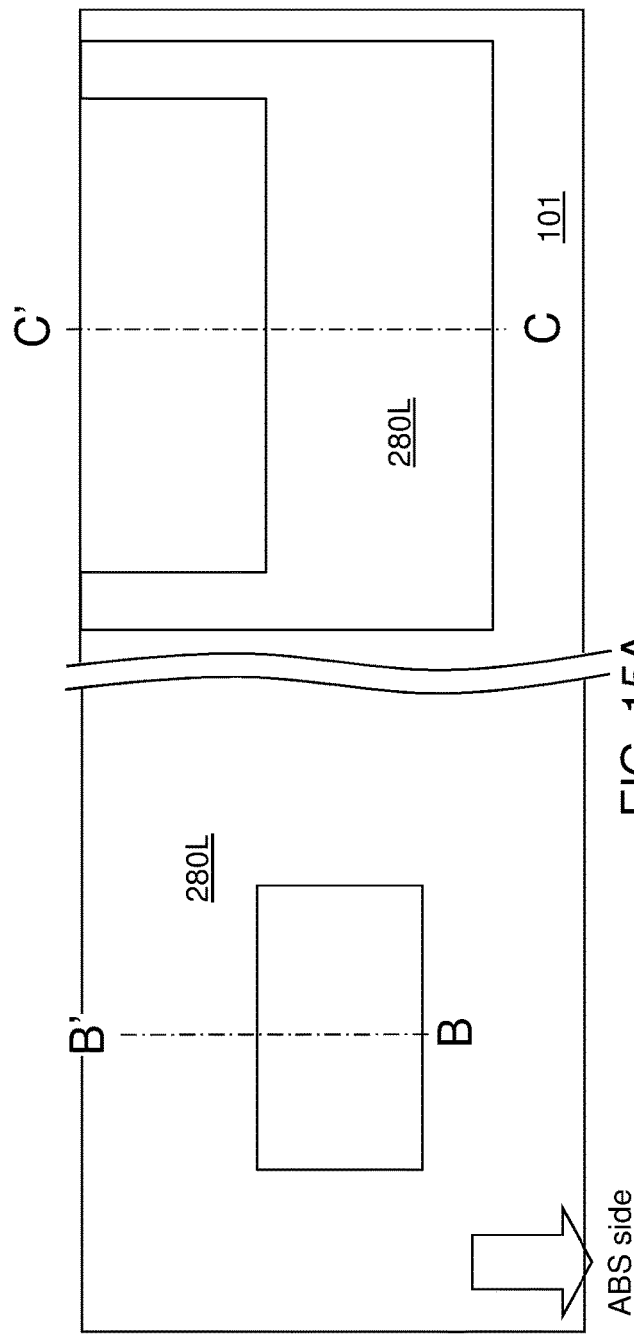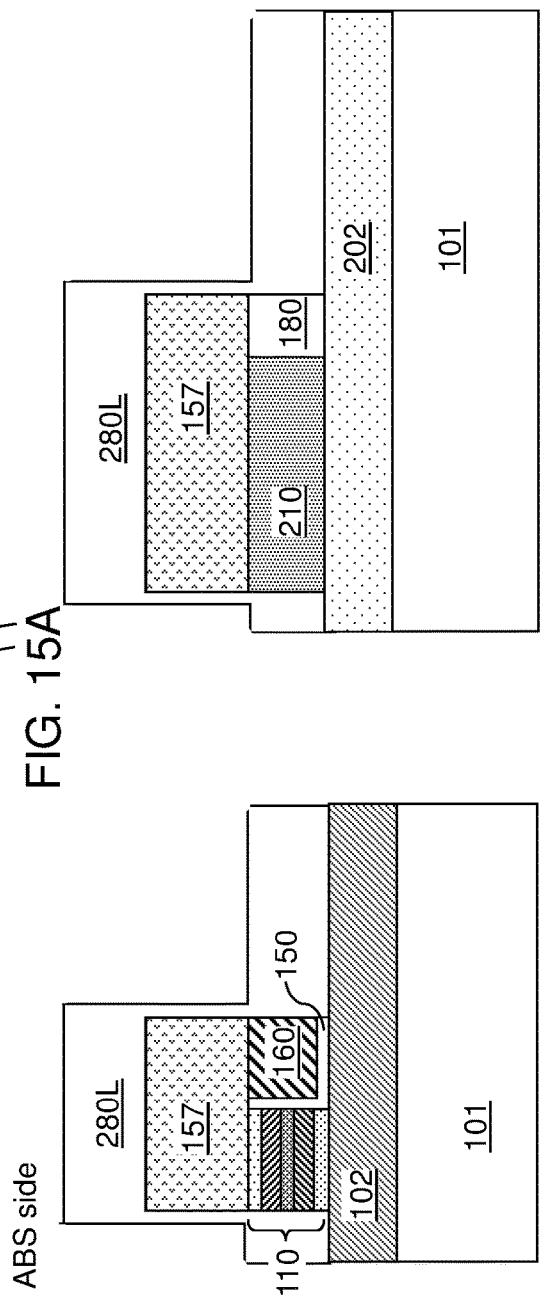
FIG. 15A
FIG. 15B
FIG. 15C

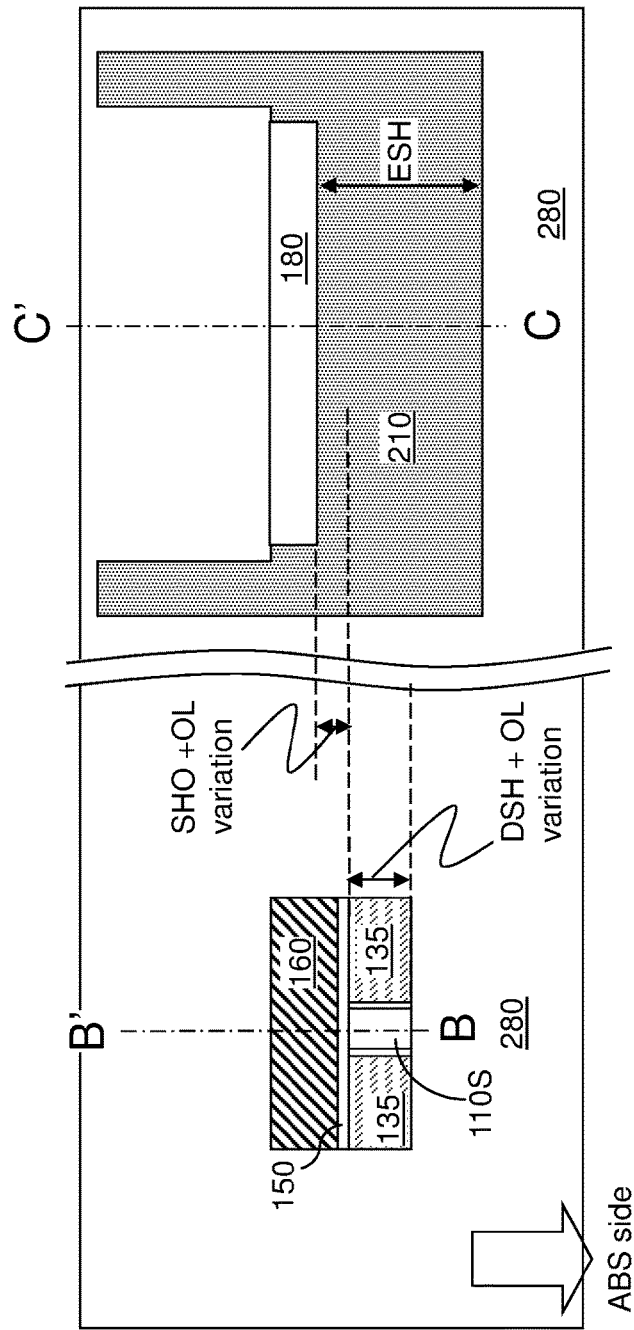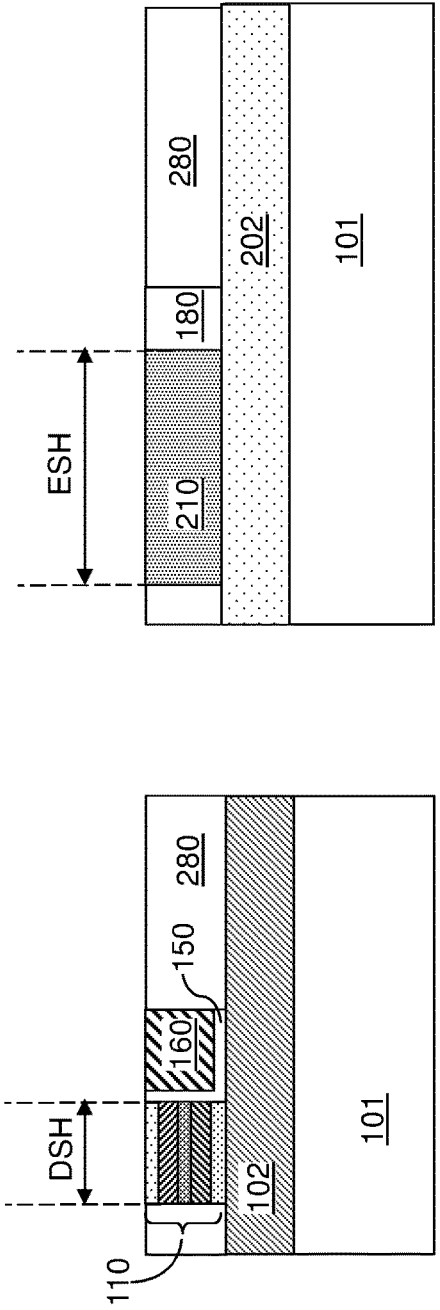
FIG. 16A
FIG. 16B
FIG. 16C

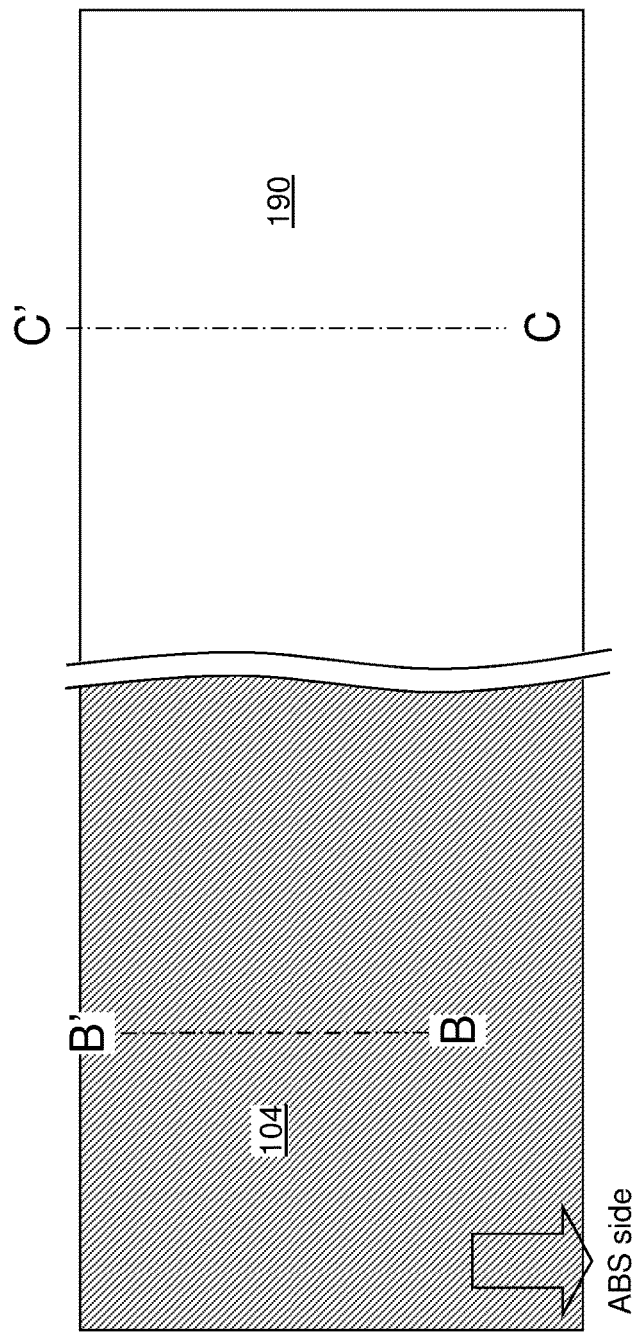
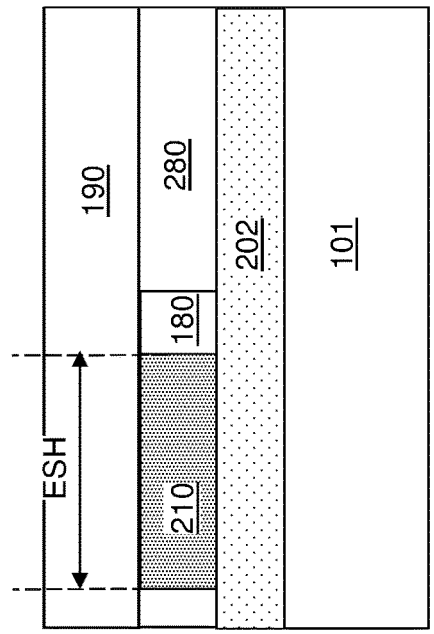
FIG. 17A
FIG. 17B
FIG. 17C

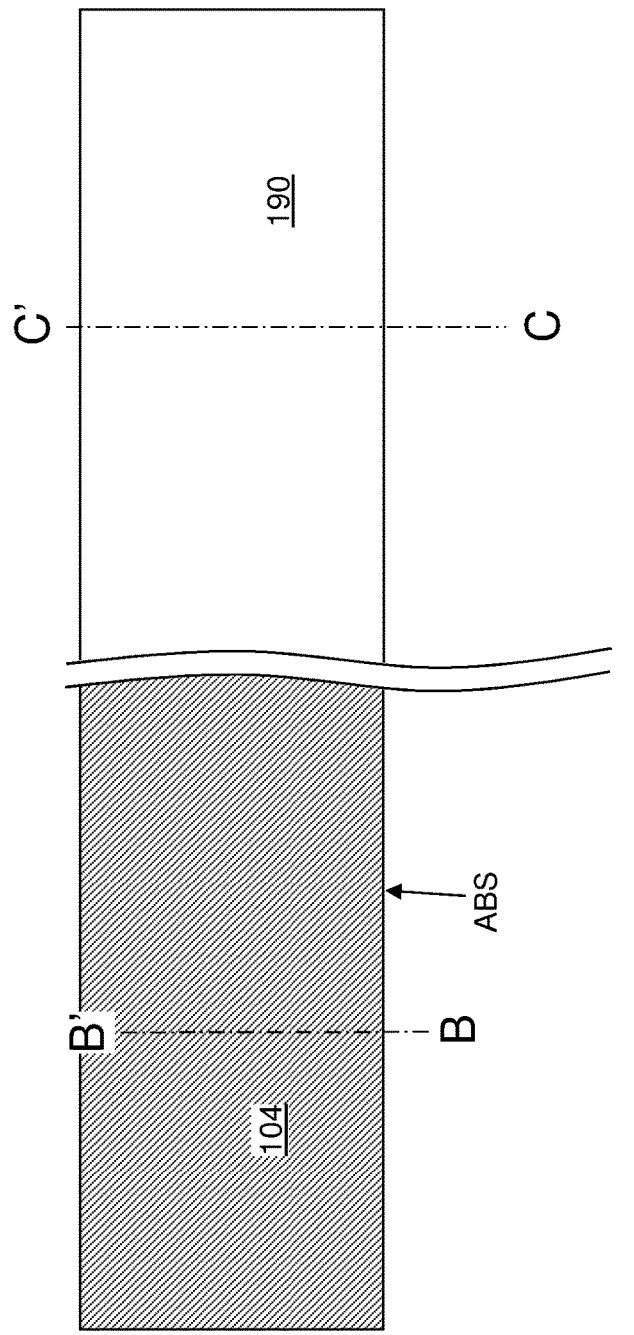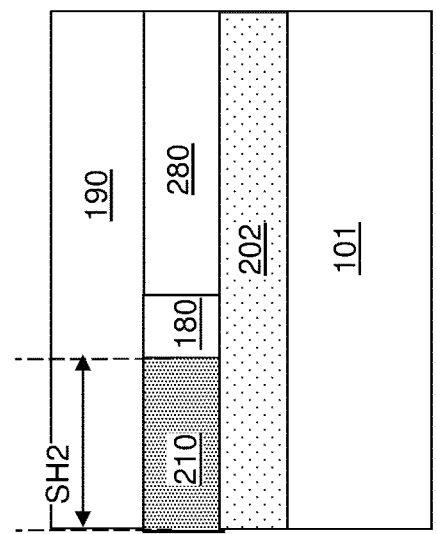

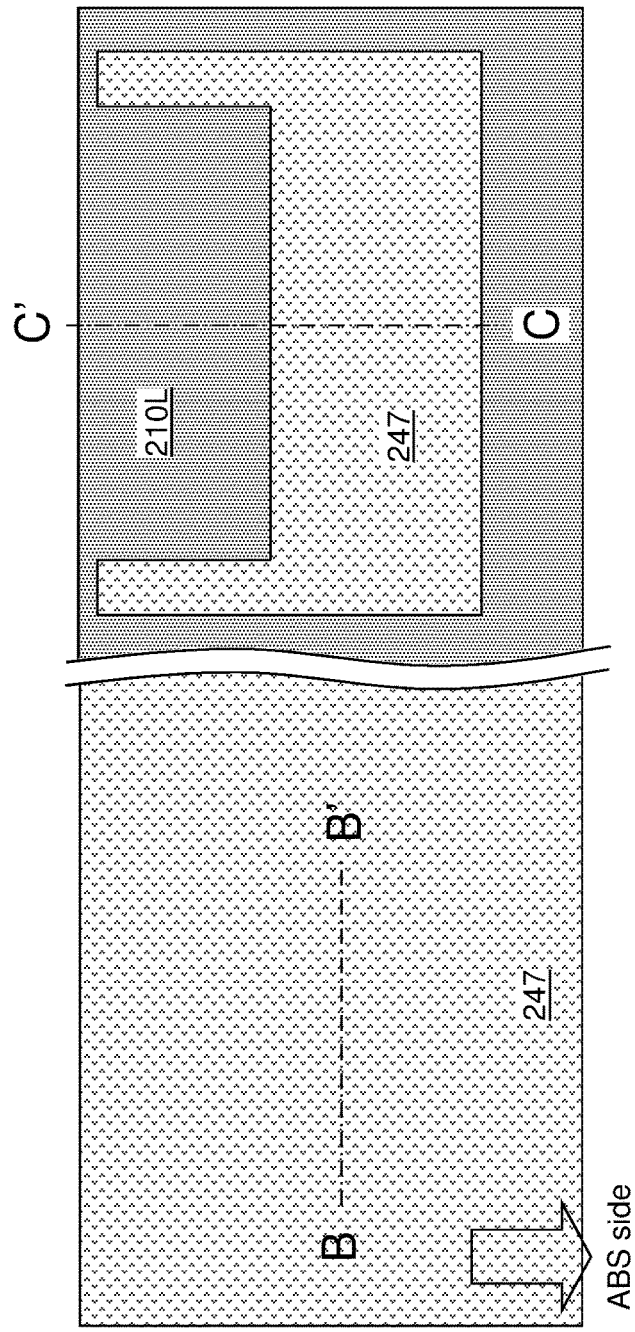
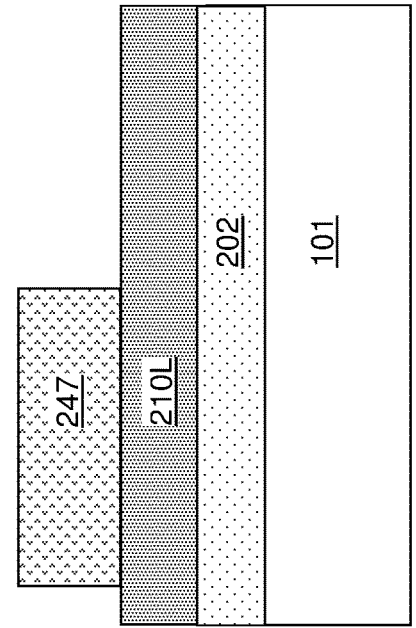
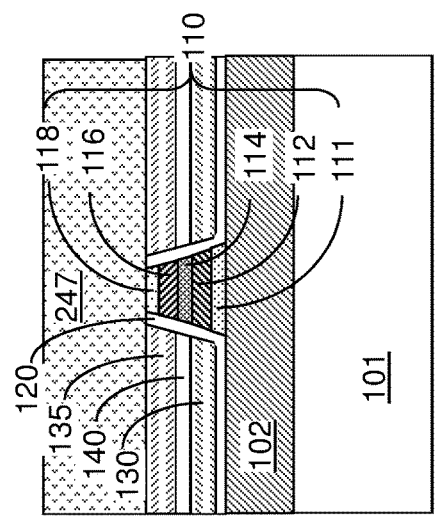
FIG. 19A
FIG. 19C
FIG. 19B

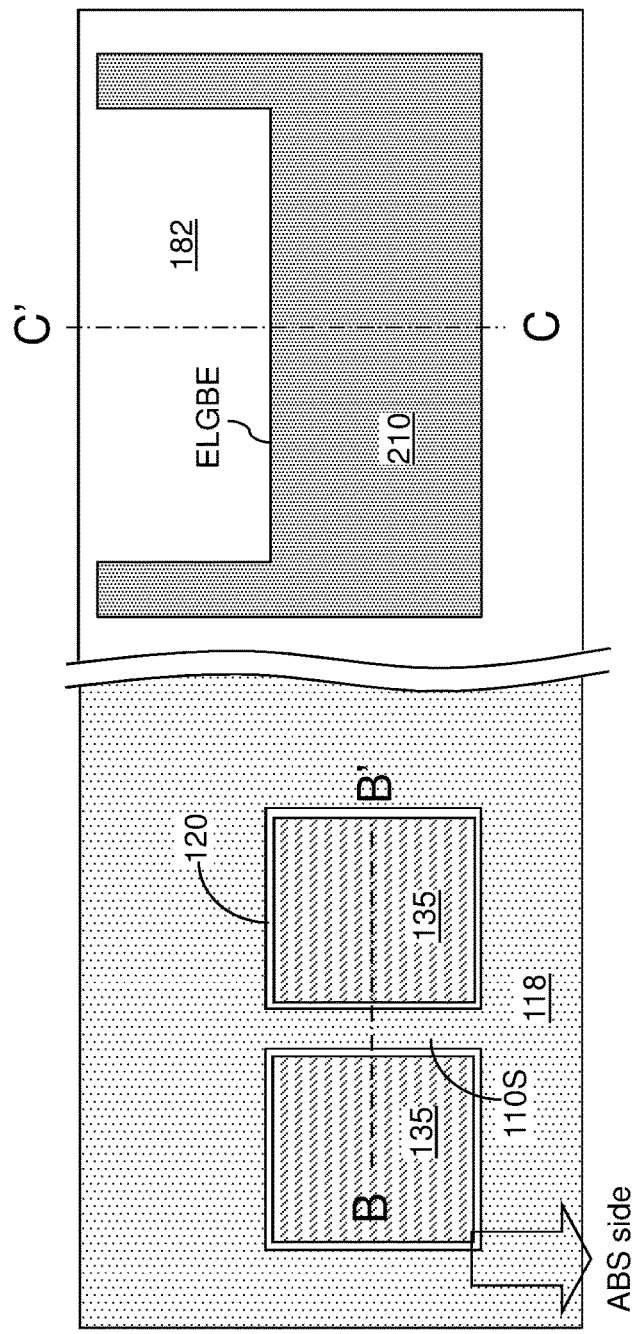
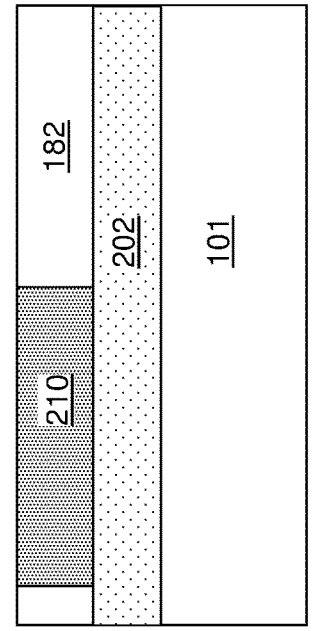
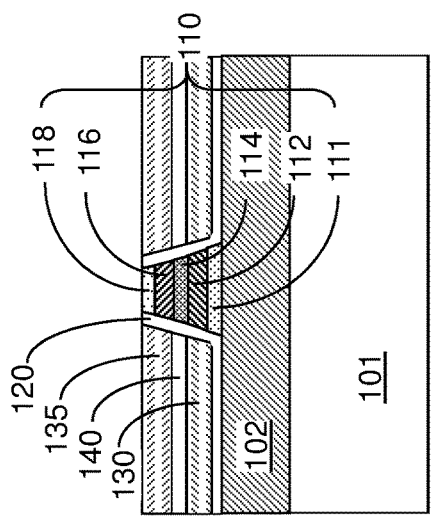

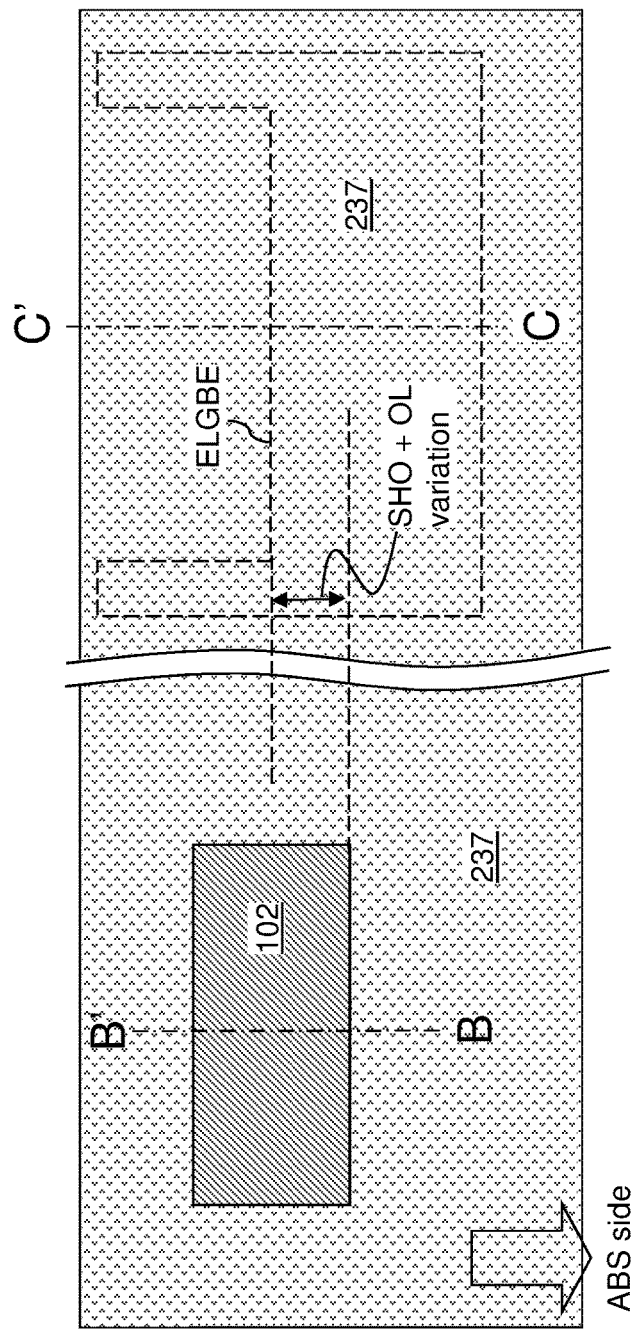
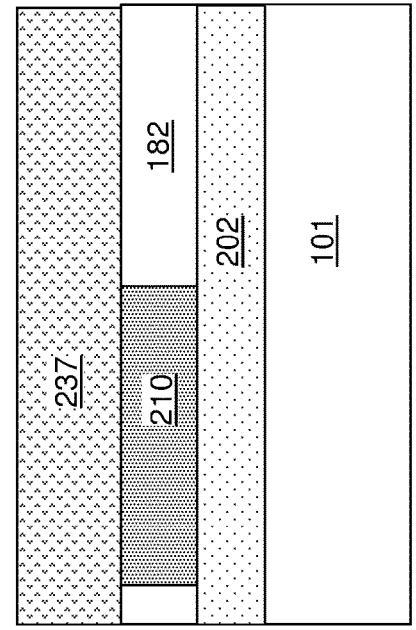
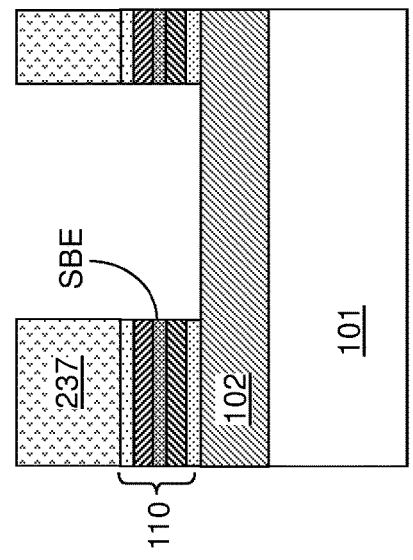
FIG. 24A
FIG. 24B
FIG. 24C

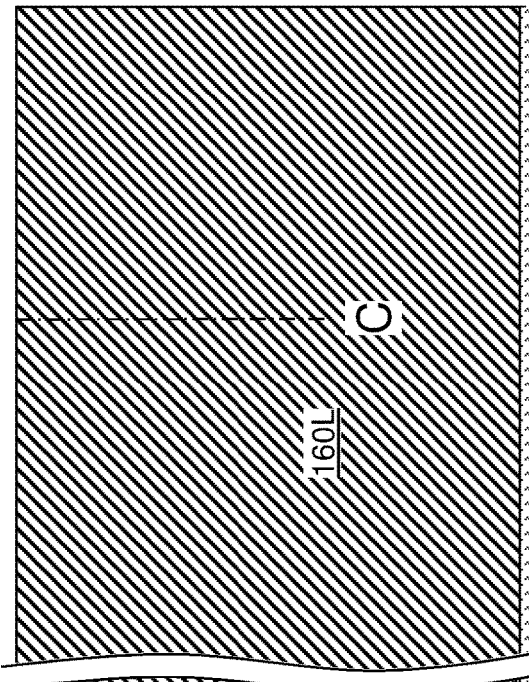
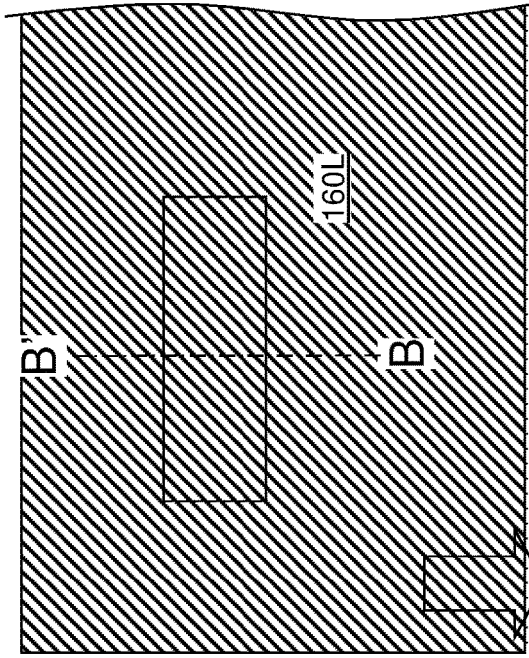
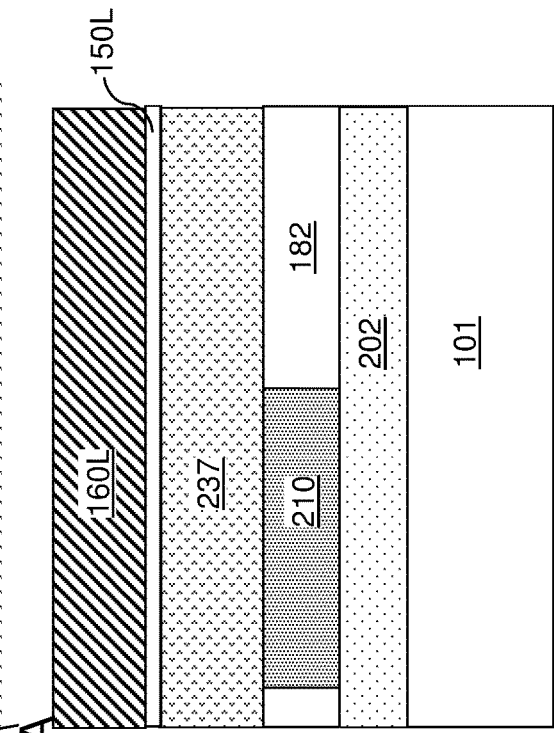
FIG. 25C
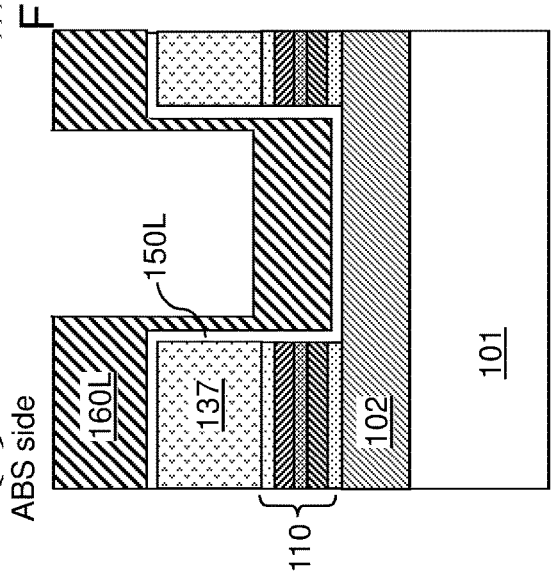
FIG. 25B

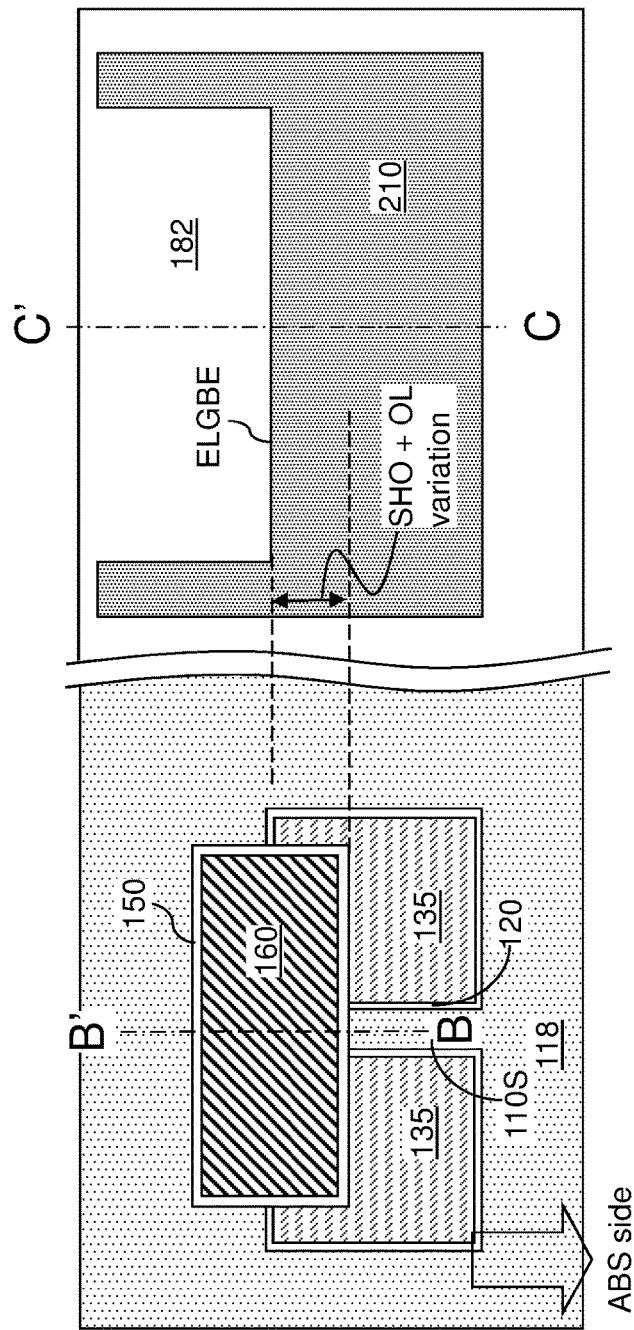
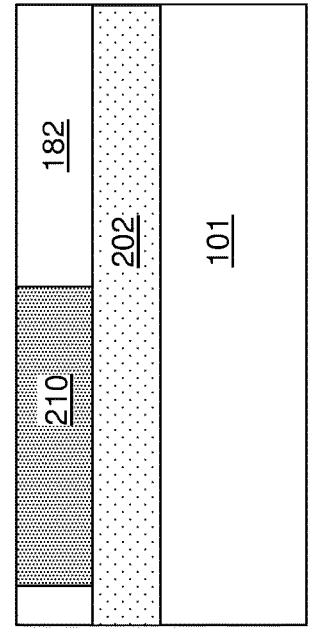
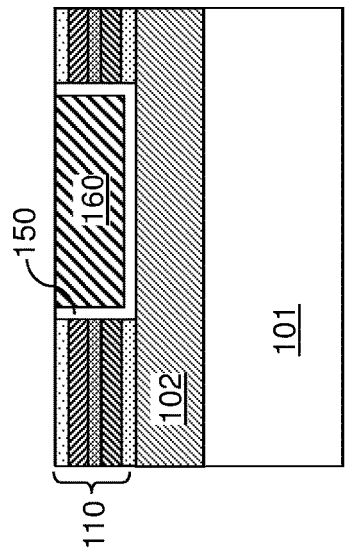
FIG. 26A
FIG. 26B
FIG. 26C

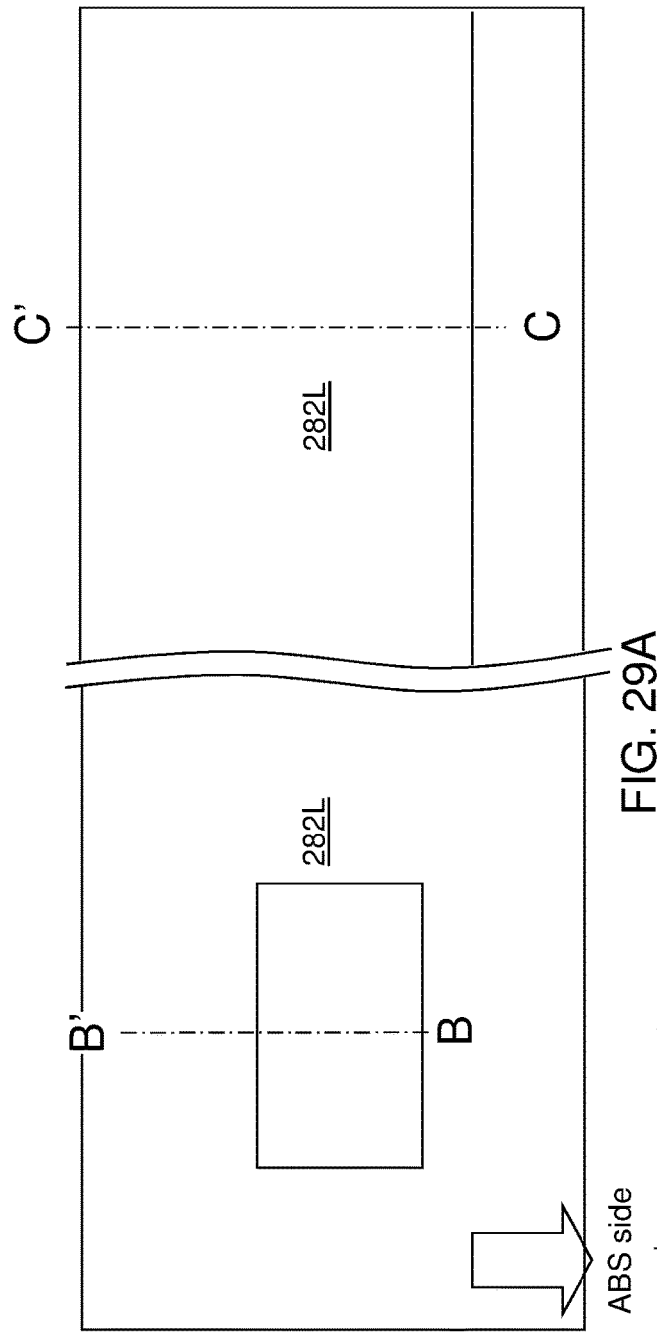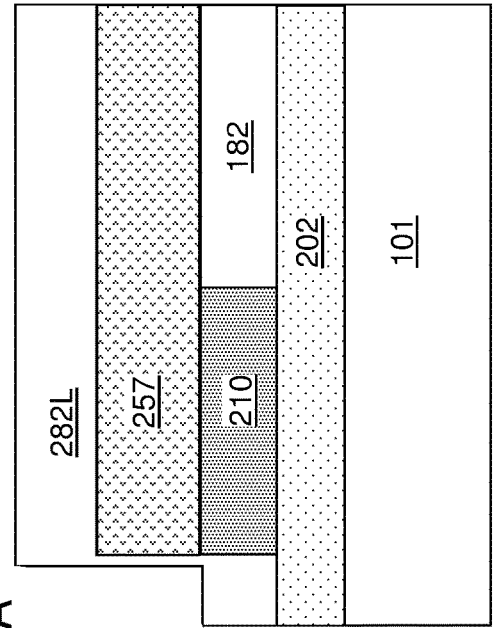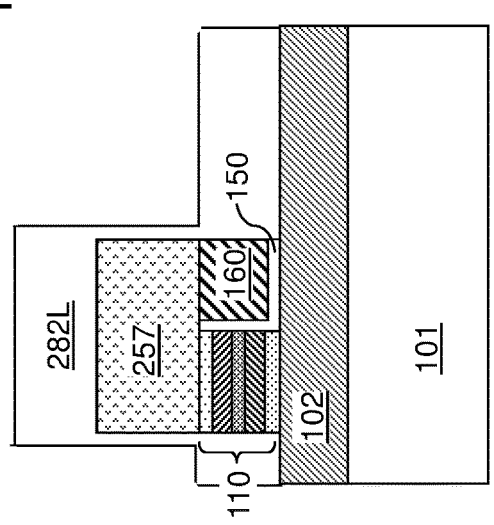

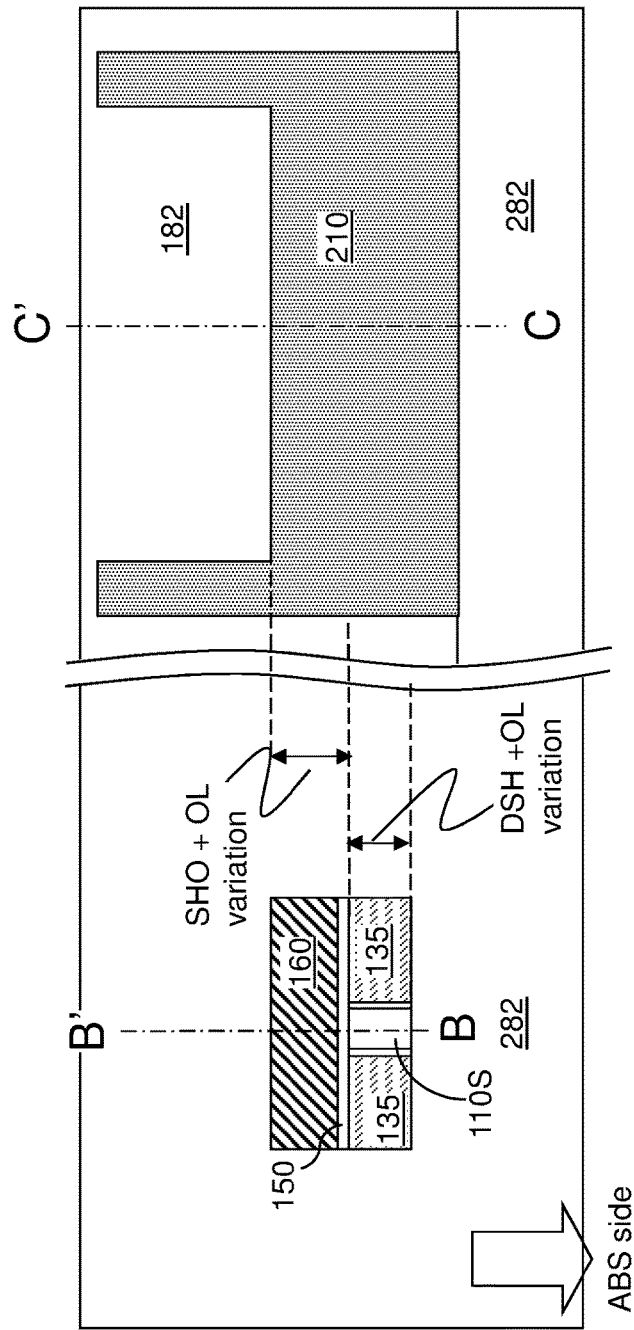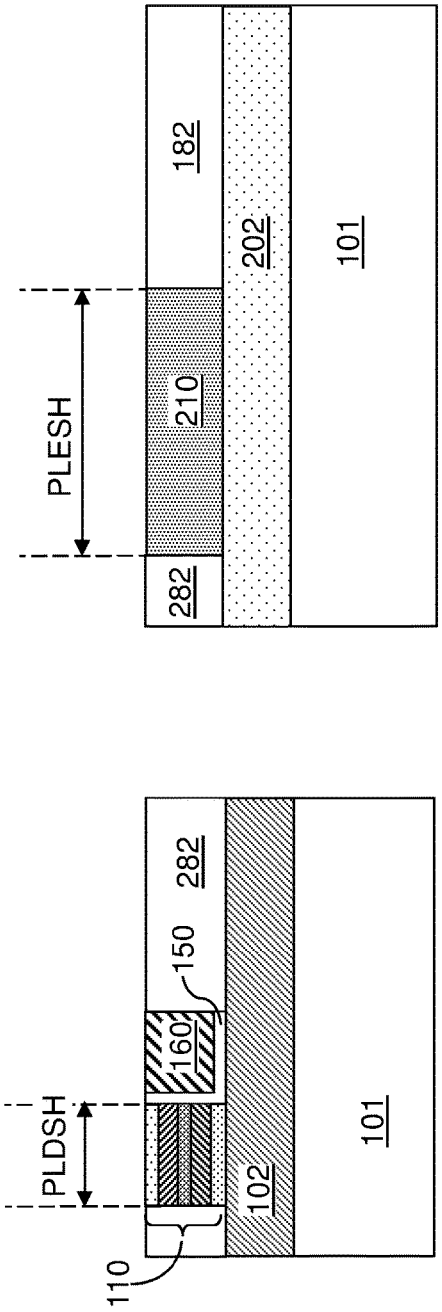

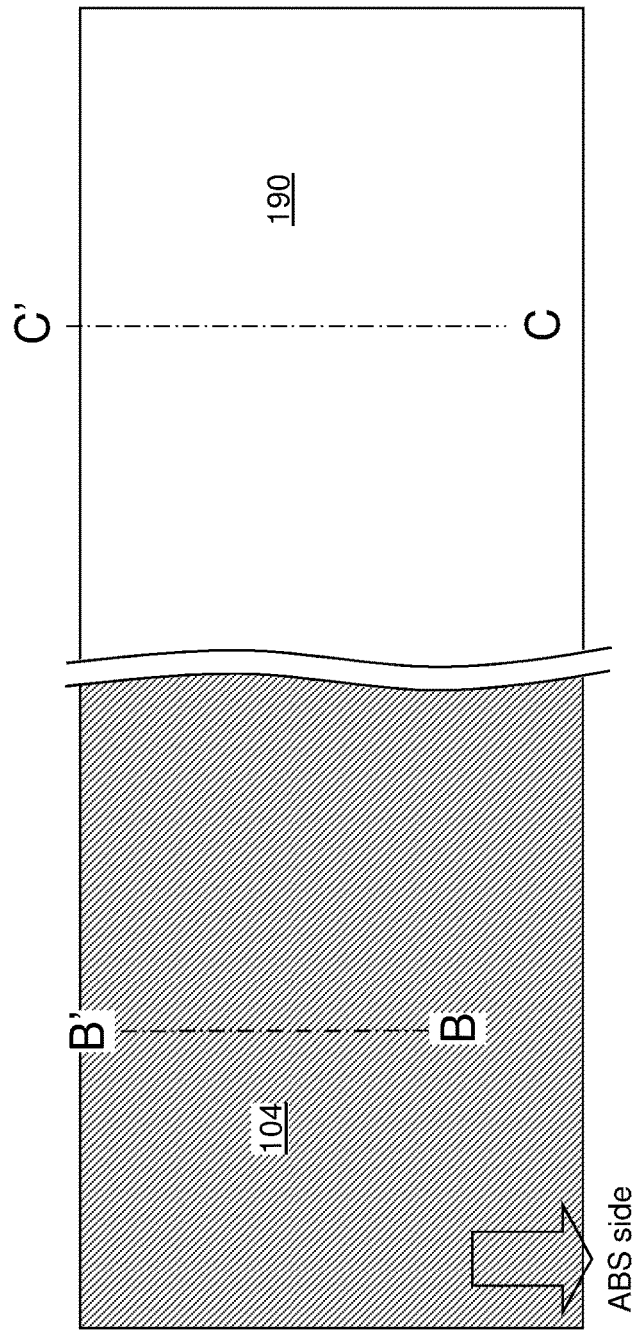
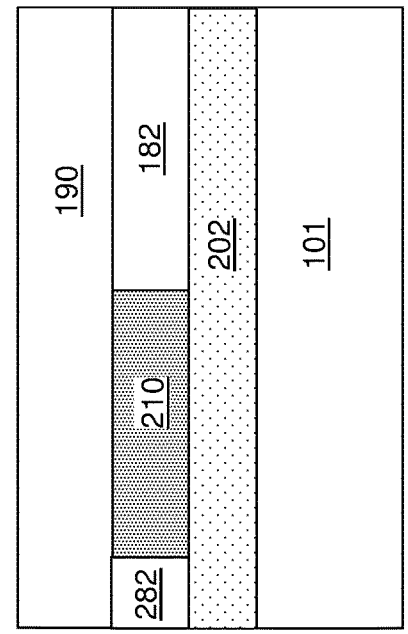
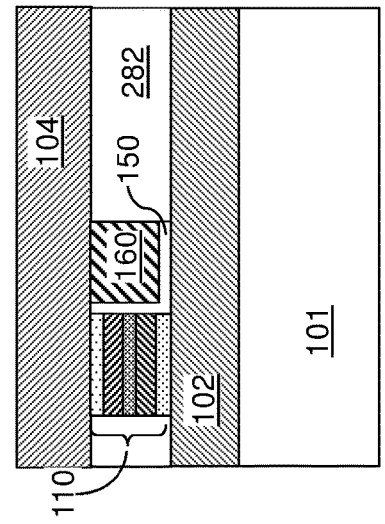

METHOD OF FORMING A MAGNETIC HEAD

FIELD

The present disclosure relates generally to the field of magnetic recording devices, and particularly to a method of manufacturing a magnetic head employing electronic lapping guides.

BACKGROUND

Magnetic heads are employed to operate hard disk drives. A magnetic head can include a reading head and a recording (i.e., writing) head. General structures and method of manufacture for prior art magnetic heads are disclosed, for example, in U.S. Patent Application Publication Nos. 2004/0097173 A1; 2007/0230063 A1; 2011/0294398 A1; and 2015/0260757 A1 and U.S. Pat. Nos. 8,291,743 B1; 8,361,541 B1; 8,443,510 B1; 8,717,709 B1; 8,735,565 B2; 8,964,333 B1; 9,153,261 B1; 9,321,146 B2; and 9,390,733 B2 the entire contents of which are incorporated herein.

Generally speaking, use of a rear bias material for a reading head requires use of a thin backside insulating layer. Incorporation of the material of the thin backside insulating layer and the rear bias material in electronic lapping guide (ELG) structure can result in electrical shorts through the thin backside insulating layer, and consequent error in estimation of true stripe height in sensor devices.

For example, in the case of a reading head employing dual free layers, a hard magnetic material such as a cobalt-platinum alloy is employed to fill a volume behind a read sensor and to form a rear bias material portion. The rear bias material portion provides a magnetic bias field to the read sensor. However, deposition of this hard magnetic material behind the backside edge of electronic lapping guides (ELG's) can cause a short with the ELG, which can misguide the lapping process that provides the target stripe height for the read sensors.

SUMMARY

According to an aspect of the present disclosure, a method of forming a magnetic head includes depositing a sensor layer stack including at least one free layer over a substrate in a sensor region, patterning the sensor layer stack to form a read sensor stripe, depositing an electronic lapping guide (ELG) layer over the substrate in an ELG region, forming a backside edge of a read sensor by patterning the read sensor stripe in a first patterning step, forming a backside insulator layer and a rear bias magnetic material portion over the backside edge of the read sensor, forming a backside edge of an ELG by patterning the ELG layer in the ELG region in a second patterning step that is different from the first patterning step, simultaneously forming a front side edge of the read sensor and a front side edge of the ELG by patterning the read sensor stripe and the ELG layer, and lapping the read sensor and the ELG to provide an air bearing surface of a read sensor employing the ELG to control a final stripe height of the read sensor.

BRIEF DESCRIPTION OF THE DRAWINGS

FIG. 3A illustrates a top-down view of a first exemplary structure for forming a magnetic head after formation of a sensor layer stack according to a first embodiment of the present disclosure.

FIG. 3B is a vertical cross-sectional view of a sensor region of the first exemplary structure along the plane B-B' of FIG. 3A.

FIG. 3C is a vertical cross-sectional view of an electronic lapping guide (ELG) region along the plane C-C' of the first exemplary structure of FIG. 3A.

FIG. 5A illustrates a top-down view of the first exemplary structure after application and patterning of a sensor-backside-pattern photoresist layer according to the first embodiment of the present disclosure.

FIG. 5B is a vertical cross-sectional view of the sensor region of the first exemplary structure along the plane B-B' of FIG. 5A.

FIG. 5C is a vertical cross-sectional view of the ELG region of the first exemplary structure along the plane C-C' of FIG. 5A.

FIG. 6A illustrates a top-down view of the first exemplary structure after patterning a sensor backside edge according to the first embodiment of the present disclosure.

FIG. 6B is a vertical cross-sectional view of the sensor region of the first exemplary structure along the plane B-B' of FIG. 6A.

FIG. 6C is a vertical cross-sectional view of the ELG region of the first exemplary structure along the plane C-C' of FIG. 6A.

FIG. 7A illustrates a top-down view of the first exemplary structure after deposition of a continuous insulating material layer and a rear bias magnetic material according to the first embodiment of the present disclosure.

FIG. 7B is a vertical cross-sectional view of the sensor region of the first exemplary structure along the plane B-B' of FIG. 7A.

FIG. 7C is a vertical cross-sectional view of the ELG region of the first exemplary structure along the plane C-C' of FIG. 7A.

FIG. 8A illustrates a top-down view of the first exemplary structure after lift-off of the sensor-backside-pattern photoresist layer and formation of a backside insulating layer, a rear bias magnetic material portion, a sacrificial insulating layer, and a sacrificial magnetic material portion according to the first embodiment of the present disclosure.

FIG. 8B is a vertical cross-sectional view of the sensor region of the first exemplary structure along the plane B-B' of FIG. 8A.

FIG. 8C is a vertical cross-sectional view of the ELG region of the first exemplary structure along the plane C-C' of FIG. 8A.

FIG. 9A illustrates a top-down view of the first exemplary structure after application and patterning of an ELG-backside-pattern photoresist layer according to the first embodiment of the present disclosure.

FIG. 9B is a vertical cross-sectional view of the sensor region of the first exemplary structure along the plane B-B' of FIG. 9A.

FIG. 9C is a vertical cross-sectional view of the ELG region of the first exemplary structure along the plane C-C' of FIG. 9A.

FIG. 10A illustrates a top-down view of the first exemplary structure after patterning an ELG backside edge according to the first embodiment of the present disclosure.

FIG. 10B is a vertical cross-sectional view of the sensor region of the first exemplary structure along the plane B-B' of FIG. 10A.

FIG. 10C is a vertical cross-sectional view of the ELG region of the first exemplary structure along the plane C-C' of FIG. 10A.

FIG. 11A illustrates a top-down view of the first exemplary structure after deposition of a first dielectric material according to the first embodiment of the present disclosure.

FIG. 11B is a vertical cross-sectional view of the sensor region of the first exemplary structure along the plane B-B' of FIG. 11A.

FIG. 11C is a vertical cross-sectional view of the ELG region of the first exemplary structure along the plane C-C' of FIG. 11A.

FIG. 12A illustrates a top-down view of the first exemplary structure after lift-off of the ELG-backside-pattern photoresist layer and formation of a first dielectric material portion according to the first embodiment of the present disclosure.

FIG. 12B is a vertical cross-sectional view of the sensor region of the first exemplary structure along the plane B-B' of FIG. 12A.

FIG. 12C is a vertical cross-sectional view of the ELG region of the first exemplary structure along the plane C-C' of FIG. 12A.

FIG. 13A illustrates a top-down view of the first exemplary structure after application and patterning of a front-edge-pattern photoresist layer according to the first embodiment of the present disclosure.

FIG. 13B is a vertical cross-sectional view of the sensor region of the first exemplary structure along the plane B-B' of FIG. 13A.

FIG. 13C is a vertical cross-sectional view of the ELG region of the first exemplary structure along the plane C-C' of FIG. 13A.

FIG. 14A illustrates a top-down view of the first exemplary structure after patterning a sensor front edge and an ELG front side edge according to the first embodiment of the present disclosure.

FIG. 14B is a vertical cross-sectional view of the sensor region of the first exemplary structure along the plane B-B' of FIG. 14A.

FIG. 14C is a vertical cross-sectional view of the ELG region of the first exemplary structure along the plane C-C' of FIG. 14A.

FIG. 15A illustrates a top-down view of the first exemplary structure after deposition of a second dielectric material according to the first embodiment of the present disclosure.

FIG. 15B is a vertical cross-sectional view of the sensor region of the first exemplary structure along the plane B-B' of FIG. 15A.

FIG. 15C is a vertical cross-sectional view of the ELG region of the first exemplary structure along the plane C-C' of FIG. 15A.

FIG. 16A illustrates a top-down view of the first exemplary structure after lift-off of the front-edge-pattern photoresist layer and formation of a second dielectric material portion according to the first embodiment of the present disclosure.

FIG. 16B is a vertical cross-sectional view of the sensor region of the first exemplary structure along the plane B-B' of FIG. 16A.

FIG. 16C is a vertical cross-sectional view of the ELG region of the first exemplary structure along the plane C-C' of FIG. 16A.

FIG. 17A illustrates a top-down view of the first exemplary structure after formation of a second magnetic shield and a second dielectric isolation layer according to the first embodiment of the present disclosure.

FIG. 17B is a vertical cross-sectional view of the sensor region of the first exemplary structure along the plane B-B' of FIG. 17A.

FIG. 17C is a vertical cross-sectional view of the ELG region of the first exemplary structure along the plane C-C' of FIG. 17A.

FIG. 18A illustrates a top-down view of the first exemplary structure after performing a lapping process to form an air bearing surface according to the first embodiment of the present disclosure.

FIG. 18B is a vertical cross-sectional view of the sensor region of the first exemplary structure along the plane B-B' of FIG. 18A.

FIG. 18C is a vertical cross-sectional view of the ELG region of the first exemplary structure along the plane C-C' of FIG. 18A.

FIG. 19A illustrates a top-down view of a second exemplary structure after application and patterning of an ELG-backside-pattern photoresist layer according to a second embodiment of the present disclosure.

FIG. 19B is a vertical cross-sectional view of the sensor region of the second exemplary structure along the plane B-B' of FIG. 19A.

FIG. 19C is a vertical cross-sectional view of the ELG region of the second exemplary structure along the plane C-C' of FIG. 19A.

FIG. 22A illustrates a top-down view of the second exemplary structure after lift-off of the ELG-backside-pattern photoresist layer and formation of a first dielectric material portion according to the second embodiment of the present disclosure.

FIG. 22B is a vertical cross-sectional view of the sensor region of the second exemplary structure along the plane B-B' of FIG. 22A.

FIG. 22C is a vertical cross-sectional view of the ELG region of the second exemplary structure along the plane C-C' of FIG. 22A.

FIG. 24A illustrates a top-down view of the second exemplary structure after patterning a sensor backside edge according to the second embodiment of the present disclosure.

FIG. 24B is a vertical cross-sectional view of the sensor region of the second exemplary structure along the plane B-B' of FIG. 24A.

FIG. 24C is a vertical cross-sectional view of the ELG region of the second exemplary structure along the plane C-C' of FIG. 24A.

FIG. 25A illustrates a top-down view of the second exemplary structure after deposition of a continuous insulating material layer and a rear bias magnetic material according to the second embodiment of the present disclosure.

FIG. 25B is a vertical cross-sectional view of the sensor region of the second exemplary structure along the plane B-B' of FIG. 25A.

FIG. 25C is a vertical cross-sectional view of the ELG region of the second exemplary structure along the plane C-C' of FIG. 25A.

FIG. 26A illustrates a top-down view of the second exemplary structure after lift-off of the sensor-backside-pattern photoresist layer and formation of a backside insulating layer and a rear bias magnetic material portion according to the second embodiment of the present disclosure.

FIG. 26B is a vertical cross-sectional view of the sensor region of the second exemplary structure along the plane B-B' of FIG. 26A.

FIG. 26C is a vertical cross-sectional view of the ELG region of the second exemplary structure along the plane C-C' of FIG. 26A.

FIG. 29A illustrates a top-down view of the second exemplary structure after deposition of a second dielectric material according to the second embodiment of the present disclosure.

FIG. 29B is a vertical cross-sectional view of the sensor region of the second exemplary structure along the plane B-B' of FIG. 29A.

FIG. 29C is a vertical cross-sectional view of the ELG region of the second exemplary structure along the plane C-C' of FIG. 29A.

FIG. 30A illustrates a top-down view of the second exemplary structure after lift-off of the front-edge-pattern photoresist layer and formation of a second dielectric material portion according to the second embodiment of the present disclosure.

FIG. 30B is a vertical cross-sectional view of the sensor region of the second exemplary structure along the plane B-B' of FIG. 30A.

FIG. 30C is a vertical cross-sectional view of the ELG region of the second exemplary structure along the plane C-C' of FIG. 30A.

FIG. 31A illustrates a top-down view of the second exemplary structure after formation of a second magnetic shield and a second dielectric isolation layer according to the second embodiment of the present disclosure.

FIG. 31B is a vertical cross-sectional view of the sensor region of the second exemplary structure along the plane B-B' of FIG. 31A.

FIG. 31C is a vertical cross-sectional view of the ELG region of the second exemplary structure along the plane C-C' of FIG. 31A.

DETAILED DESCRIPTION

Figure 1:
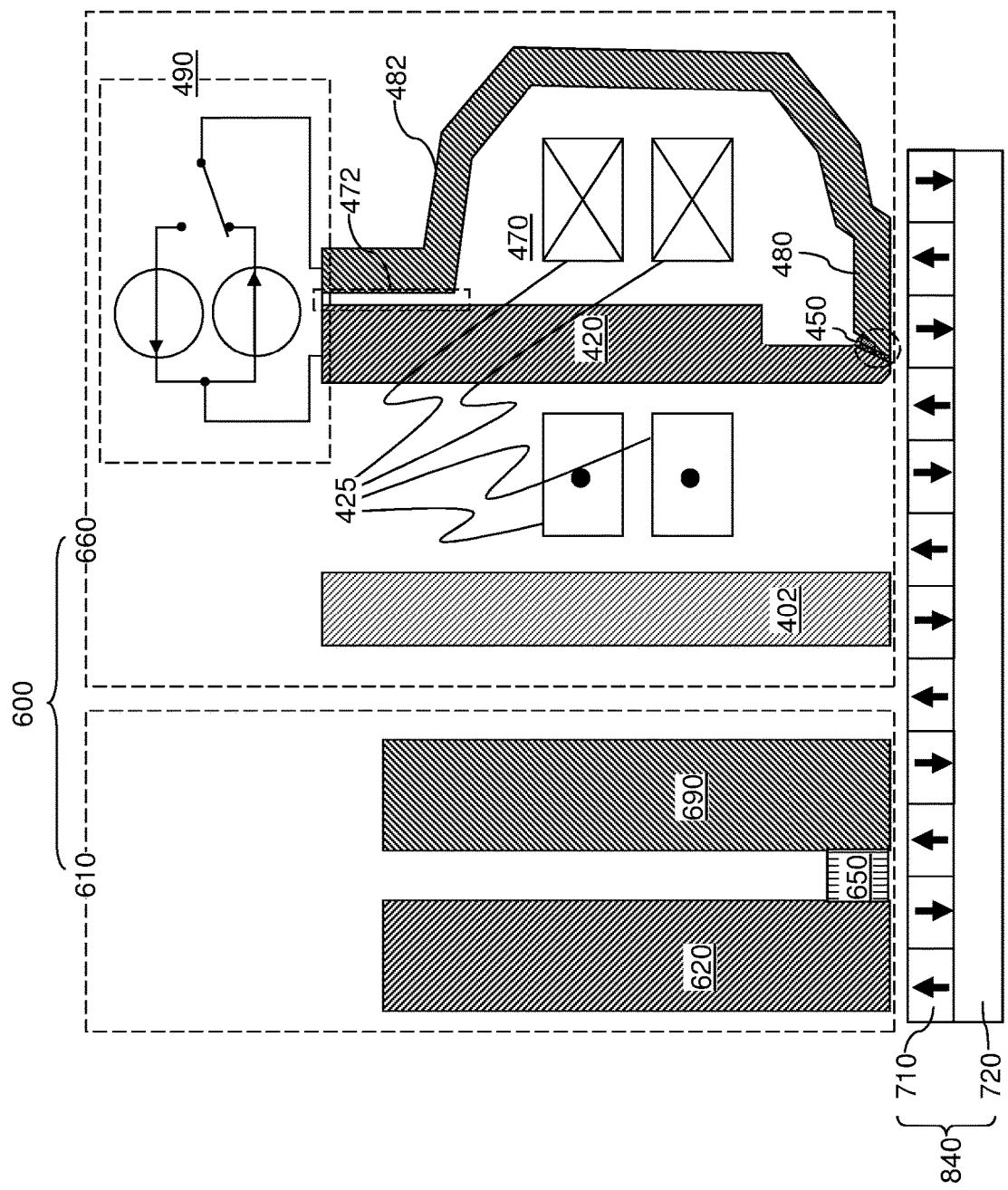
FIG. 1 is an in-track vertical cross-sectional view of an exemplary magnetic head of the present disclosure.

As discussed above, the present disclosure is directed to a method of manufacturing a magnetic head employing an electronic lapping guide, the various aspects of which are described below. According to an aspect of the present disclosure, formation of ELG back edge is decoupled from formation of read sensor back edge. This decoupling allows each backside edge to be optimized independently without concern for electrical shorts with the ELG. The stripe height offset between the ELG and the read sensor is characterized flash field by flash field during processing employing test devices. The data generated by the test devices can fed forward for lapping control of product devices. The methods of the present disclosure enable separate processing of read sensors and ELGs, and allow separate optimizations in design and wider process windows.

The drawings are not drawn to scale. Multiple instances of an element may be duplicated where a single instance of the element is illustrated, unless absence of duplication of elements is expressly described or clearly indicated otherwise. Ordinals such as "first," "second," and "third" are employed merely to identify similar elements, and different ordinals may be employed across the specification and the claims of the instant disclosure. The same reference numerals refer to the same element or similar element. Unless otherwise indicated, elements having the same reference numerals are presumed to have the same composition. As used herein, a first element located "on" a second element can be located on the exterior side of a surface of the second element or on the interior side of the second element. As used herein, a first element is located "directly on" a second element if there exist a physical contact between a surface of the first element and a surface of the second element.

As used herein, a "layer" refers to a material portion including a region having a thickness. A layer may extend over the entirety of an underlying or overlying structure, or may have an extent less than the extent of an underlying or overlying structure. Further, a layer may be a region of a homogeneous or inhomogeneous continuous structure that has a thickness less than the thickness of the continuous structure. For example, a layer may be located between any pair of horizontal planes between, or at, a top surface and a bottom surface of the continuous structure. A layer may extend horizontally, vertically, and/or along a tapered surface. A substrate may be a layer, may include one or more layers therein, or may have one or more layer thereupon, thereabove, and/or therebelow.

Referring to FIG. 1, an in-track vertical cross-sectional view of an exemplary magnetic head of 600 the present disclosure is illustrated. The magnetic head 600 is positioned over a recording track 840 on a disc media. The magnetic head 600 comprises, from the leading side of the head (i.e., the left side of FIG. 1), a reading head 610 and a recording (i.e., writing) head 660. The reading head comprises a lower reading shield 620, a read sensor 650 (i.e., a reading element), and an upper reading shield 690. The recording head can comprise an optional auxiliary pole 402, a magnetic coil 425 that is wound around a main pole 420, a record element 450, a trailing shield 480 which may be integrated with an upper pole 482. The record element 450 is formed between the main pole 420 and the trailing shield 480. An insulating material portion 470 is provided around the magnetic coil 425 between the main pole 420 and the trailing shield 480.

In one embodiment, the magnetic head 600 may be configured for microwave assisted magnetic recording (MAMR) employing a spin torque oscillator (STO), as shown in FIG. 1. In this embodiment, the record element 450 includes a microwave-generating spin torque oscillator (STO) element, and the main pole 420 and trailing shield 480 serve as first and second electrodes for flowing electrical current through the record element 450 during recording. A bias circuitry 490 can be provided at the end of the main pole 420 and the trailing shield 480. An insulating material layer 472 can be provided between end portions of the first and second electrodes, which are embodied as the main pole 420 and the trailing shield 480.

The read sensor 650 can include a layer stack that includes a tunnel magnetoresistance (TMR) device or a giant magnetoresistance (GMR) device. During operation of the recording head 660, if perpendicular magnetic recording is employed, a magnetic field emitted from the main pole 420 passes through a magnetic recording layer 710 and a soft magnetic underlayer 720 of the recording track 840 of the disc media. A magnetization pattern (represented by arrows) is recorded in the magnetic recording layer 710. In a MAMR system, the magnetization pattern is recorded when electrical current flows between the main pole 420 and the upper pole 482 to the trailing shield 480, and a high-frequency magnetic field from the STO element of the record element 450 is applied to the recording track 840 to temporarily reduce the coercivity of the recording medium.

Figure 2:
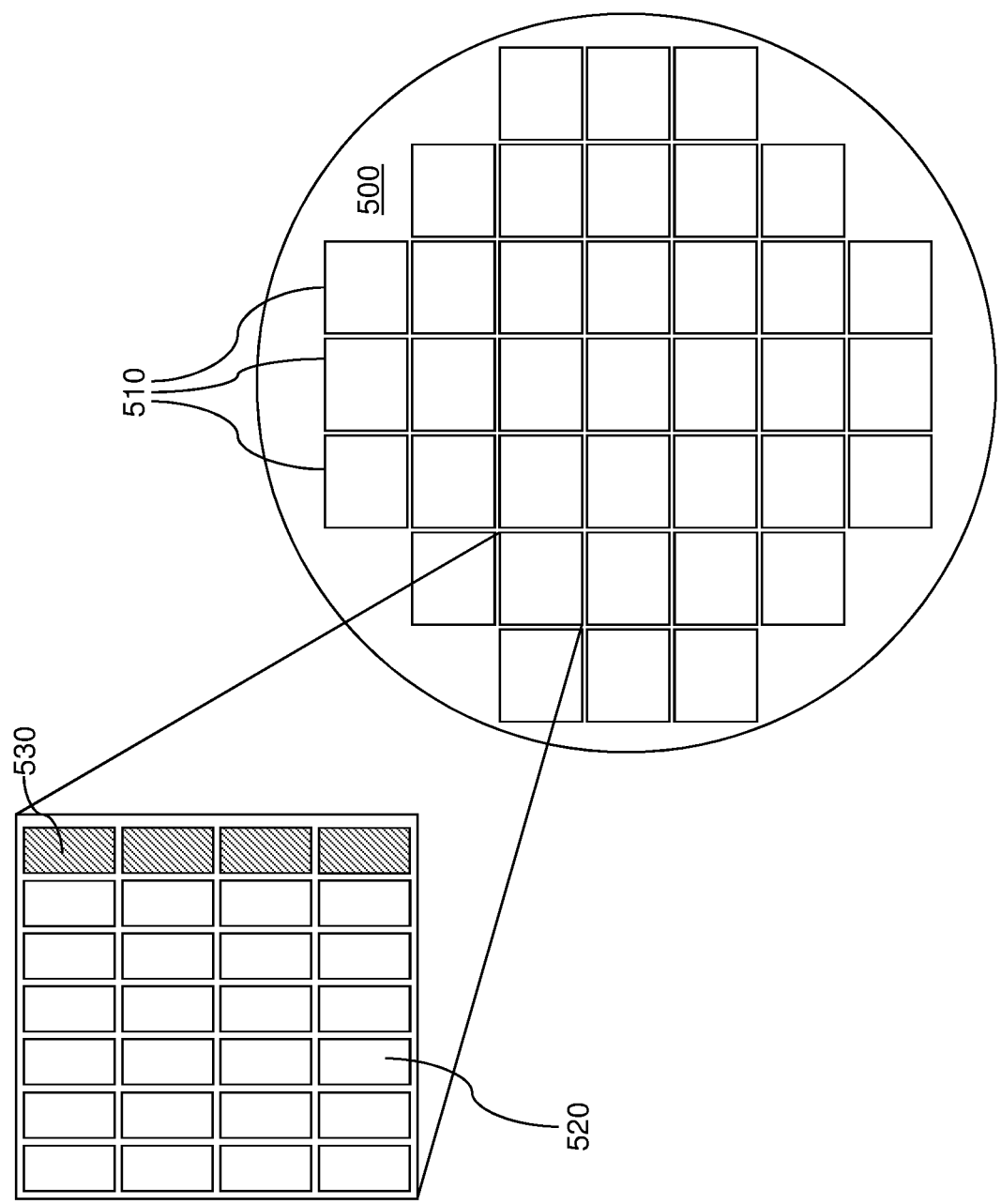
FIG. 2 is top-down view of a substrate for forming magnetic heads during manufacture with multiple flash fields (i.e., lithographic dies) for lithographic purposes. The inset illustrates multiple in-process magnetic heads and test devices within a flash field according to an embodiment of the present disclosure.

Referring to FIG. 2, a substrate 500 for forming magnetic heads is illustrated during manufacture. Multiple flash fields are illustrated. Each flash field corresponds to an individual lithographic die 510 that is lithographically patterned in a single lithographic exposure within a stepper. At each lithographic exposure level, the same lithographic mask can be employed to provide the same lithographic pattern within each lithographic die 510. The lithographic exposure process is performed flash field by flash field. If there is a pre-existing lithographic pattern, the new lithographic pattern is aligned to one of the pre-existing patterns. Overlay variation during lithographic alignment is inherent in the lithographic exposure process, and causes die to die variations in the manufactured devices.

Each lithographic die can include a plurality of product devices 520 and test devices 530. The product devices 520 include components for forming at least one magnetic including a reading head containing a read sensor. In one embodiment, the magnetic head may include both a reading head and a recording head, such as in the magnetic head 600 shown in FIG. 1. The test devices 530 include modifications of the magnetic heads 600 in order to facilitate manufacture of the magnetic heads 600 with accurate stripe height in a manner to be described below. The test devices include test read sensors at least some of which have a different stripe height than the read sensors of the product devices. In one embodiment, the test devices 530 can be arranged into a test column in each flash field and can be referred to as "special column devices". Due to overlay variations from flash field to flash field during lithographic alignments, the data generated from the test devices 530 is applicable only to the product devices 520 formed within the same flash field, i.e., within the same lithographic die 510. According to an embodiment of the present disclosure, a method for correlating data from the test devices 530 with data from electronic lapping guides in the product devices 520 is provided, which can be employed to provide the target stripe height to each reading head 550 in a respective lithographic die 510.

As will be described below in detail, the back edge of a read sensor and the back edge of an ELG are patterned in two separate lithographic patterning steps employing two different lithographic masks to avoid short circuiting of the ELG to the rear bias magnetic material.

Referring to FIGS. 3A-3C, a first exemplary structure for forming a reading head is illustrated according to a first embodiment of the present disclosure. An instance of the first exemplary structure shown in FIGS. 3A-3C can be formed within each product device 520 for each lithographic die (i.e., flash field) 510. Further, a modified version of the first exemplary structure in which the offsets among patterned structures are altered can be formed within each test device 530 for each lithographic die 520. Thus, each lithographic die 510 can include at least as many instances of the first exemplary structure as the total number of product devices 520 therein and at least as many instances of modified versions of the first exemplary structure as the total number of test devices 530. As discussed above, each lithographic die 510 corresponds to a single flash field, or a lithographic exposure field, that is patterned by a single lithographic exposure and development for each lithographic mask. The direction of the air bearing surface (ABS) to be subsequently formed by lapping is shown by an arrow.

The first exemplary structure includes a substrate 101, which can be, for example, an aluminum titanium carbide substrate. A first magnetic shield 102 is formed within a sensor region of the first exemplary structure. The first magnetic shield 102 includes a soft magnetic material, and may have a thickness in a range from 200 nm to 2,000 nm, although lesser and great thicknesses can also be employed. The first magnetic shield 102 can be subsequently patterned to provide the lower reading shield 620 of a magnetic head 600 in a finished product. A first dielectric isolation layer 202 is formed within an electronic lapping guide (ELG) region of the first exemplary structure. The first dielectric isolation layer 202 includes an electrically insulating material such as aluminum oxide. In one embodiment, the top surface of the first dielectric isolation layer 202 can be substantially coplanar with a top surface of the first magnetic shield 102.

A sensor layer stack 110 can be deposited over the first magnetic shield 102 in the sensor region by sequential deposition of material layers. The sensor layer stack 110 can include at least one ferromagnetic free layer. Generally, any suitable material layer stack for forming a reading element can be employed for the sensor layer stack 110. In one embodiment, the sensor layer stack may include 110 an antiferromagnetic (AFM) layer, a ferromagnetic pinned layer, a ferromagnetic free layer and at least one of a tunneling barrier (e.g., magnesium oxide for a tunneling magnetoresistive (TMR) sensor) or a conductive, non-magnetic spacer layer (for a giant magnetoresistive (GMR) sensor)) between the free layer and the pinned layer. Optional underlying seed layer(s) and/or overlying capping layer(s) may also be formed as part of the sensor layer stack. In another embodiment, a dual free layer structure is employed to form a reading element. In this embodiment shown in FIG. 3B, the layers within dual free layer sensor layer stack 110 can include a backside non-magnetic electrically conductive (e.g., seed) layer 111, a first ferromagnetic free layer 112, a non-magnetic electrically conductive spacer layer 114, a second ferromagnetic free layer 116, and a front side non-magnetic electrically conductive (e.g., cap) layer 118. The sensor layer stack 110 can be deposited by a series of layer deposition processes such as chemical vapor deposition, atomic layer deposition, and/or physical vapor deposition. The same layers may be used for the read sensors of the product devices 520 as for test device (i.e., test stripes) of the test device 530. However, as will be described below, at least some of the test stripes of the test devices 530 have a different stripe height than the stripe height of the read sensor stripe height of the product devices 520.

The sensor layer stack 110 can be removed from the ELG area, and an electronic lapping guide (ELG) layer 210L is deposited over the first dielectric isolation layer 202. The ELG layer 210L includes a conductive material that may, or may not, be a magnetic material. For example, the ELG layer 210L can include copper, aluminum, chromium, tantalum, titanium, tungsten, another elemental metal, or an intermetallic alloy of at least two elemental metals. The ELG layer 210L is removed from the sensor region by a lithographic patterning process.

Alternatively, the ELG layer 210L may be formed over the substrate 101 prior to formation of the sensor layer stack 110, and can be removed from the sensor region by lithographic patterning. The ELG region includes a remaining portion of the ELG layer 210L. In this case, the sensor layer stack 110 is formed on the first magnetic shield 102 after patterning of the ELG layer 210L. Subsequently, portions of the sensor layer stack 110 can be removed from the ELG region by lithographic patterning.

Figure 4A:
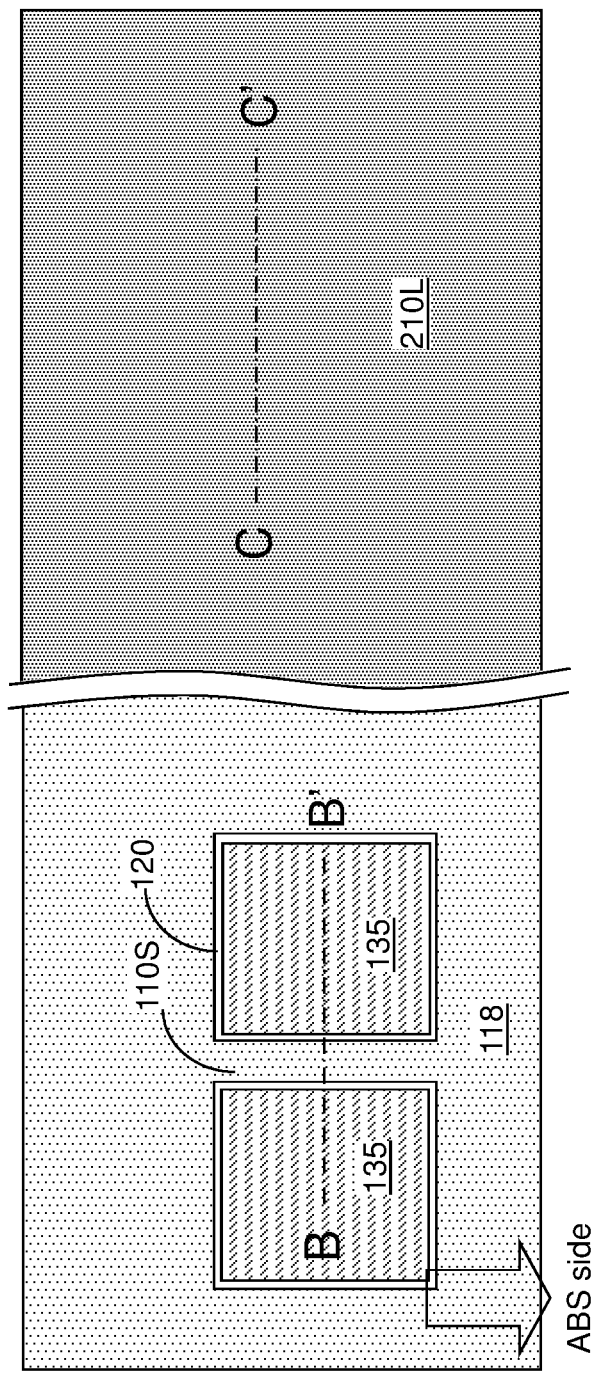
FIG. 4A illustrates a top-down view of the first exemplary structure after formation of at least one pair of magnetic bias material portions according to the first embodiment of the present disclosure.
Figure 4B:
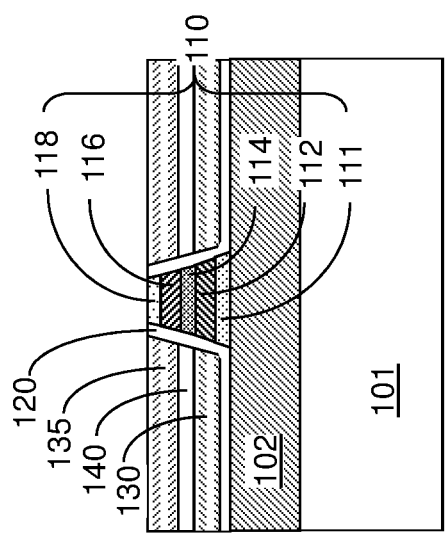
FIG. 4B is a vertical cross-sectional view of the sensor region of the first exemplary structure along the plane B-B' of FIG. 4A.
Figure 4C:
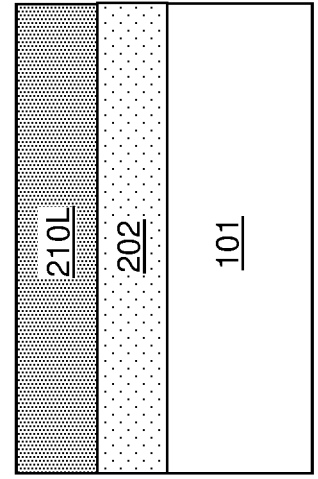
FIG. 4C is a vertical cross-sectional view of the ELG region of the first exemplary structure along the plane C-C' of FIG. 4A.

Referring to FIGS. 4A-4C, the sensor layer stack 110 is patterned to form a read sensor stripe 110S by forming a pair of recess cavities through the stack 110. The pair of recess cavities can be laterally spaced from each other by a narrow stripe 110S (i.e., the read sensor stripe) of the remaining portions of the sensor layer stack 110. In one embodiment, the pair of recess cavities can be laterally spaced from each other by a uniform spacing. The width of the narrow stripe 110S can be the width along the cross-track direction of the read element to be subsequently formed. In one embodiment, the pair of recess cavities may be formed with tapered sidewalls.

A series deposition processes and patterning processes can be repeated to form a magnetic bias layer stack in each of the recess cavities. At least one side bias structure, such as a hard or soft magnetic bias structure is formed in the recess cavities. For a dual free layer magnetic bias layer stack, a pair of magnetic bias material portions (130, 135) is formed in the respective recess cavities. For example, one or more magnetic materials are deposited and planarized in each of the recess cavities at least once to form the at least one pair of magnetic bias material portions (130, 135). For example, the metal bias layer stack can include, from bottom to top, an electrical isolation dielectric layer 120, a first magnetic bias material portion 130, a non-magnetic spacer material layer 140, and a second magnetic bias material portion 135. The electrical isolation dielectric layer 120 is formed on the top surfaces of the first magnetic shield 102 and on the sidewalls of the sensor layer stack 110, and includes a dielectric material (e.g., aluminum oxide) that provides electrical isolation thereacross. The first magnetic bias material portion 130 includes a first soft magnetic material, and is formed generally at the level of the first free layer 112. In a final device, the two portions of the first magnetic bias material portion 130 provide a magnetic bias to the first free layer 112 along the horizontal direction, which is the cross-track direction during operation of the magnetic head 600. The non-magnetic spacer material layer 140 can provide, by selecting a particular thickness in the device, an antiferromagnetic coupling between the first magnetic bias material portion 130 and the second magnetic bias material portion 135. The second magnetic bias material portion 135 includes a second soft magnetic material, and is formed generally at the level of the second free layer 116. In the final device, the two portions of the second magnetic bias material portion 135 to provide a magnetic bias to the second free layer 116 along the horizontal direction, which is the cross-track direction during operation of the magnetic head 600. The top surfaces of the second magnetic bias material portion 135 can be substantially coplanar with the top surface of the sensor layer stack.

Referring to FIGS. 5A-5C, a photoresist layer for patterning the backside edge of each magnetic sensor is applied and patterned over the first exemplary structure. This photoresist layer is herein referred to as a sensor-backside-pattern photoresist layer 137. The sensor-backside-pattern photoresist layer 137 may also be referred to as a first photoresist layer. As discussed above, the multiple flash fields, i.e., lithographic exposure fields, on the substrate 500 are patterned one at a time employing a lithographic exposure tool that patterns the flash fields one at a time. Within the lithographic mask (reticle) that defines the pattern in the entire flash field, the pattern of openings for the product devices 520 can be the same as the pattern of openings for the test devices 530 (which can be arranged into a test column in each flash field and can be referred to as "special column devices").

The sensor-backside-pattern photoresist layer 137 is applied and patterned over the at least one pair of magnetic bias material portions (130, 135), over the sensor layer stack 110 including the portion of the sensor layer stack located between the at least one pair of magnetic bias material portions, and over the ELG layer 210L. For each of the product devices 520 and for each of the test devices 530, the sensor-backside-pattern photoresist layer 137 includes an opening within the respective sensor region, and may optionally include another opening within the respective ELG region. The opening within each sensor region can have a straight edge that is parallel to the air bearing surface (ABS), which is perpendicular to the direction of the cross-sectional plane B-B' in FIG. 5A. In one embodiment, the opening within each sensor region can have a rectangular shape, and includes backside edges of the at least one pair of magnetic bias material portions (130, 135) therein. As used herein, a "backside" or "back side" refers to a side that is distal from the air bearing surface to be subsequently formed, and a "front side" refers to a side that is proximal to the air bearing surface to be subsequently formed. The opening in the ELG region is optional, and if present, may be located generally on the back side an ELG to be subsequently formed. The opening in the ELG region may have a rectangular shape.

Referring to FIGS. 6A-6C, the material layers underlying the sensor-backside-pattern photoresist layer 137 and located above the first magnetic shield 102 and the first dielectric isolation layer 202 are patterned by transferring the pattern of the sensor-backside-pattern photoresist layer 137 therethrough. This patterning step is referred to as a sensor backside edge patterning step, or a first patterning step. In one embodiment, a first ion milling process can be performed employing the sensor-backside-pattern photoresist layer 137 as an ion milling mask layer. The first ion milling process removes regions of the at least one pair of magnetic bias material portions (130, 135) and the sensor layer stack (e.g., the stripe 110S) that are not covered by the sensor-backside-pattern photoresist layer 137. A backside edge of the sensor layer stack (e.g., the stripe 110S), which is herein referred to as a sensor backside edge SBE, is formed at a periphery of a recess cavity that is formed in the sensor region. The sensor backside edge SBE constitutes the backside edge of the read sensor to be subsequently formed, and comprises sidewalls of remaining portions of the at least one pair of magnetic bias material portions (130, 135) and the sensor layer stack (e.g., the stripe 110S). The sensor backside edge SBE, i.e., the backside edge of the read sensor for each product device 520 and for each test device 530, is formed underneath a respective edge of the sensor-backside-pattern photoresist layer 137. In one embodiment, each sensor backside edge SBE may be vertically coincident with a respective overlying edge of the sensor-backside-pattern photoresist layer 137. In one embodiment, another recess cavity can be formed within the ELG layer 210L concurrently with formation of the backside edge of the read sensor within an area of the opening in the sensor region within each of the product devices 520 and the test devices 530.

Referring to FIGS. 7A-7C, a continuous insulating material layer 150L and a rear bias magnetic material layer 160L are sequentially deposited over the sensor-backside-pattern photoresist layer 137 and in the recess cavities. The continuous insulating material layer 150L is formed directly on the backside edge of the read sensor and within the recess cavity in the sensor region for each product device 520 and for each test device 530. The continuous insulating material layer 150L includes a dielectric material that provides electrical insulation thereacross. For example, the continuous insulating material layer 150L can include aluminum oxide, silicon oxide, or silicon nitride. The continuous insulating material layer 150L can be deposited by a conformal deposition process such as chemical vapor deposition or atomic layer deposition. The thickness of the continuous insulating material layer 150L can be in a range from 3 nm to 30 nm, although lesser and greater thicknesses can also be employed.

The rear bias magnetic material layer 160L includes a magnetic material, which may be a soft magnetic material or hard magnetic material. In one embodiment, the rear bias magnetic material layer 160L can include a hard magnetic material layer. The rear bias magnetic material layer 160L is deposited by an anisotropic deposition process such as sputtering. The direction of deposition of the magnetic material of the rear bias magnetic material layer can be substantially normal to the top surface of the substrate 101. The thickness of the rear bias magnetic material layer 160L, as measured at horizontal portions, can be about the same as the thickness of the sensor layer stack 110, which may be about the same as the thickness of the ELG layer 210L.

Referring to FIGS. 8A-8C, the sensor-backside-pattern photoresist layer 137 is lifted off. Portions of the rear bias magnetic material layer 160L and the continuous insulating material layer 150L located on the top surface of, or on the sidewalls of, the sensor-backside-pattern photoresist layer 137 are removed during the lift-off process. Each remaining portion of the continuous insulating material layer 150L located within a respective recess cavity in a sensor region constitutes a backside insulating layer 150. In case a recess cavity is provided in the ELG region, each remaining portion of the continuous insulating material layer 150L located within a respective recess cavity in an ELG region constitutes a sacrificial insulating layer 250. Each remaining portion of the rear bias magnetic material layer 160L located within a respective recess cavity in a sensor region, and directly on a respective backside insulating layer 150, constitutes a rear bias magnetic material portion 160. In case a recess cavity is provided in the ELG region, each remaining portion of the rear bias magnetic material layer 160L located within a respective recess cavity in an ELG region, and directly on a respective sacrificial insulating layer 250, constitutes a sacrificial magnetic material portion 260.

A combination of a backside insulator layer 150 and a rear bias magnetic material portion 160 is provided on each sensor backside edge SBE, i.e., the backside edge of each read sensor. Thus, a rear bias magnetic material portion 160 is formed on a sidewall of a backside insulating layer 150 by depositing and patterning a hard magnetic material. Each rear bias magnetic material portion 160 is formed adjacent to the backside edge of the read sensor. In case a recess cavity is provided in the ELG region, a sacrificial magnetic material portion is formed in the ELG region.

Referring to FIGS. 9A-9C, a photoresist layer for patterning the backside edge of each ELG is applied and patterned over the first exemplary structure. This photoresist layer is herein referred to as an ELG-backside-pattern photoresist layer 147. The ELG-backside-pattern photoresist layer 147 may also be referred to as a second photoresist layer.

The ELG-backside-pattern photoresist layer 147 is applied and patterned over the over the ELG layer 210L. For each of the product devices 520 and for each of the test devices 530, the ELG-backside-pattern photoresist layer 147 includes an opening within the respective ELG region. The entirety of the sensor region within each product device 520 and within each test device 530 can be covered by the ELG-backside-pattern photoresist layer 147. The opening within each ELG region can have a straight edge that is parallel to the air bearing surface (ABS), which is perpendicular to the direction of the cross-sectional plane C-C' in FIG. 9A. If a sacrificial insulating layer 250 and sacrificial magnetic material portion 260 are formed within each ELG region, the opening in the respective ELG region can have an area that includes the entire area of the sacrificial insulating layer 250 and the sacrificial magnetic material portion 260 in the ELG region. Thus, the periphery of the opening in the ELG region can be formed outside the outer periphery of the sacrificial insulating layer 250. In one embodiment, the opening within each ELG region can have a rectangular shape.

An edge of the opening in the ELG region is formed proximal to the air bearing surface to be subsequent formed. This edge corresponds to the location of an ELG backside edge to be subsequently formed. The lateral offset between the ELG backside edge and the sensor backside edge SBE along the direction perpendicular to the air bearing surface to be subsequently formed is herein referred to as a stripe height offset SHO.

As discussed above, the multiple flash fields, i.e., lithographic exposure fields, on the substrate (101, 500) are patterned one at a time employing a lithographic exposure tool that patterns the flash fields one at a time. Within the lithographic mask (reticle) that defines the pattern in the entire flash field, the stripe height offset SHO as provided in the design of the lithographic mask for patterning the ELG-backside-pattern photoresist layer 147 can be the same for all product devices 520 and for the test devices 530. Within a given lithographic die 510, the physical stripe height offset SHO in each of product devices 520 and the test devices 530 deviates from the design value (i.e., the design stripe height offset) by the overlay (OL) variation of the lithographic process along the direction perpendicular to the sensor back edges (SBE) that patterns the ELG-backside-pattern photoresist layer 147 with respect the features derived from the sensor-backside-pattern photoresist layer 137. Thus, the physical stripe height offset can be the same for all test devices 530 and the product devices 520 within each flash field, but can be different from flash field to flash field due to lithographic overlay variations.

For example, if the nominal value for the stripe height offset SHO for the product devices is a target SHO (SHO_target), the nominal values for the stripe height offset SHO for the test devices 530 can be in a range from a minimum test target SHO to a maximum test target SHO. In one embodiment, if the maximum deviation for the SHO in the test devices 530 is given by a variation extreme (ve), the range of the minimum test target SHO to the maximum test target SHO for the test devices 530 can include the range from SHO_target−ve to SHO_target+ve. In one embodiment, the variation extreme can be greater than the maximum overlay variation for patterning the ELG-backside-pattern photoresist layer 147 with respect to the patterns derived from the sensor-backside-pattern photoresist layer 137. In this case, even with overlay variations of the ELG-backside-pattern photoresist layer 147 with respect to the pattern generated from the sensor-backside-pattern photoresist layer 137, at least one of the test devices 530 will be printed with a physical stripe height offset value that is close to the target SHO.

Referring to FIGS. 10A-10C, the material layers underlying the ELG-backside-pattern photoresist layer 147 and located above the first magnetic shield 102 and the first dielectric isolation layer 202 are patterned by transferring the pattern of the ELG-backside-pattern photoresist layer 147 therethrough. This patterning step is referred to as an ELG backside edge patterning step, or a second patterning step, which occurs at a different time from and separately from the first patterning step. In one embodiment, a second ion milling process can be performed employing the ELG-backside-pattern photoresist layer 147 as an ion milling mask layer. Regions of the ELG layer 210L that are not covered by the sensor-backside-pattern photoresist layer 147 are removed. Further, the entirety of the sacrificial insulating layer 250 and the sacrificial magnetic material portion 260 can be removed from the ELG region. A backside edge of the ELG layer 210L, which is herein referred to as an ELG backside edge ELGBE, is formed at a periphery of a recess cavity that is formed in the recess region. The ELG backside edge ELGBE constitutes the backside edge of the ELG to be subsequently formed, and comprises a sidewall of remaining portions of the ELG layer. Each ELG backside edge ELGBE for the product devices 520 and the test devices 530 is formed underneath a respective edge of the ELG-backside-pattern photoresist layer 147. In one embodiment, each ELG backside edge ELGBE may be vertically coincident with a respective overlying edge of the ELG-backside-pattern photoresist layer 147.

Within each product device 520 in a same flash field, the backside edge of each ELG is offset from the backside edge of the read sensor by a physical stripe height offset distance that is the sum of the target stripe height offset (target SHO) plus the overlay variation of the ELG-backside-pattern photoresist layer 147 with respect to the pattern of the sensor-backside-pattern photoresist layer 137 as previously formed on the same flash field. The offset of the ELG can be along a direction that is perpendicular to the backside edges of the ELG and the read sensors in the product devices 520. Within each test device 530 in the same flash field, the backside edge of each ELG is offset from the backside edge of the read sensor by a respective physical stripe height offset distance that is the same as the sum of the target stripe height offset (target SHO) plus the overlay variation of the ELG-backside-pattern photoresist layer 147 with respect to the pattern of the sensor-backside-pattern photoresist layer 137 as previously formed on the same flash field plus additional offsets provided by the design for test devices 530 with respect to the product devices 520.

Referring to FIGS. 11A-11C, a first dielectric material layer 180L is deposited over the ELG-backside-pattern photoresist layer 147 and in the recess cavities. The first dielectric material layer 180L can include aluminum oxide, silicon oxide, or silicon nitride. The first dielectric material layer 180L can be deposited by an anisotropic deposition process such as sputtering. The direction of deposition of the dielectric material of the first dielectric material layer 180L can be substantially normal to the top surface of the substrate 101. The thickness of the first dielectric material layer 180L, as measured at horizontal portions, can be about the same as the thickness of the sensor layer stack 110, which may be about the same as the thickness of the ELG layer 210L.

Referring to FIGS. 12A-12C, the ELG-backside-pattern photoresist layer 147 is lifted off. Portions of the first dielectric material layer 180L located on the top surface of, or on the sidewalls of, the ELG-backside-pattern photoresist layer 147 are removed during the lift-off process. Each remaining portion of the first dielectric material layer 180L located within a respective recess cavity in an ELG region constitutes a first dielectric material portion 180. The first dielectric material portion 180 is formed directly on each ELG backside edge ELGBE, i.e., the backside edge of each ELG.

Referring to FIGS. 13A-13C, a photoresist layer for patterning front side edges of read sensors and ELG's is applied and patterned over the first exemplary structure. This photoresist layer is herein referred to as a front-edge-pattern photoresist layer 157. The front-edge-pattern photoresist layer 157 may also be referred to as a third photoresist layer.

The front-edge-pattern photoresist layer 157 is applied and patterned over the over the sensor region and the ELG region of each product device 520 and each test device 530. The patterned front-edge-pattern photoresist layer 157 includes an isolated patterned portion within each sensor region and another isolated patterned portion within each ELG region for each of the product devices 520 and for each of the test devices 530. Each isolated patterned portions of the front-edge-pattern photoresist layer 157 can have a straight edge that is parallel to the air bearing surface (ABS), which is perpendicular to the directions of the cross-sectional planes B-B' and C-C' in FIG. 13A.

A portion of the front-edge-pattern photoresist layer 157 in each sensor region overlies the sensor backside edge SBE. A front side edge of the portion of the front-edge-pattern photoresist layer 157 in each sensor region straddles at least one pair of magnetic bias material portions (130, 135) and a sensor layer stack (e.g., the stripe 110S) therebetween. A back side edge of the portion of the front-edge-pattern photoresist layer 157 in each sensor region straddles a rear bias magnetic material portion 160.

A portion of the front-edge-pattern photoresist layer 157 in each ELG region overlies the ELG backside edge ELGBE. A front side edge of the portion of the front-edge-pattern photoresist layer 157 in each ELG region straddles the ELG layer 210L. A center portion of the back side edge of the portion of the front-edge-pattern photoresist layer 157 in each ELG region straddles the first dielectric material portion 180, and peripheral portions of the back side edge of the portion of portion of the front-edge-pattern photoresist layer 157 in each ELG region can straddle the ELG layer 210L.

The nominal distance between the sensor backside edge SBE and the front side edge of the portion of the front-edge-pattern photoresist layer 157 as provided in the design for the lithographic masks is referred to as a design stripe height DSH. The physical distance between the physical sensor backside edge SBE and the physical front side edge of the portion of the front-edge-pattern photoresist layer 157 is the sum of the design stripe height DSH plus overlay (OL) variation (which may be positive or negative) along the direction perpendicular to the physical sensor backside edge SBE.

Referring to FIGS. 14A-14C, the material layers underlying the front-edge-pattern photoresist layer 157 and located above the first magnetic shield 102 and the first dielectric isolation layer 202 are patterned by transferring the pattern of the front-edge-pattern photoresist layer 157 therethrough. This patterning step is referred to as a front side edge patterning step, or a third patterning step. In one embodiment, a third ion milling process can be performed employing the front-edge-pattern photoresist layer 157 as an ion milling mask layer. Material portions that are not covered by the sensor-backside-pattern photoresist layer 137 are removed.

A sensor front edge SFE is formed on the front side sidewall of a remaining material portion in the sensor region, which constitutes a read sensor. The sensor front edge SFE includes sidewalls of the sensor layer stack (e.g., the stripe 110S) and the at least one pair of magnetic bias material portions (130, 135). An ELG front side edge ELGFE is formed on the front side sidewall of a remaining portion of the ELG layer 210, which constitutes the ELG 210. In one embodiment, each sensor front edge SFE may be vertically coincident with a respective overlying edge of the front-edge-pattern photoresist layer 157. In one embodiment, each ELG front side edge ELGFE may be vertically coincident with a respective overlying edge of the front-edge-pattern photoresist layer 157. The width of each ELG between the ELG backside edge ELGBE and the ELG front side edge ELGFE is herein referred to as an ELG stripe height ESH.

Within each product device 520 in a same flash field, the front side edge FSE of each read sensor is offset from the sensor backside edge SBE (i.e., the backside edge of the read sensor) by a design stripe height DSH plus overlay (OL) variation of the lithographic process that patterns the front-edge-pattern photoresist layer 157 with respect to features formed by the sensor-backside-pattern photoresist layer 137 (such as the sensor backside edge SBE). The design stripe height DSH is the sensor height as provided in the mask design prior to lapping for the patterning purposes, and is about the same as the ideal physical sensor stripe height (target sensor stripe height) in a product plus a maximum overlay variation expected in the lithographic process employed to pattern the front-edge-pattern photoresist layer 157.

As discussed above, the multiple flash fields, i.e., lithographic exposure fields, on the substrate 500 are patterned one at a time employing a lithographic exposure tool that patterns the flash fields one at a time. Thus, the actual overlay variation for each lithographic die 510 (corresponding to a single flash field) varies from among the lithographic dies 510. While a design for a product device 520 is illustrated in FIGS. 13A-13C and 14A-14C, a different design may be employed for test devices 530. For example, the front edges of the front-edge-pattern photoresist layer 157 may be located within a same line for the sensor front edge SFE and for the ELG front edge ELGFE in each test device 530. However, the distance between the front edge SFE and the sensor back edge SBE can be different for different devices 530. Thus, the physical stripe height (which is the sum of a respective design stripe height and the overlay variation along the direction perpendicular to the sensor front edge SFE in each test device 530) can vary from a predetermined minimum value to a predetermined maximum value among the test devices 530 (which are also referred to as special column devices). For product devices 520, the front edges of the front-edge-pattern photoresist layer 157 can be different between the sensor region and ELG region (i.e., between the sensor front edge SFE and the ELG front edge ELGFE) because the actual front edge (i.e., the air bearing surface) of the sensor in the final product is formed by a subsequent lapping process.

Referring to FIGS. 15A-15C, a second dielectric material layer 280L is deposited over the front-edge-pattern photoresist layer 157 and the physically exposed surfaces of the first magnetic shield 102 and the first dielectric isolation layer 202. The second dielectric material layer 280L can include aluminum oxide, silicon oxide, or silicon nitride.

The second dielectric material layer 280L can be deposited by an anisotropic deposition process such as sputtering. The direction of deposition of the dielectric material of the second dielectric material layer 280L can be substantially normal to the top surface of the substrate 101. The thickness of the second dielectric material layer 280L, as measured at horizontal portions, can be about the same as the thickness of the sensor layer stack 110, which may be about the same as the thickness of the ELG 210.

Referring to FIGS. 16A-16C, the front-edge-pattern photoresist layer 157 is lifted off. Portions of the second dielectric material layer 280L located on the top surface of, or on the sidewalls of, the front-edge-pattern photoresist layer 157 are removed during the lift-off process. The remaining portion of the second dielectric material layer 280L is referred to as a second dielectric material portion 280.

Referring to FIGS. 17A-17C, a second magnetic shield 104 is formed within a sensor region of the first exemplary structure. The second magnetic shield 104 includes a soft magnetic material, and may have a thickness in a range from 200 nm to 2,000 nm, although lesser and great thicknesses can also be employed. The second magnetic shield 104 can be subsequently patterned to provide the upper reading shield 690 of a magnetic head 600 in a finished product. A second dielectric isolation layer 190 can be formed within the ELG region of the first exemplary structure. The second dielectric isolation layer 190 includes an electrically insulating material such as aluminum oxide. In one embodiment, the top surface of the second dielectric isolation layer 190 can be substantially coplanar with a top surface of the second magnetic shield 104.

Optionally, additional material layers for forming the recording head 660 of the magnetic head 600 illustrated in FIG. 1 can be deposited and patterned.

Referring to FIGS. 18A-18C, a lapping process is performed on the first exemplary structure to provide an air bearing surface (ABS). The backside edge of the ELG is located farther away from the air bearing surface than the backside edge of the read sensor is from the air bearing surface by the nominal stripe height offset (SHO) plus the overlay variation between the two lithographic process that define the sensor backside edge (SBE) and the ELG backside edge (ELGBE). This data can be fed forward to determine the process parameters for lapping the product devices 520.

The read sensor and the ELG can be lapped to provide the air bearing surface. The lapping process parameter(s), such as process condition(s) and/or duration, are controlled based on the measured electrical property of the ELG. As will be described in more detail below, an electrical property of the ELG (such as conductance and/or resistance) is measured during the lapping process and compared to a predetermined criteria (e.g., the desired conductance at which the lapping process is stopped to provide the ABS) which includes or is modified to include the determined stripe height offset between the sensor and the ELG. The final stripe height of the read sensor is controlled by the lapping process. Portions of the first and second magnetic shields (102, 104) are also lapped during formation of the air bearing surface.

According to another embodiment of the present disclosure, the order of patterning of the sensor backside edge SBE and the ELG backside edge ELGBE can be reversed. Referring to FIGS. 19A-19C, a second exemplary structure according to a second embodiment of the present disclosure can be derived from the first exemplary structure of FIGS. 4A-4C by applying and patterning a photoresist layer for patterning the backside edge of each ELG. This photoresist layer is herein referred to as an ELG-backside-pattern photoresist layer 247. The ELG-backside-pattern photoresist layer 247 may also be referred to as a second photoresist layer.

The ELG-backside-pattern photoresist layer 247 is applied and patterned over the over the ELG layer 210L. For each of the product devices 520 and for each of the test devices 530, the ELG-backside-pattern photoresist layer 247 includes an isolated discrete portion in the ELG region. The entirety of the sensor region within each product device 520 and within each test device 530 can be covered by the ELG-backside-pattern photoresist layer 247. The ELG-backside-pattern photoresist layer 247 in the ELG region can have a straight edge that is parallel to the air bearing surface (ABS), which is perpendicular to the direction of the cross-sectional plane C-C' in FIG. 19A.

Figure 20A:
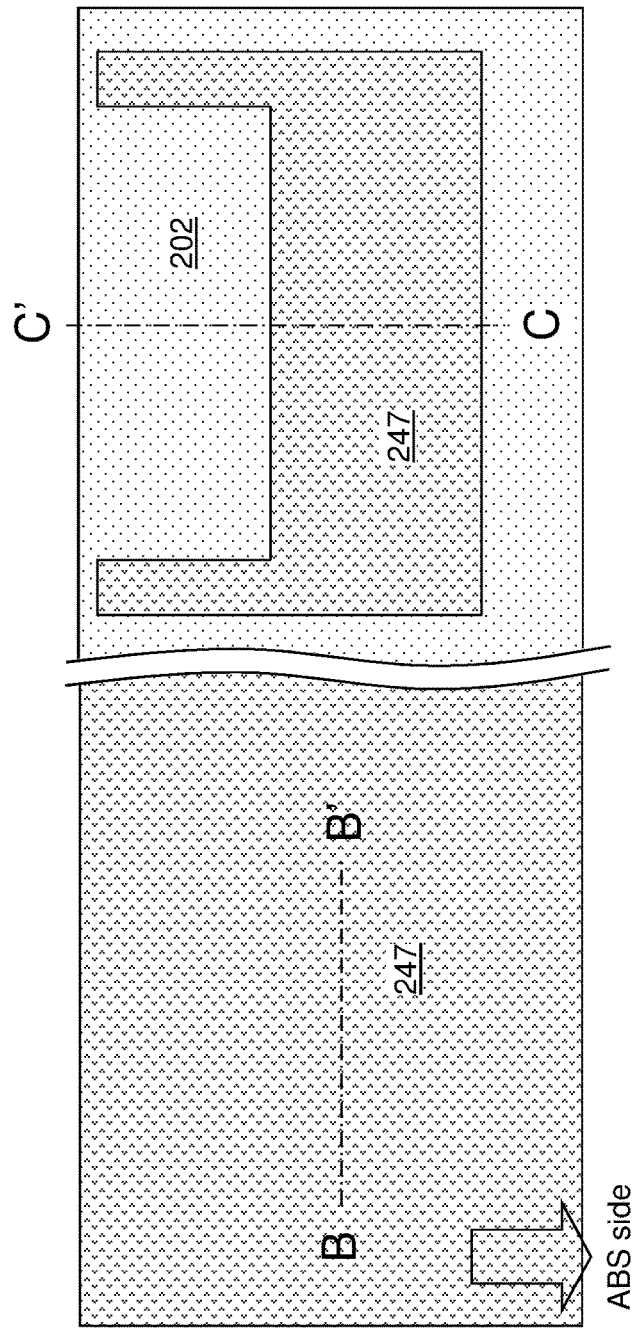
FIG. 20A illustrates a top-down view of the second exemplary structure after patterning an ELG backside edge according to the second embodiment of the present disclosure.
Figure 20C:
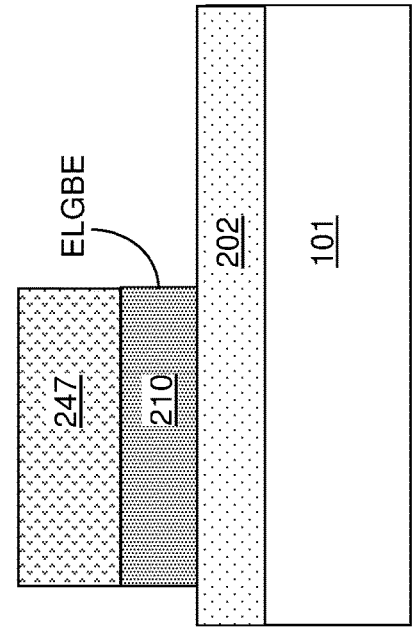
FIG. 20C is a vertical cross-sectional view of the ELG region of the second exemplary structure along the plane C-C' of FIG. 20A.
Figure 20B:
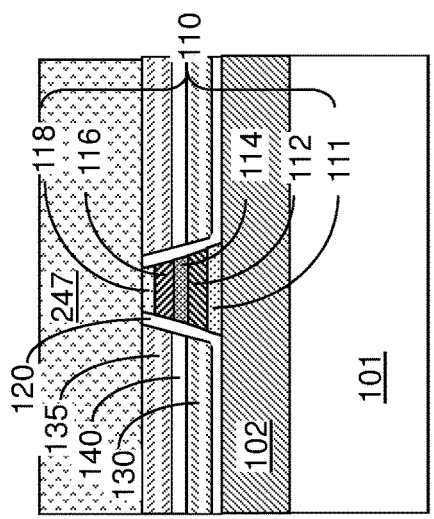
FIG. 20B is a vertical cross-sectional view of the sensor region of the second exemplary structure along the plane B-B' of FIG. 20A.

Referring to FIGS. 20A-20C, the material layers underlying the ELG-backside-pattern photoresist layer 247 and located above the first magnetic shield 102 and the first dielectric isolation layer 202 are patterned by transferring the pattern of the ELG-backside-pattern photoresist layer 247 therethrough. This patterning step is referred to as an ELG backside edge patterning step, or a second patterning step. In one embodiment, a second ion milling process can be performed employing the ELG-backside-pattern photoresist layer 247 as an ion milling mask layer. Regions of the ELG layer 210L that are not covered by the ELG-backside-pattern photoresist layer 247 are removed. A backside edge of the ELG layer 210L, which is herein referred to as an ELG backside edge ELGBE, is formed at a periphery of a remaining portion of the ELG layer 201L, which is an ELG 210. The ELG backside edge ELGBE constitutes the backside edge of the ELG 210. Each ELG backside edge ELGBE for the product devices 520 and the test devices 530 is formed underneath a respective edge of the ELG-backside-pattern photoresist layer 247. In one embodiment, each ELG backside edge ELGBE may be vertically coincident with a respective overlying edge of the ELG-backside-pattern photoresist layer 247.

Figure 21A:
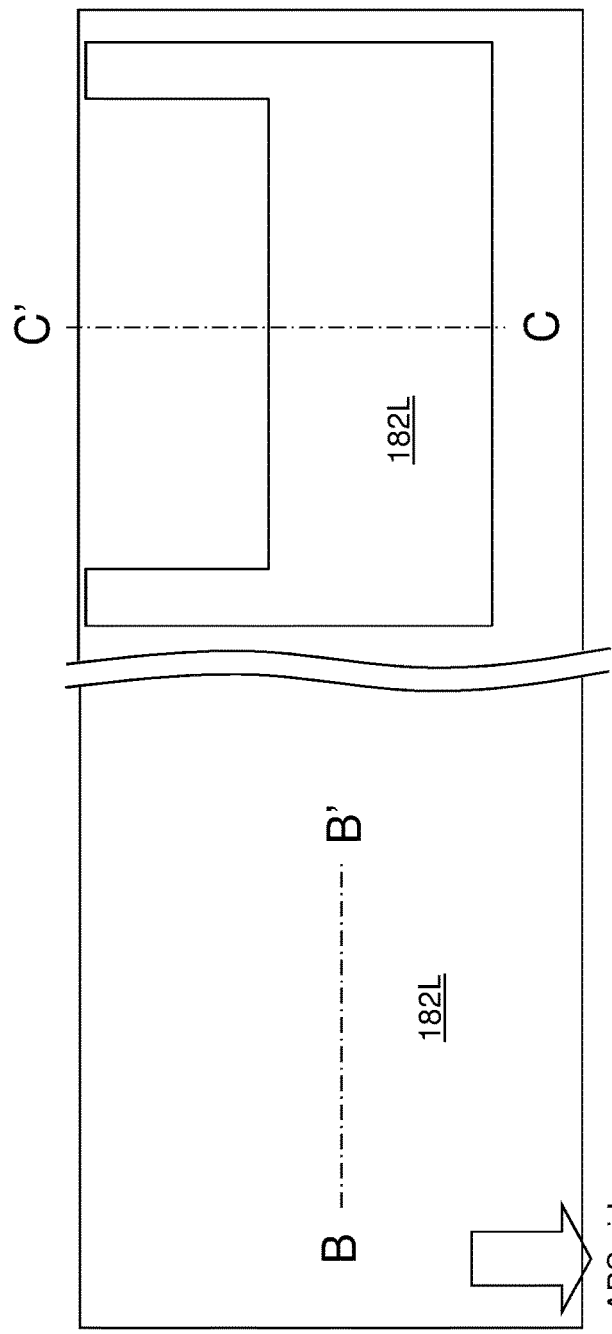
FIG. 21A illustrates a top-down view of the second exemplary structure after deposition of a first dielectric material according to the second embodiment of the present disclosure.
Figure 21C:
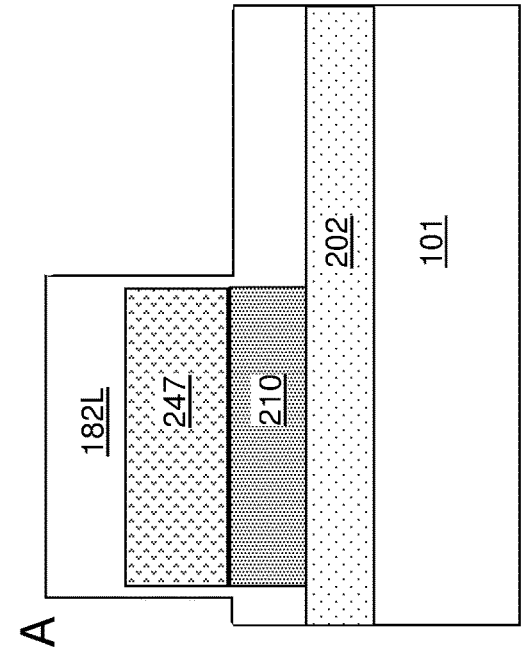
FIG. 21C is a vertical cross-sectional view of the ELG region of the second exemplary structure along the plane C-C' of FIG. 21A.
Figure 21B:
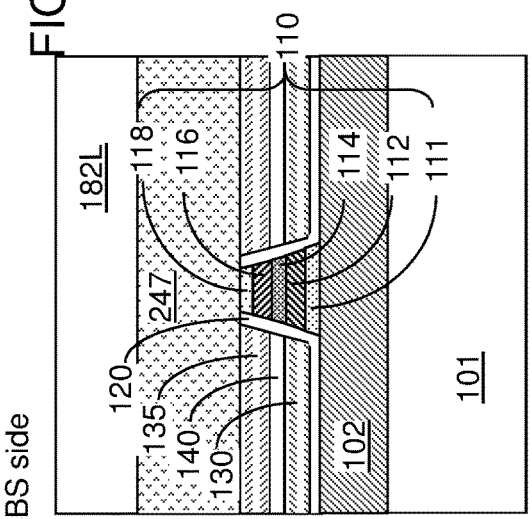
FIG. 21B is a vertical cross-sectional view of the sensor region of the second exemplary structure along the plane B-B' of FIG. 21A.

Referring to FIGS. 21A-21C, a first dielectric material layer 182L is deposited over the ELG-backside-pattern photoresist layer 247 and over the first dielectric isolation layer 202. The first dielectric material layer 182L can include aluminum oxide, silicon oxide, or silicon nitride. The first dielectric material layer 182L can be deposited by an anisotropic deposition process such as sputtering. The direction of deposition of the dielectric material of the first dielectric material layer 182L can be substantially normal to the top surface of the substrate 101. The thickness of the first dielectric material layer 182L, as measured at horizontal portions, can be about the same as the thickness of the sensor layer stack 110, which may be about the same as the thickness of the ELG 210.

Referring to FIGS. 22A-22C, the ELG-backside-pattern photoresist layer 247 is lifted off. Portions of the first dielectric material layer 182L located on the top surface of, or on the sidewalls of, the ELG-backside-pattern photoresist layer 247 are removed during the lift-off process. Each remaining portion of the first dielectric material layer 182L located within a respective recess cavity in an ELG region constitutes a first dielectric material portion 182. A first dielectric material portion 182 is formed directly on each ELG backside edge ELGBE, i.e., the backside edge of each ELG.

Figure 23A:
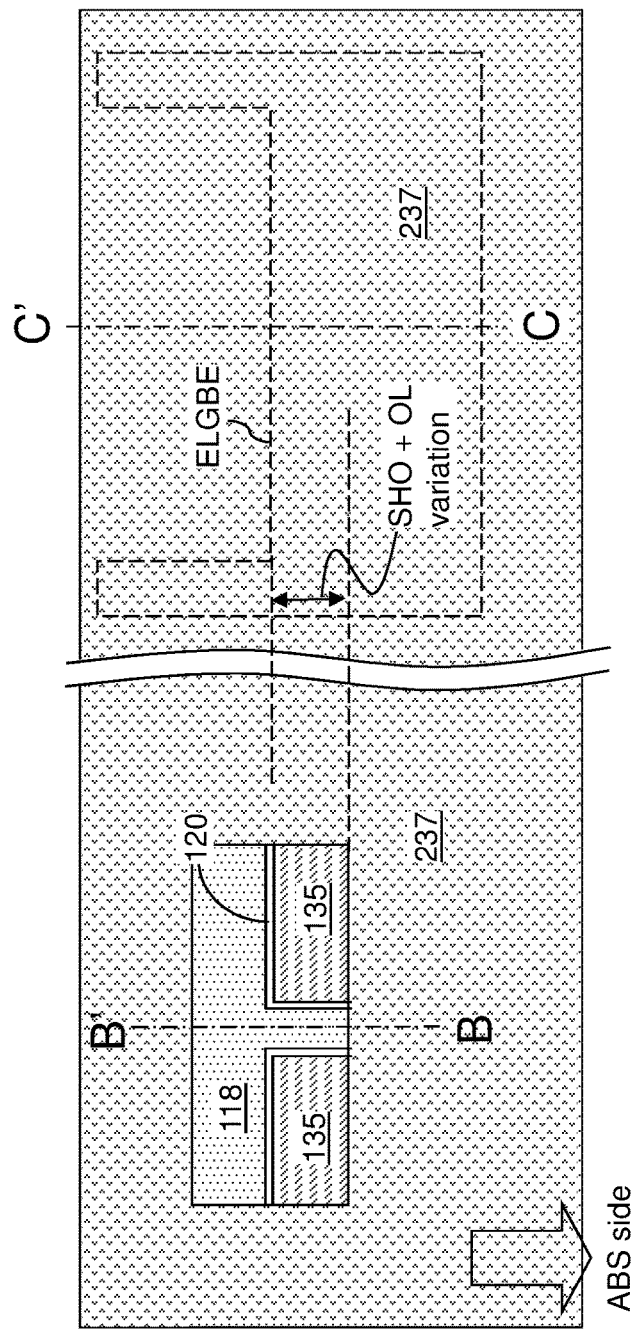
FIG. 23A illustrates a top-down view of the second exemplary structure after application and patterning of a sensor-backside-pattern photoresist layer according to the second embodiment of the present disclosure.
Figure 23C:
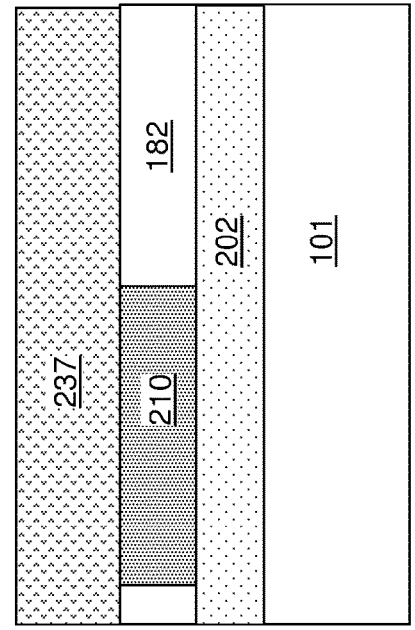
FIG. 23C is a vertical cross-sectional view of the ELG region of the second exemplary structure along the plane C-C' of FIG. 23A.
Figure 23B:
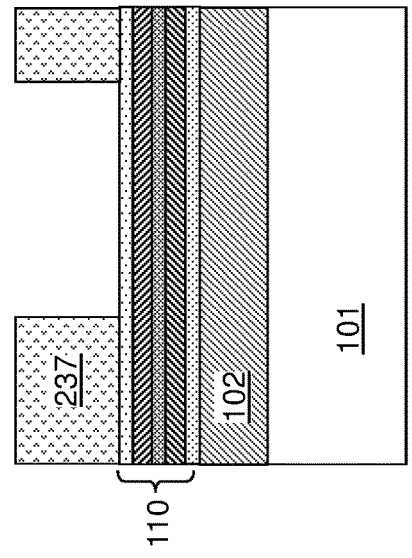
FIG. 23B is a vertical cross-sectional view of the sensor region of the second exemplary structure along the plane B-B' of FIG. 23A.

Referring to FIGS. 23A-23C, a photoresist layer for patterning the backside edge of each magnetic sensor is applied and patterned over the first exemplary structure. This photoresist layer is herein referred to as a sensor-backside-pattern photoresist layer 237. The sensor-backside-pattern photoresist layer 237 may also be referred to as a first photoresist layer. Within the lithographic mask that defines the pattern in the entire flash field, the pattern of openings for the product devices 520 can be the same as the pattern of openings for the test devices 530.

The sensor-backside-pattern photoresist layer 237 is applied and patterned over the at least one pair of magnetic bias material portions (130, 135), over the sensor layer stack 110 including the stripe 110S portion of the sensor layer stack located between the at least one pair of magnetic bias material portions, and over the ELG 210 and the first dielectric material portion 182. For each of the product devices 520 and for each of the test devices 530, the sensor-backside-pattern photoresist layer 237 includes an opening within the respective sensor region. The entirety of the ELG region can be covered by the sensor-backside-pattern photoresist layer 237. The opening within each sensor region can have a straight edge that is parallel to the air bearing surface (ABS), which is perpendicular to the direction of the cross-sectional plane B-B' in FIG. 23A. In one embodiment, the opening within each sensor region can have a rectangular shape, and includes backside edges of the at least one pair of magnetic bias material portions (130, 135) therein.

Within each product device 520 in a same flash field, the backside edge of each ELG 210 is offset from the front side edge of the opening in the sensor region by a physical stripe height offset distance that is the sum of the target stripe height offset (target SHO) plus the overlay variation of the sensor-backside-pattern photoresist layer 237 with respect to the pattern formed by the ELG-backside-pattern photoresist layer 247. The offset of the ELG can be along a direction that is perpendicular to the backside edges of the ELG and the read sensors in the product devices 520.

Referring to FIGS. 24A-24C, the material layers underlying the sensor-backside-pattern photoresist layer 237 and located above the first magnetic shield 102 are patterned by transferring the pattern of the sensor-backside-pattern photoresist layer 237 therethrough. This patterning step is referred to as a sensor backside edge patterning step, or a first patterning step. In this embodiment, the first patterning step is performed after the second patterning step. In one embodiment, a first ion milling process can be performed employing the sensor-backside-pattern photoresist layer 237 as an ion milling mask layer. The first ion milling process removes regions of the at least one pair of magnetic bias material portions (130, 135) and the sensor layer stack (e.g., the stripe 110S) that are not covered by the sensor-backside-pattern photoresist layer 237. A backside edge of the sensor layer stack (e.g., the stripe 110S), which is herein referred to as a sensor backside edge SBE, is formed at a periphery of a recess cavity that is formed in the sensor region. The sensor backside edge SBE constitutes the backside edge of the read sensor to be subsequently formed, and comprises sidewalls of remaining portions of the at least one pair of magnetic bias material portions (130, 135) and the sensor layer stack (e.g., the stripe 110S). The sensor backside edge SBE, i.e., the backside edge of the read sensor for each product device 520 and for each test device 530, is formed underneath a respective edge of the sensor-backside-pattern photoresist layer 237. In one embodiment, each sensor backside edge SBE may be vertically coincident with a respective overlying edge of the sensor-backside-pattern photoresist layer 237. The geometrical relationship between the sensor backside edge SBE and the ELG backside edge ELGBE can be the same as in the first embodiment.

Referring to FIGS. 25A-25C, a continuous insulating material layer 150L and a rear bias magnetic material layer 160L are sequentially deposited over the sensor-backside-pattern photoresist layer 237 and in the recess cavities. The continuous insulating material layer 150L is formed directly on the backside edge of the read sensor and within the recess cavity in the sensor region for each product device 520 and for each test device 530. The composition of the continuous insulating material layer 150L can be the same as in the first embodiment, and can be formed by a same deposition method as in the first embodiment. The composition of the rear bias magnetic material layer 160L can be the same as in the first embodiment, and can be formed by a same deposition method as in the first embodiment.

Referring to FIGS. 26A-26C, the sensor-backside-pattern photoresist layer 237 is lifted off. Portions of the rear bias magnetic material layer 160L and the continuous insulating material layer 150L located on the top surface of, or on the sidewalls of, the sensor-backside-pattern photoresist layer 237 are removed during the lift-off process. Each remaining portion of the continuous insulating material layer 150L located within a respective recess cavity in a sensor region constitutes a backside insulating layer 150. Each remaining portion of the rear bias magnetic material layer 160L located within a respective recess cavity in a sensor region, and directly on a respective backside insulating layer 150, constitutes a rear bias magnetic material portion 160.

A combination of a backside insulator layer 150 and a rear bias magnetic material portion 160 is provided on each sensor backside edge SBE, i.e., the backside edge of each read sensor. Thus, a rear bias magnetic material portion 160 is formed on a sidewall of a backside insulating layer 150 by depositing and patterning a soft magnetic material. Each rear bias magnetic material portion 160 is formed adjacent to the backside edge of the read sensor.

Figure 27A:
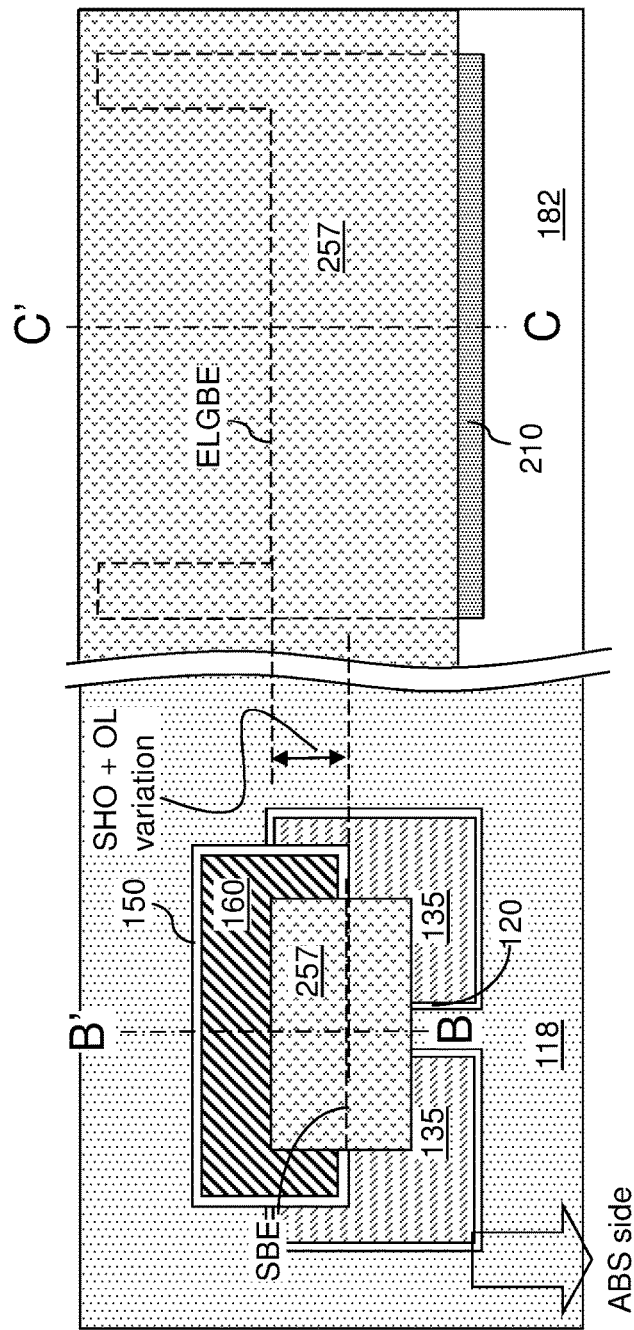
FIG. 27A illustrates a top-down view of the second exemplary structure after application and patterning of a front-edge-pattern photoresist layer according to the second embodiment of the present disclosure.
Figure 27C:
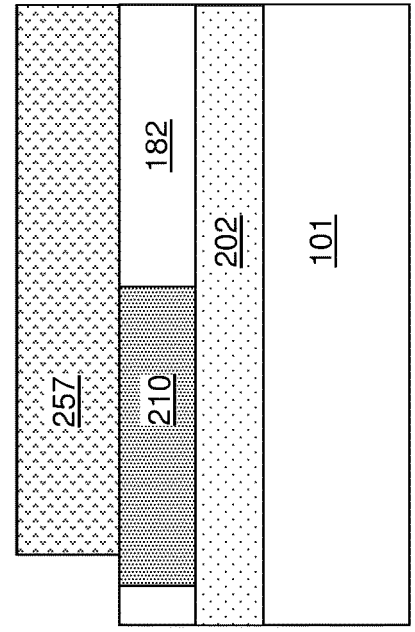
FIG. 27C is a vertical cross-sectional view of the ELG region of the second exemplary structure along the plane C-C' of FIG. 27A.
Figure 27B:
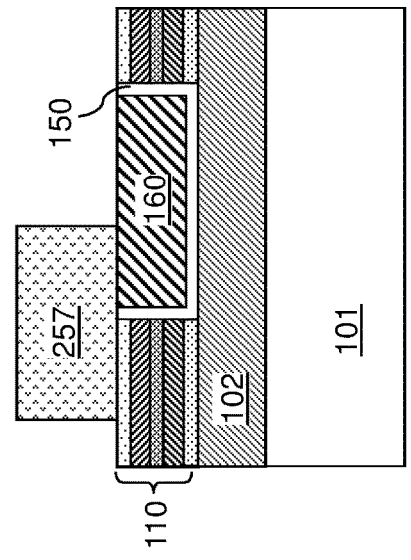
FIG. 27B is a vertical cross-sectional view of the sensor region of the second exemplary structure along the plane B-B' of FIG. 27A.

Referring to FIGS. 27A-27C, a photoresist layer for patterning front side edges of read sensors and ELG's is applied and patterned over the first exemplary structure. This photoresist layer is herein referred to as a front-edge-pattern photoresist layer 257. The front-edge-pattern photoresist layer 257 may also be referred to as a third photoresist layer.

The front-edge-pattern photoresist layer 257 is applied and patterned over the over the sensor region and the ELG region of each product device 520 and each test device 530. The patterned front-edge-pattern photoresist layer 257 includes a patterned portion within each sensor region and another patterned portion within each ELG region for each of the product devices 520 and for each of the test devices 530. Each isolated patterned portions of the front-edge-pattern photoresist layer 257 can have a straight edge that is parallel to the air bearing surface (ABS), which is perpendicular to the directions of the cross-sectional planes B-B' and C-C' in FIG. 27A.

A portion of the front-edge-pattern photoresist layer 257 in each sensor region overlies the sensor backside edge SBE. A front side edge of the portion of the front-edge-pattern photoresist layer 257 in each sensor region straddles at least one pair of magnetic bias material portions (130, 135) and a sensor layer stack (e.g., the stripe 110S) therebetween. A back side edge of the portion of the front-edge-pattern photoresist layer 257 in each sensor region straddles a rear bias magnetic material portion 160.

A portion of the front-edge-pattern photoresist layer 257 in each ELG region overlies the ELG backside edge ELGBE. An edge of the front-edge-pattern photoresist layer 257 straddles an underlying ELG 210. An edge of the front-edge-pattern photoresist layer 257 in each ELG region is parallel to the air bearing surface to be subsequently formed.

The nominal distance between the sensor backside edge SBE and the front side edge of the portion of the front-edge-pattern photoresist layer 257 as provided in the design for the lithographic masks is referred to as a design stripe height DSH. The physical distance between the physical sensor backside edge SBE and the physical front side edge of the portion of the front-edge-pattern photoresist layer 257 is the sum of the design stripe height DSH plus overlay (OL) variation (which may be positive or negative) along the direction perpendicular to the physical sensor backside edge SBE.

Figure 28A:
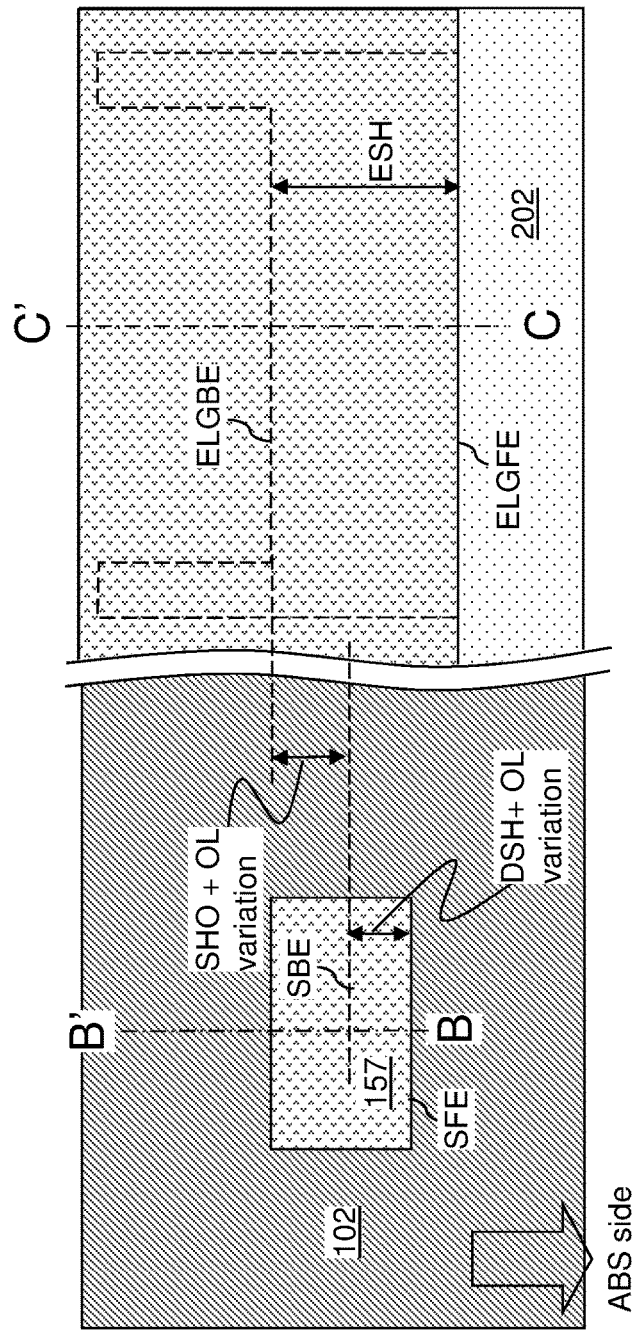
FIG. 28A illustrates a top-down view of the second exemplary structure after patterning a sensor front edge and an ELG front side edge according to the second embodiment of the present disclosure.
Figure 28C:
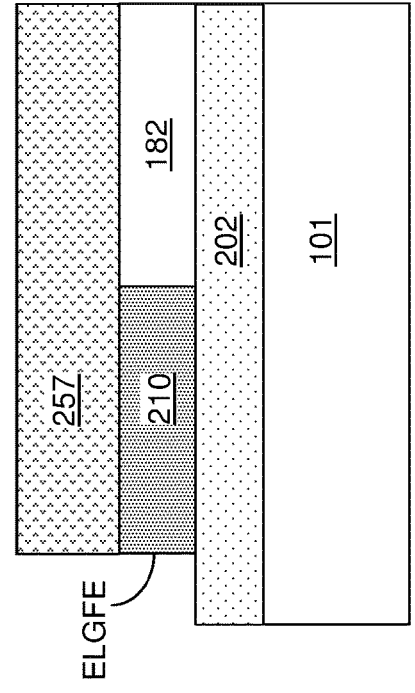
FIG. 28C is a vertical cross-sectional view of the ELG region of the second exemplary structure along the plane C-C' of FIG. 28A.
Figure 28B:
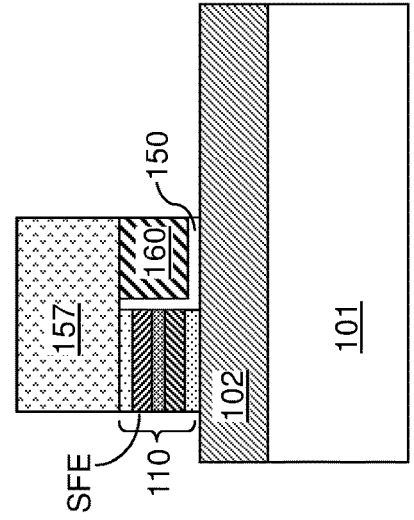
FIG. 28B is a vertical cross-sectional view of the sensor region of the second exemplary structure along the plane B-B' of FIG. 28A.

Referring to FIGS. 28A-28C, the material layers underlying the front-edge-pattern photoresist layer 257 and located above the first magnetic shield 102 and the first dielectric isolation layer 202 are patterned by transferring the pattern of the front-edge-pattern photoresist layer 257 therethrough. This patterning step is referred to as a front side edge patterning step, or a third patterning step. In one embodiment, a third ion milling process can be performed employing the front-edge-pattern photoresist layer 257 as an ion milling mask layer. Material portions that are not covered by the sensor-backside-pattern photoresist layer 137 are removed.

A sensor front edge SFE is formed on the front side sidewall of a remaining material portion in the sensor region, which constitutes a read sensor. The sensor front edge SFE includes sidewalls of the sensor layer stack (e.g., the stripe 110S) and the at least one pair of magnetic bias material portions (130, 135). An ELG front side edge ELGFE is formed on the front side sidewall of a remaining portion of the ELG 210. In one embodiment, each sensor front edge SFE may be vertically coincident with a respective overlying edge of the front-edge-pattern photoresist layer 257. In one embodiment, each ELG front side edge ELGFE may be vertically coincident with a respective overlying edge of the front-edge-pattern photoresist layer 257. The width of each ELG between the ELG backside edge ELGBE and the ELG front side edge ELGFE is herein referred to as an ELG stripe height ESH.

Within each product device 520 in a same flash field, the front side edge FSE of each read sensor is offset from the sensor backside edge SBE (i.e., the backside edge of the read sensor) by a design stripe height DSH plus overlay (OL) variation of the lithographic process that patterns the front-edge-pattern photoresist layer 257 with respect to features formed by the sensor-backside-pattern photoresist layer 237 (such as the sensor backside edge SBE). The design stripe height DSH is the sensor stripe height as provided in the mask design prior to lapping for the patterning purposes, and is about the same as the ideal physical sensor stripe height (target sensor stripe height) in a product plus a maximum overlay variation expected in the lithographic process employed to pattern the front-edge-pattern photoresist layer 257.

As discussed above, the multiple flash fields, i.e., lithographic exposure fields, on the substrate 500 are patterned one at a time employing a lithographic exposure tool that patterns the flash fields one at a time. Thus, the actual overlay variation for each lithographic die 510 (corresponding to a single flash field) varies from among the lithographic dies 510. While a design for a product device 520 is illustrated in FIGS. 27A-27C and 28A-28C, a different design may be employed for test devices 530. For example, the front edges of the front-edge-pattern photoresist layer 257 may be located within a same line for the sensor front edge SFE and for the ELG front edge ELGFE in each test device 530. However, the distance between the front edge SFE and the sensor back edge SBE can be different for different devices 530. Thus, the physical stripe height (which is the sum of a respective design stripe height and the overlay variation along the direction perpendicular to the sensor front edge SFE in each test device 530) can vary from a predetermined minimum value to a predetermined maximum value among the test devices 530 (which are also referred to as special column devices). For product devices 520, the front edges of the front-edge-pattern photoresist layer 257 can be different between the sensor region and ELG region (i.e., between the sensor front edge SFE and the ELG front edge ELGFE) because the actual front edge (i.e., the air bearing surface) of the sensor in the final product is formed by a subsequent lapping process.

Referring to FIGS. 29A-29C, a second dielectric material layer 282L is deposited over the front-edge-pattern photoresist layer 257 and the physically exposed surfaces of the first magnetic shield 102 and the first dielectric isolation layer 202. The second dielectric material layer 282L can include aluminum oxide, silicon oxide, or silicon nitride. The second dielectric material layer 282L can be deposited by an anisotropic deposition process such as sputtering. The direction of deposition of the dielectric material of the second dielectric material layer 282L can be substantially normal to the top surface of the substrate 101. The thickness of the second dielectric material layer 282L, as measured at horizontal portions, can be about the same as the thickness of the sensor layer stack 110, which may be about the same as the thickness of the ELG 210.

Referring to FIGS. 30A-30C, the front-edge-pattern photoresist layer 257 is lifted off. Portions of the second dielectric material layer 282L located on the top surface of, or on the sidewalls of, the front-edge-pattern photoresist layer 257 are removed during the lift-off process. The remaining portion of the second dielectric material layer 282L is referred to as a second dielectric material portion 282.

Referring to FIGS. 31A-31C, a second magnetic shield 104 is formed within a sensor region of the second exemplary structure. The second magnetic shield 104 includes a soft magnetic material, and may have a thickness in a range from 200 nm to 2,000 nm, although lesser and great thicknesses can also be employed. The second magnetic shield 104 can be subsequently patterned to provide the upper reading shield 690 of a magnetic head 600 in a finished product. A second dielectric isolation layer 190 is formed within the ELG region of the first exemplary structure. The second dielectric isolation layer 190 includes an electrically insulating material such as aluminum oxide. In one embodiment, the top surface of the second dielectric isolation layer 190 can be substantially coplanar with a top surface of the first magnetic shield 102.

Subsequently, additional material layers for forming the recording head 660 of the magnetic head 600 illustrated in FIG. 1 can be deposited and patterned.

Figure 32A:
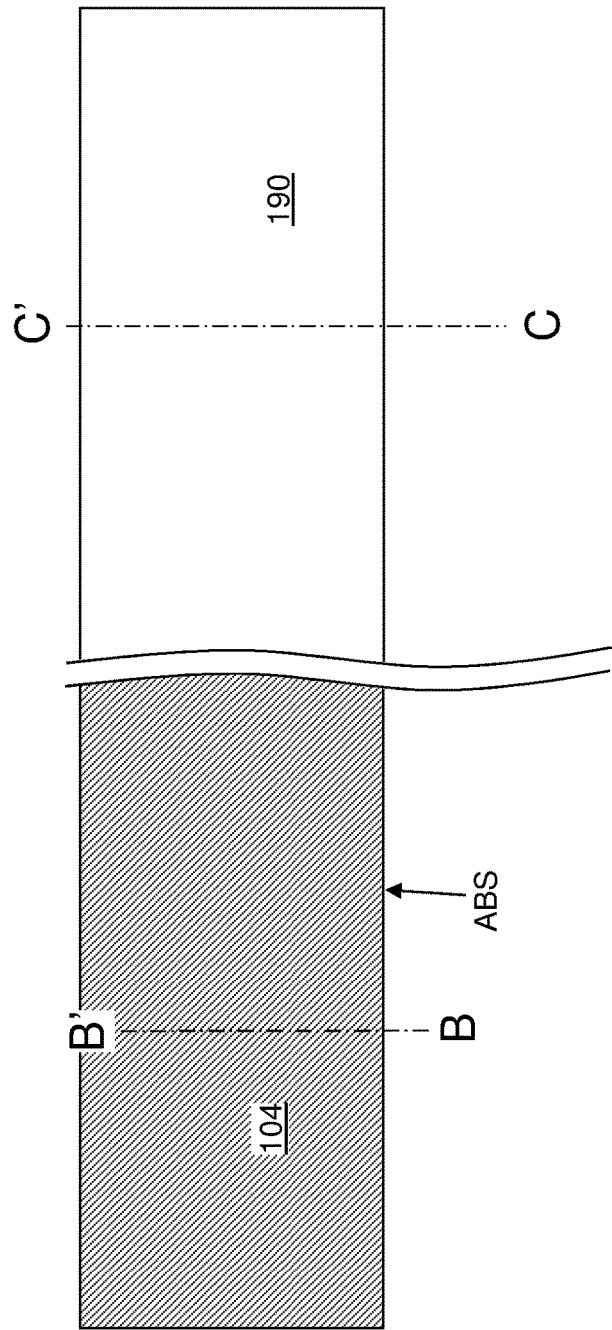
FIG. 32A illustrates a top-down view of the second exemplary structure lapping to form an air bearing surface according to the second embodiment of the present disclosure.
Figure 32C:
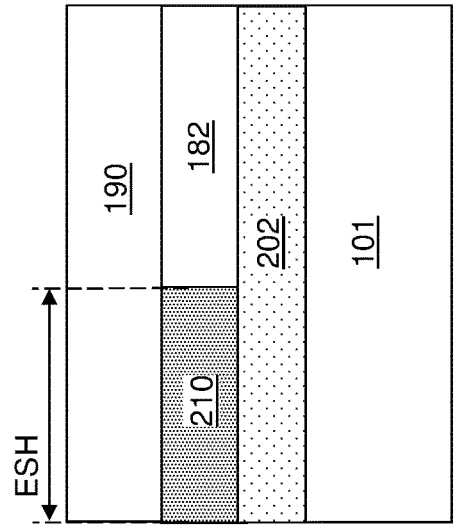
FIG. 32C is a vertical cross-sectional view of the ELG region of the second exemplary structure along the plane C-C' of FIG. 32A.
Figure 32B:
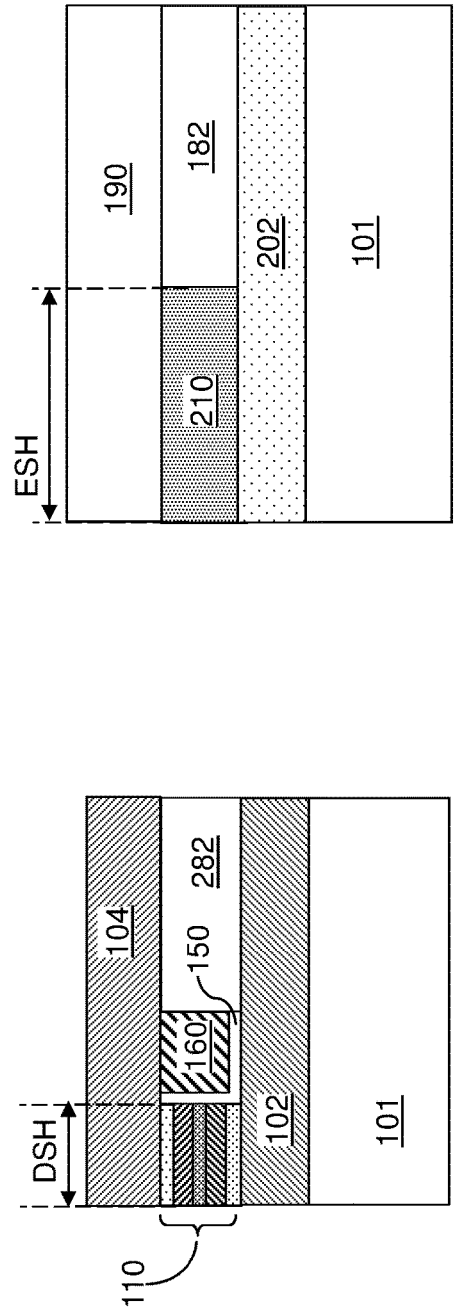
FIG. 32B is a vertical cross-sectional view of the sensor region of the second exemplary structure along the plane B-B' of FIG. 32A.

Referring to FIGS. 32A-32C, a lapping process can be performed on the second exemplary structure to provide an air bearing surface (ABS) in the same manner as in the first embodiment.

In summary, as discussed above, the process of the first and the second embodiments includes depositing a sensor layer stack 110 including at least one free layer over a substrate (101, 500) in a sensor region, and patterning the sensor layer stack to form a read sensor stripe 110S. The method also includes depositing the ELG layer 210L over the substrate in an ELG region before or after depositing the sensor layer stack 110. A backside edge of a read sensor is formed by patterning the read sensor stripe in a first patterning step.

A backside edge of an ELG 210 is formed by patterning the ELG layer in the ELG region in a second patterning step that is different from the first patterning step. The second patterning step can take place before or after the first patterning step. A backside insulator layer 150L and a rear bias magnetic material portion 160 are formed over the backside edge of the read sensor after the first patterning step. A front side edge of the read sensor and a front side edge of the ELG are formed simultaneously by patterning the read sensor stripe 110S and the ELG layer 210L. The read sensor and the ELG 210 are then lapped to provide an air bearing surface of a read sensor employing the ELG to control a final stripe height of the read sensor.

In one embodiment, the backside edge of the ELG is offset from the backside edge of the read sensor by a physical stripe height offset distance along a direction that is perpendicular to the backside edges of the ELG and the read sensor. The backside edge of the ELG is located farther away from the air bearing surface than the backside edge of the read sensor is from the air bearing surface.

As discussed, above the first, second, and third patterning steps can be performed employing multiple flash fields on the substrate to form plurality of read sensors and ELGs, wherein the stripe height offset distance varies from flash field to flash field due to lithographic overlay variations between the first and second patterning steps.

A plurality of test devices 530 are formed within each flash field. The plurality of test devices include different design stripe heights DSH by design of the lithographic mask employed for the third patterning step. The different design stripe heights DSH among the different test devices 530 can be provided by moving the front edge of the third patterning mask that defines the locations of the sensor front edges SFE and the ELG front edges ELGFE from one test device to another, relative to sensor back edge (SBE) (i.e., relative to the ELG back edge ELGBE). The relative offset between the sensor back edge SBE and the ELG back edge ELGBE (i.e., the stripe height offset SHO), can be constant for each product device 520 and for each test device 530.

A physical stripe height offset is determined by measuring electrical characteristics of the plurality of test devices for each flash field. For example, the determination can be performed using the graphs shown in FIGS. 33 and 34.

Figure 33:
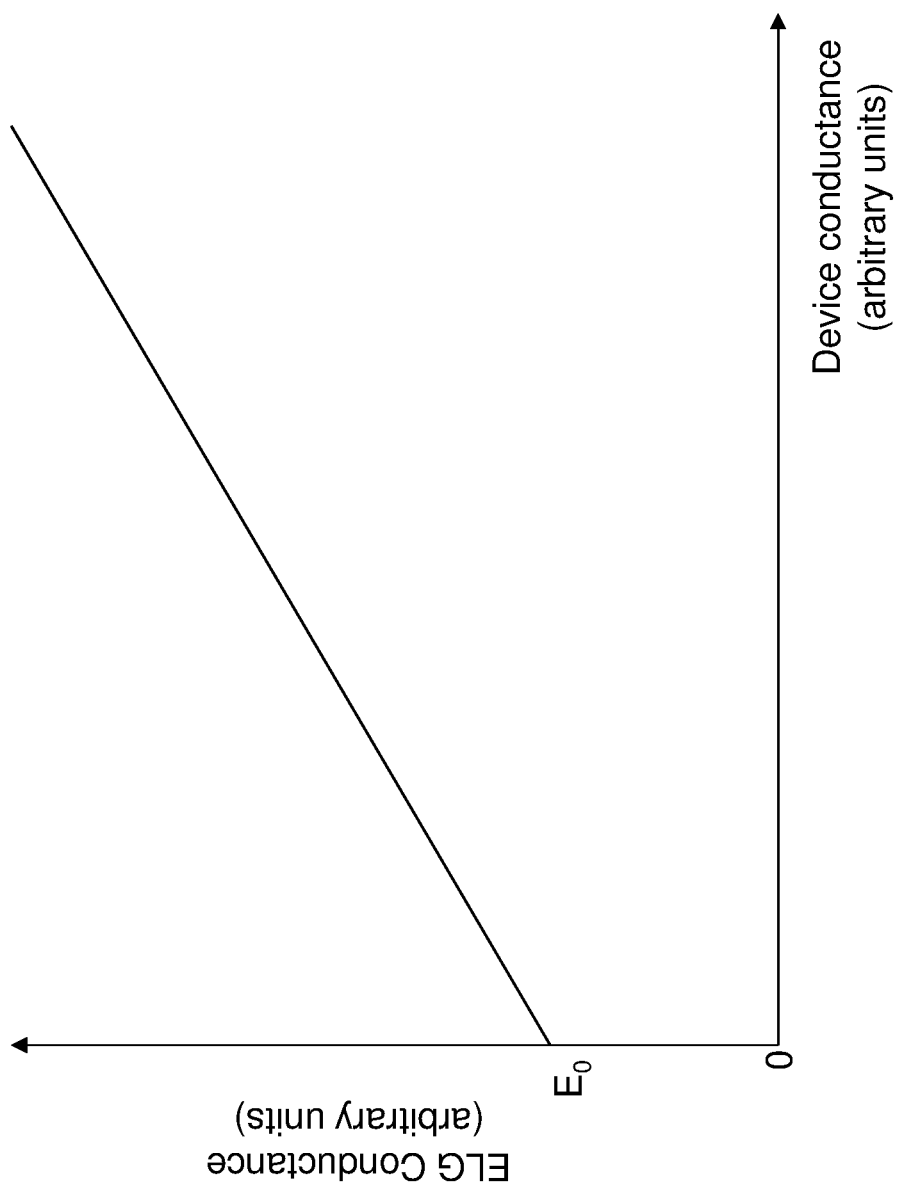
FIG. 33 illustrates an example of correlation between ELG conductance and device conductance according to an embodiment of the present disclosure.

FIG. 33 illustrates an example of correlation between ELG conductance of test devices and device conductance of the test devices 530. Since the test ELGs and test devices (e.g., test stripes) have different design stripe heights DSH through the design of the lithographic mask employed for the third patterning step, the different correlated conductance values are plotted in a graph and a line is fitted to the plot points. The point where the fitted line intersects the test ELG conductance (i.e., y-intercept) is labeled $E_o$ (i.e., where device conductance equals zero). The calculation of the stripe height offset illustrated in FIGS. 33 and 34 can be used for one each flash field, i.e., for all product devices 520 and all test devices 530 within the same flash field. However, because the lithographic overlays are different from flash field to flash field, the calculation of the stripe height offset is performed for each flash field independently.

Figure 34:
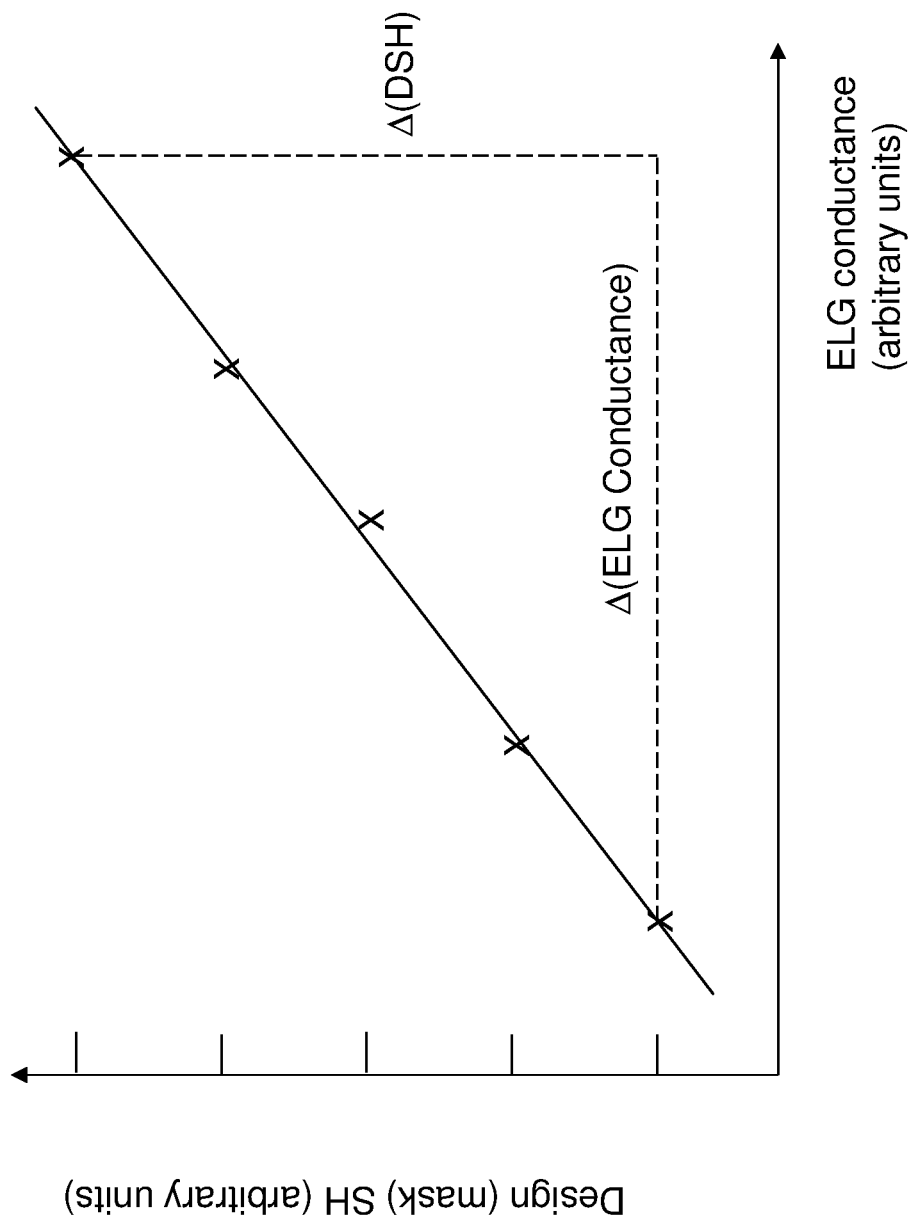
FIG. 34 illustrates an example of correlation between ELG conductance and design stripe heights according to an embodiment of the present disclosure.

FIG. 34 illustrates an example of correlation between ELG conductance of test devices and design (i.e., mask) stripe heights of the test devices. The values are plotted on a graph and a line is fitted to the plot points. A slope of the line is then determined.

The physical stripe height offset is calculated from the product of $E_o$ and the slope according to following formula: $E_o$*slope. The calculated value of the physical stripe height offset is then fed forward to the lapping process.

The process subsequently includes lapping read sensors and ELG's of the product devices 520, for each flash field, employing the calculated value of the physical stripe height offset for the respective flash field to provide a target stripe height for each of the read sensors of product devices 520. For example, when the measured electrical property (e.g., conductance) of the ELG reaches a predetermined criterion, such as a threshold value indicative that the desired sensor stripe height has been reached, the lapping process is stopped.

The measured electrical property of the ELG, such as conductance or resistance, is a function of the size (e.g., height) of the ELG. Thus, the size (e.g., height) of the ELG is correlated to the stripe height of the read sensor to use the ELG to control the lapping process to achieve the desired final stripe height of the read sensor. Since the backside edges of the read sensor and the ELG are formed in separate patterning steps, a correlation between the read sensor and ELG electrical properties (e.g., conductance and/or resistance) and the design (i.e., photolithography mask) stripe height shown in FIGS. 33 and 34 is used to determine the physical stripe height offset between the ELG and the read sensor stripe heights. The output of the measured ELG electrical property during the lapping process is modified by the determined stripe height offset value to more accurately control the lapping process.

According to embodiments of the present disclosure, the back edge formation of a read sensor is decoupled from the back edge formation of an ELG by employing separate lithographic patterning steps for forming the respective back edges. The methods of the present disclosure are particularly useful for a dual free layer read sensor that includes a metallic refill of a hard magnetic material behind the sensor back edge that form the rear bias magnetic material portion. When the read sensor and the ELG are formed separately, the ELG can be laterally surrounded by dielectric materials to avoid electrical shorting of the ELG with the rear bias magnetic material portion. The ELG-sensor stripe height (SH) offset variation induced by the separate patterning steps can be minimized employing a stripe height offset characterization scheme. The physical stripe height offset can be calculated for each flash field based on measurements from test devices 530, and can be fed forward to the lapping step to provide lapping parameter control and optimization flash field by flash field.

Although the foregoing refers to particular preferred embodiments, it will be understood that the disclosure is not so limited. It will occur to those of ordinary skill in the art that various modifications may be made to the disclosed embodiments and that such modifications are intended to be within the scope of the disclosure. Where an embodiment employing a particular structure and/or configuration is illustrated in the present disclosure, it is understood that the present disclosure may be practiced with any other compatible structures and/or configurations that are functionally equivalent provided that such substitutions are not explicitly forbidden or otherwise known to be impossible to one of ordinary skill in the art. All of the publications, patent applications and patents cited herein are incorporated herein by reference in their entirety.

What is claimed is:

1. A method of forming a magnetic head, comprising:
depositing a sensor layer stack including at least one free layer over a substrate in a sensor region;
patterning the sensor layer stack to form a read sensor stripe;
depositing an electronic lapping guide (ELG) layer over the substrate in an ELG region;
forming a backside edge of a read sensor by patterning the read sensor stripe in a first patterning step;
forming a backside insulator layer and a rear bias magnetic material portion over the backside edge of the read sensor;
forming a backside edge of an ELG by patterning the ELG layer in the ELG region in a second patterning step that is different from the first patterning step;
simultaneously forming a front side edge of the read sensor and a front side edge of the ELG by patterning the read sensor stripe and the ELG layer; and
lapping the read sensor and the ELG to provide an air bearing surface of a read sensor employing the ELG to control a final stripe height of the read sensor.

2. The method of claim 1, wherein:
the backside edge of the ELG is offset from the backside edge of the read sensor by a physical stripe height offset distance along a direction that is perpendicular to the backside edges of the ELG and the read sensor; and
the backside edge of the ELG is located farther away from the air bearing surface than the backside edge of the read sensor is from the air bearing surface.

3. The method of claim 2, wherein each of the first patterning step and the second patterning step is performed employing multiple flash fields on the substrate to form plurality of read sensors and ELG's, wherein the stripe height offset distance varies from flash field to flash field due to lithographic overlay variations between the first and second patterning steps.

4. The method of claim 3, further comprising forming a plurality of test devices within each flash field, wherein the plurality of test devices includes different design stripe heights.

5. The method of claim 4, further comprising:
determining a physical stripe height offset by measuring electrical characteristics of the plurality of test devices for each flash field; and
lapping read sensors and ELGs, for each flash field, employing the physical stripe height offset for the respective flash field to provide a target stripe height for each of the read sensors of product devices.

6. The method of claim 5, wherein the physical stripe height offset is measured by correlating measured device conductance of the respective read sensors and conductance of the respective ELGs for the plurality of test devices for each flash field.

7. The method of claim 1, wherein the read sensor stripe comprises a dual ferromagnetic free layer stripe, and further comprising forming respective pairs of magnetic bias material portions on either side of the read sensor stripe.

8. The method of claim 7, further comprising:
applying and patterning a first photoresist layer over the at least one pair of magnetic bias material portions and over a portion of the read sensor stripe located between the at least one pair of magnetic bias material portions; and
ion milling regions of the at least one pair of magnetic bias material portions and the read sensor stripe that are not covered by the first photoresist layer, wherein the backside edge of the read sensor comprises sidewalls of remaining portions of the at least one pair of magnetic bias material portions and the read sensor stripe.

9. The method of claim 1, further comprising:
forming a backside insulating layer on the backside edge of the read sensor; and
forming a rear bias magnetic material portion including a hard magnetic material on a sidewall of the backside insulating layer.

10. The method of claim 1, wherein:
the first patterning step is performed by applying an patterning a first photoresist layer over the read sensor stripe and the ELG layer, wherein an opening is provided in the first photoresist layer, and the backside edge of the read sensor is formed underneath an edge of the first photoresist layer; and
the second patterning step is performed by applying an patterning a second photoresist layer over the sensor layer and the ELG layer, wherein the backside edge of the ELG is formed underneath an edge of the second photoresist layer.

11. The method of claim 10, wherein:
the patterned second photoresist layer covers an entirety of the sensor region; and
the second patterning step is performed after the first patterning step.

12. The method of claim 11, wherein the patterned first photoresist layer includes an opening in the ELG region.

13. The method of claim 12, further comprising:
forming a recess cavity within the ELG layer concurrently with formation of the backside edge of the read sensor within an area of the opening;
forming a continuous insulating material layer on the backside edge of the read sensor and within the recess cavity; and
depositing and patterning a hard magnetic material over the continuous insulating material layer;
wherein a rear bias magnetic material portion is formed on a sidewall of a remaining portion of the continuous insulating material layer adjacent to the backside edge of the read sensor and a sacrificial magnetic material portion is formed in the ELG region.

14. The method of claim 13, further comprising removing the sacrificial magnetic material portion from the ELG region during the second patterning step.

15. The method of claim 10, wherein:
the second patterning step is performed prior to the first patterning step; and
the first photoresist layer as patterned covers an entirety of the ELG region.

16. The method of claim 1, further comprising depositing at least one dielectric material on the backside edge of the ELG and on the front side edges of the read sensor and of the ELG.

17. The method of claim 16, wherein:
the at least one dielectric material layer comprises a first dielectric material and a second dielectric material;
the first dielectric material is deposited on the backside edge of the ELG; and
the second dielectric material is deposited on the front side edges of the read sensor and of the ELG.

18. The method of claim 17, further comprising patterning a portion of the first dielectric material, wherein:
a remaining portion of the first dielectric material contacts the backside edge of the ELG; and
the second dielectric material is deposited on the remaining portion of the first dielectric material and on sidewalls of the ELG that extend along a direction perpendicular to directions of the backside edge and the front side edge of the ELG.

19. The method of claim 18, the first dielectric material is patterned during a patterning step, wherein the second dielectric material is deposited on the remaining portion of the first dielectric material.

20. The method of claim 1, further comprising:
forming a first magnetic shield over the substrate, wherein the sensor layer stack is formed over the first magnetic shield;
forming a dielectric isolation layer over the substrate, wherein the ELG layer is formed over the dielectric isolation layer; and
forming a second magnetic shield over the read sensor, wherein portions of the first and second magnetic shields are lapped during formation of the air bearing surface.

* * * * *